US011921302B2

United States Patent
Benítez et al.

(10) Patent No.: US 11,921,302 B2
(45) Date of Patent: Mar. 5, 2024

(54) HUMAN VISION-ADAPTED LIGHT FIELD DISPLAYS

(71) Applicant: TESSELAND LLC, Pasadena, CA (US)

(72) Inventors: Pablo Benítez, Madrid (ES); Julio C. Chaves, Coimbra (PT); Juan Carlos Miñano, Madrid (ES); Bharathwaj Narasimhan, Fremont, CA (US)

(*) Notice: Subject to any disclaimer, the term of this patent is extended or adjusted under 35 U.S.C. 154(b) by 681 days.

(21) Appl. No.: 17/047,502

(22) PCT Filed: Apr. 26, 2019

(86) PCT No.: PCT/US2019/029472
§ 371 (c)(1),
(2) Date: Oct. 14, 2020

(87) PCT Pub. No.: WO2019/210254
PCT Pub. Date: Oct. 31, 2019

(65) Prior Publication Data
US 2021/0149212 A1     May 20, 2021

Related U.S. Application Data

(60) Provisional application No. 62/663,753, filed on Apr. 27, 2018.

(51) Int. Cl.
*G02B 27/00*     (2006.01)
*G02B 30/10*     (2020.01)

(52) U.S. Cl.
CPC .................................... *G02B 30/10* (2020.01)

(58) Field of Classification Search
CPC . G02B 30/10; G02B 27/0172; G02B 27/0189
See application file for complete search history.

(56) References Cited

U.S. PATENT DOCUMENTS

| 5,390,047 A | 2/1995 | Mizukawa |
| 6,529,331 B2 | 3/2003 | Massof et al. |

(Continued)

FOREIGN PATENT DOCUMENTS

| JP | 2016-018113 A | 2/2016 |
| WO | 2012054231 A2 | 4/2012 |
| WO | 2019089100 A1 | 5/2019 |

OTHER PUBLICATIONS

ISR/Written Opinion dated Aug. 9, 2019 in corresponding International Appl. No. PCT/US2019/029472.
(Continued)

*Primary Examiner* — Joseph P Martinez

(57) ABSTRACT

A display device arranged to generate a light field to illuminate a human eye. The light field comprising a plurality of pencils that virtually intersect a first reference surface and a second reference surface, said first reference surface being the plane passing through the eye ball sphere center and is perpendicular to the skull frontward direction, and said second reference surface located at a distance from the user's skull and being a portion of a sphere centered the eye hall sphere center. The center of said second reference surface defined as the intersection point of the line passing through the eye ball sphere center and pointing in the skull's frontwards direction. Each pencil is a set of straight lines, segments of said lines coincident with light ray trajectories illuminating the eye having approximately equal luminance and color at any time.

15 Claims, 43 Drawing Sheets

(56) References Cited

U.S. PATENT DOCUMENTS

| | | | |
|---|---|---|---|
| 9,201,270 | B2 | 12/2015 | Fattal et al. |
| 10,432,920 | B2 | 10/2019 | Benitez et al. |
| 10,436,951 | B2 | 10/2019 | Benitez et al. |
| 10,459,126 | B2 | 10/2019 | Minano et al. |
| 10,663,626 | B2 | 5/2020 | Benitez et al. |
| 10,690,813 | B2 | 6/2020 | Benitez et al. |
| 10,782,453 | B2 | 9/2020 | Benitez et al. |
| 2010/0277575 | A1 | 11/2010 | Ismael et al. |
| 2014/0002442 | A1 | 1/2014 | Lamb |
| 2015/0049390 | A1 | 2/2015 | Lanman et al. |
| 2015/0262424 | A1 | 9/2015 | Tabaka et al. |
| 2016/0026253 | A1 | 1/2016 | Bradski et al. |
| 2016/0140773 | A1 | 5/2016 | Yajima |
| 2017/0038592 | A1 | 2/2017 | Sudo |
| 2017/0102545 | A1 | 4/2017 | Hua et al. |
| 2017/0171533 | A1* | 6/2017 | Benitez ............. G02B 27/0172 |

OTHER PUBLICATIONS

Bruckner, "Microoptical Multi Aperture Imaging Systems", Ph.D. Thesis dissertation Friedrich Schiller University, Jena, Germany, http://www.db-thueringen.de/servlets/DerivateServlet/Derivate-24992/br%C3%BCckner/dissertation_a_brueckner_Multi_Aperture_Imaging_Systems_2011_12_22.pdf, 142 pages (2010).

Bruckner et al., "Thin wafer-level camera lenses inspired by insect compound eyes", Optics Express, vol. 18, No. 24, pp. 24379-24394, 16 pages, Nov. 22, 2010.

Chen, "Wide field of view, wide spectral band off-axis helmet-mounted display optical design", International Optical Design Conference 2002, Proceedings of SPIE vol. 4832; 6 pages (2002).

Cheng et al., "Design of a wide-angle, lightweight head-mounted display using free-form optics tiling", Optical Letters/vol. 36, No. 11, pp. 2098-2100, 3 pages, Jun. 1, 2011.

Curcio, et al., "Human photoreceptor topography", The Journal of Comparative Neurology, pp. 497-523, 28 pages, Feb. 1990.

Droessler et al., "Tilted cat helmet-mounted display", Optical Engineering, 29 (8), pp. 849-854 (1990).

Fattal et al., "A multi-directional backlight for a wide-angle, glasses-free three-dimensional display", Nature, vol. 495, pp. 348-351, Mar. 21, 2013.

Huang et al., "The Light Field Stereoscope", Stanford Computational Imaging Lab, SIGGGRAPH2015, 10 pages (2015).

Huang et al,, "Eyeglasses-free Display: Towards Correcting Visual Aberrations with Computational Light Field Displays", 12 pages, (2012).

Huang et al., "The Light Field Stereoscope, Immersive Computer Graphics via Factored Near-Eye Light Field Displays with Focus Cues", ACM Transactions on Graphics (SIGGRAPH), 12 pages (2015).

Kerr, "Visual resolution in the periphery", Perception & Psychophysics, vol. 9, (3B), 375-386, 4 pages (1971).

Lambooij et al., "Visual Discomfort and Visual Fatigue of Stereoscopic Displays: A Review", Journal of Imaging and Science Technology, 53(3), 14 pages (Apr. 23, 2009).

Lanman et al., "Near-Eye Light Field Displays", NVIDIA Research, ACM SIGGRAPH 2013, Emerging Technologies, 10 pages, Jul. 2013.

Liu et al., "Near eye light field display based on human visual features", Optics Express, vol. 25, No. 9, http://doi.org/10.1364/OE.25.009886, 15 pages (Apr. 20, 2017).

Melzer, "Overcoming the Field of View: Resolution Invariant In Head Mounted Displays", Proc. of SPIE vol. 3362, Helmet- and Head-Mounted Displays III, ed. RJ Lewandowski, L A Haworth, H J Girolamo, 10 pages, pp. 284-293 (Jul. 1998).

Pablo, "More on the kappa angle of the human eye: average values and variability", Pablo Artal Blog, http://.pabloartal.blogspot.com/2013/09/more-on-kappa-angle-of-human-eye.html#:~:text=In average%2C angle kappa is, degrees in the temporal direction., 3 pages, dated Sep. 15, 2013.

Peli, "Visual and Optometric Issues with Head-Mounted Displays", IS&T/OSA Optics & Imaging in the Information Age, Published by The Society for Imaging Science and Technology, pp. 364-369, 6 pages, 1996.

Rolland et al., "Head-Mounted Display Systems", Encyclopedia of Optical Engineering DOI:10.1081/E-EOE-120009801, 14 pages (2005).

Rolland, J.P., "Wide-angle, off-axis, see-through head-mounted display", Univ. of Florida, STARS, https://stars.library.ucf.edu/facultybib2000/2774?utm_source=stars.libary.ucf.edu%2Ffacultybib2000%2F2774&utm_medium=PDF&utm_campaign=PDFCoverPages, pp. 1760-1767, 9 pages, Jan. 1, 2000.

J. Duparre and R. Volkel, "Novel Optics/Micro Optics for Miniature Imaging Systems", Proc. SPIE 6196, Photonics in Multimedia, doi:10.1117/12.662757, 15 pages (Apr. 21, 2006).

G. Kramida, "Resolving the vergence-accommodation conflict in head-mounted displays", IEEE Transactions on Visualization and Computer Graphics, vol. 22, No. 7, pp. 1912-1931 (2016).

Extended European Search Report dated Jun. 25, 2021 in European Patent Application No. 19792025.9.

* cited by examiner

HUMAN VISION-ADAPTED LIGHT FIELD DISPLAYS

FIELD OF THE INVENTION

The application relates to visual displays, and especially to head-mounted and heads-up display technologies.

BACKGROUND

1. References Cited

WO 2015/077718, published 28 May 2015, which is PCT/US 2014/067149 for "Immersive compact display glasses," referred to below as "PCT1".

WO 2016/118640, published 28 Jul. 2016, which is PCT/US 2016/014151 for "Visual display with time multiplexing," referred to below as "PCT2".

WO 2016/118643, published 28 Jul. 2016, which is PCT/US 2016/014155 for "Display device with total internal reflection," referred to below as "PCT3".

WO 2016/118648, published 28 Jul. 2016, which is PCT/US 2016/014163 for "Imaging optics adapted to the human eye resolution," referred to below as "PCT6".

E. Peli, "Visual and optometric issues with head-mounted displays," in IS & T/OSA: Optics & Imaging in the Information Age, (The Society for Imaging Science and Technology, 1996). pp. 364-369. ("Peli 1996").

F. C. Huang, K. Chen, G. Wetzstein "The Light Field Stereoscope: Immersive Computer Graphics via Factored Near-Eye Light Field Display with Focus Cues", ACM Transactions on Graphics (SIGGRAPH), 2015 ("Huang 2015").

F. C. Huang, G. Wetzstein, B. A. Barsky, R. Raskar, "Eyeglasses-free Display: Towards Correcting Visual Aberrations with Computational Light Field Displays", ACM Transactions on Graphics (SIGGRAPH), 2014 ("Huang 2014").

Douglas Lanman and David Luebke. 2013. Near-eye light field displays. In *ACM SIGGRAPH* 2013 *Emerging Technologies* (SIGGRAPH '13). ACM, New York, NY, USA, Article 11, 1 page. DOI: https://doi.org/10.1145/2503368.2503379 ("Lanman 2013").

G. Kramida, "Resolving the vergence-accommodation conflict in head-mounted displays", IEEE Transactions on Visualization and Computer Graphics, vol. 22, no. 7, pp. 1912-4931, 2016. ("Kramida 2016").

M. Lambooij and W. IJsselsteijn, "Visual discomfort and visual fatigue of stereoscopic displays: A review," J. Imaging Sci. Tech., vol. 53, no. 3, pp. 1-14, May 2009. ("Lambooij 2009").

Mali Liu, Chihao Lu, Haifeng Li, Xu Liu, "Near eye light field display based on human visual features", Optical Express, Vol. 25, No. 9, 2017 ("Mali 2017"). C. A. Curcio, K. R. Sloan, R. E. Kalina, and A. E. Hendrickson, "Human photoreceptor topography", J. Comp. Neurol. 292, pp. 497-523, 1990 ("Curcio 1990").

http://pabloarttal.blogspot.com.es/2013/09/more-on-kappa-angle-of-human-eye.html ("Artal").

J. L. Kerr, *Visual resolution in the periphery*, Perception & Psychophysics, 1971, Vol. 9 (3B) ("Kerr").

Douglas Lanman, David Luebke, Near-Eye Light Field Displays, ACM SIGGRAPH 2013 Emerging Technologies, July 2013.

J. E. Melzer, *Overcoming the Field of View: Resolution Invariant in Head Mounted Displays*, SPIE Vol. 3362, 1998.

T. Tsujimura, *OLED displays: Fundamentals and Applications*, Wiley, 2012

The disclosures of all of the above references are incorporated, herein by reference in their entireties.

2. Definitions

| | |
|---|---|
| 3D-pixel | Set of ray pencils whose straight line trajectories in free space virtually cross at a small diameter region or pass very close to it. This region may be perceived by the human eye as a virtual emitting point when all the pencils of the 3D-pixel share the same or similar luminance and color. Usually "3D-pixel" refers to this virtual emitting point. Some 3D pixels are formed by a single pencil, and so all its rays are always sharing the same or similar luminance and color. |
| digital display | Opto-electronic component that modulates the light temporally and spatially, which can be self-emitting as an OLED display or externally illuminated by a front or a backlight system as an LCD or an LCOS. |
| cluster | Set of opixels being imaged by the same lenslet. |
| eye pupil | Image of the interior iris edge through the eye cornea seen from the exterior of the eye. In visual optics, it is referenced to as the input pupil of the optical system of the eye. Its boundary is typically a circle from 3 to 7 mm diameter depending on the illumination level. |
| eye sphere | Sphere centered at the approximate center of the eye rotations and with radius $r_e$ the average distance of the eye pupil to that center (typically 13 mm). |
| field of view | Field of View or FOV; defined as the horizontal and vertical full angles subtended by the virtual screen from the eye pupil center when the two eyes rest looking frontwards. |
| First reference surface | Plane normal to skull's frontwards direction and containing the eye sphere center which is the origin of its x', y' coordinates whose y' axis is in the vertical direction. |
| fixation point | Point of the scene that is imaged by the eye at center of the fovea, which is the highest resolution region of the retina. |
| foveal reference circle | Intersection of a 3-12 mm diameter sphere concentric with the eye sphere center with the first reference plane. This sphere is virtually crossed by the pencils potentially reaching the fovea. |
| gaze vector γ | Unit vector γ of the direction linking the center of the eye pupil and the fixation point. |
| Gazeable region of virtual screen | Region of the virtual screen containing the fixation points for all positions of the eye pupil within the pupil range. It contains the projections from the eye sphere center of all the 3D-pixels that can be gazed. |
| ipixel | Intersection of the straight lines of a pencil with the second reference plane, i.e., the plane x-y. It is the locus at the virtual screen where the light of a pencil virtually comes from. |
| lenslet | Each one of the individual optical imaging systems (such as a lens for instance) of the optics array, which collects light from the digital display and projects it to the eye sphere. The lenslets are designed to lit pencils with the light of its corresponding opixel. The mapping between opixels and pencils induced by a single lenslet is continuous. Each lenslet may be formed by one or more optical surfaces, not necessarily refractive. There is one lenslet per cluster. |
| opixel | Unit of information of the digital display. All the points of a pixel emit always with the same illuminance and color and with a constant angular emission pattern. All the rays emitted by an opixel have the same or similar luminance and color. |
| optical crosstalk | Undesired situation in which one opixel is imaged into more than one pencil. |
| outer region of virtual screen | Region of the virtual screen containing the projections of the 3D-pixels which do not belong to the gazed region of virtual screen, i.e., it is formed by |

-continued

| | |
|---|---|
| | 3D-pixels that can be seen only at peripheral angles greater than zero. |
| pencil | Set of straight lines that contain segments coincident with ray trajectories illuminating the eye, such that these rays have the same (or similar) luminance and color at any instant. This luminance and color is also assigned to the pencil. The pencil must intersect the pupil range, otherwise it wouldn't be viewable. The light of a pencil is virtually coming from its ipixel which is located at the virtual screen. The set of straight lines forming the pencil can be represented by a connected region of the phase space. This set may have a small spatial and angular dispersion. The waist of a pencil may be substantially smaller than 1 mm² and its maximum angular divergence may be below ±10 mrad. The pencils intercept the eye sphere inside the pupil range in a well-designed system. A union of different pencils containing the same information may form a 3D-pixel which is perceived by the human eye as an emitting point located at the spatial region where all its pencils virtually intersect. A given pencil is typically forming part of a 3D-pixel during a limited period of time. |
| pencil print | Intersection of the straight lines of a pencil with the first reference plane, i.e., the plane x'-y'. This region is also called $P_p$. |
| peripheral angle | Angle β formed by a certain direction with unit vector θ and the gaze unit vector γ, i.e., $\beta = \cos^{-1}(\theta \cdot \gamma)$ |
| pupil range | Region of the rolling pupil sphere comprising all admitted eye pupil positions. The maximum pupil range is an ellipse with angular horizontal semi-axis of 60 degs and vertical semi-axis of 45 degs relative to the front direction, but a practical pupil range for design can be a 40 to 60 deg full angle cone, which is the most likely region to find the pupil. |
| surface S1 | Entry surface of the lenslet array that is closer to the digital display. |
| surface S2 | Exit surface of the lenslet array which is closer to the eye. |
| View (of the virtual screen) | A view of the virtual screen from a point is the image of the virtual screen seen by a pinhole camera at that point, i.e., the set of ipixels whose pencils pass through that point. |
| virtual screen | Angular region subtended by the union of all 3D pixels from the eye center or, alternatively, the corresponding region on a sphere centered at the eye sphere's center with a large radius (typically from 1.5 m to infinity). This region of the sphere is also called second reference surface, and sometimes it is approximated by a plane with coordinates x, y whose origin is the intersection point of the line passing through the eye ball sphere center and pointing in the skull's frontwards direction. |

3. State of the Art

Color digital displays are temporal and spatial light modulators able to control the illuminance (measured in lumens per square meter, i.e., lm/m²) across its display surface. Typically this surface contains a multitude of small regions, called pixels, within which there are smaller regions, sometimes called subpixels, each one of them emitting a narrow band spectra (Red R, Green G or Blue B, typically). The illuminance of the different points of a subpixel is approximately equal. With a digital display it is possible to control the illuminance of each subpixel and vary it with time. Time variation is typically done at constant intervals called frame time. If the size of pixels and the frame time are small we can say approximately that we can control the illuminance function I(x, y, t) of any of the colors of the subpixels for any point (x,y) across the display surface and for any instant t.

Henceforth, unless otherwise specified, we are not going to consider the color and time dependence of the digital display.

Ideally, a (monochrome) Light Field Display (LFD) is a device that controls the luminance (typically measured in nit=cd m⁻²=lm m⁻² sr⁻¹), which is also called brightness or plenoptic function of the light emitted at its surface. An LFD can potentially improve visual comfort in three-dimensional visual experiences (such as Virtual Reality VR) by reproducing accurately all depth cues, and therefore addressing the vergence-accommodation conflict inherent to most of stereoscopic displays. For more detail about this vergence-accommodation conflict see, for instance, "Peli 1996", "Kramida 2016" and "Lambooij 2009". The plenoptic or luminance function is a function L(x, y, p, q) of both the spatial location of origin of rays (x, y) and its angular direction (p, q) at that origin (p, q are the direction cosines of the ray with respect two Cartesian axes x, y respectively). The direction of the rays is sometimes determined by the point (x', y') of intersection of the ray with another z=constant plane (where z is perpendicular to the display surface) instead of the variables p, q.

FIG. 1 illustrates this by showing exemplary 3D objects 100, reference plane 101 (x, y) and another plane 102 (x', y'). An exemplary ray 104 originates at point 103 on reference plane 101 and impacts plane 102 at position 105. In this case L may be expressed as L(x, y, x', y'), a function of ray locations (x, y, x', y') at these two planes 101 and 102. In general both planes are parallel and the relationship between (p, q) and (x', y') can be easily derived since the vectors (p, q, r) and (x'-x, y'-y, D) are parallel (r is the third direction cosine $p^2+q^2+r^2=1$ and D is the distance between planes) and (x'-x)/p=(y'-y)/q=D/r.

No actual LFD can produce a prescribed four-variable function L(x, y, x', y') exactly, but just approximations to it. FIG. 2 illustrates one such approximation: for instance, Huang's stereoscope ("Huang 2015") is based on two stacked Liquid Crystal Displays (LCD) 204 and 205, illuminated by a backlight 207. FIG. 2 also shows virtual 3D objects 200, emission point 208 on backlight 207, pixel/point 201 on first display 204, pixel/point 202 on second display 205, and point 203 at pupil plane 206. Display 204 is at a distance d from display 205 and at a distance D from pupil plane 206. Also shown is eye pupil 207 of a human eye receiving the illumination from the LFD. The eye pupil 207 is located at the pupil plane 206.

Since both LCDs are discretized in pixels (meaning that the transmittance is identical for all the points of the same pixel), the resulting LFD is also discretized in sets of thin pencils of rays each one of them containing all the rays connecting a pixel of first display 204 with a pixel on second display 205. The pencils are represented in the 4 dimensional space x-y-x'-y' by a small region of this space containing the rays (x, y, x', y') such that the point (x, y,) belongs to a given pixel of the first display 204 and (x', y') belongs to a pixel of second display 205. In the general case, we will call pencil or ray pencil to the set of rays (straight lines) sharing always the same luminance and color (approximately). These pencils constitute the LFD units similarly as the sub-pixel is the image unit of a conventional display. Then, the LFD emission is composed of pencils instead of the sub-pixels of conventional displays. The pencil definition is done using the straight lines coincident with the ray trajectories in the air before reaching the eye volume air as medium, and those straight lines will be eventually extended before the VR lens or after the eye.

In Huang 2015's example, the plane of one of the LCDs is the plane (x, y) so its transmittance can be written as A(x, y). The other LCD, which is piled in front of the first one with a depth gap d, has a transmittance B(x", y"). That is, A and B are the images that must be displayed in those LCDs to produce a light field L(x, y, x', y'). Note that the coordinates x" and y" can be written as functions of x, y, x', y', d and D since the vectors (x"−x, y"−y, d) and (x'-x, y'-y, D) are parallel. Then the luminance of both LCDs plus the backlight can be written as the product of both transmittances A(x, y)·B[x"(x, y, x', y'), y"(x, y, x', y')], where we are assuming that the backlight 207 has a Lambertian emission with unit luminance. Therefore, Huang 2015's approach consists in factorizing as accurately as possible the 4-variable function L(x, y, x', y') as the product of two 2-variable ones A and B. Observe that the product AB is a function of (x, y, x', y') and that both A and B must be between 0 and 1. The way Huang 2015 et al. propose to compute the functions A and B is minimizing a merit function M, which is an integral on the variables x, y, x', y', that compares the goal luminance L(x, y, x', y') (normalized to 1) with the product AB: $M=\int_R (L-AB)^2 dxdydx'dy'$. Notice that in Huang 2015's computation of the functions A and B for every ray (and thus for every pencil) in the light field is equally important provided it is in the domain of integration R, or, to be more precise, every ray is weighted in the preceding integral by the product of areas dxdydx'dy'.

In another type of LFD ("Lanman 2013"), an array of identical microlenses is placed in front of a high-resolution display, separated by approximately the focal length f of the micro lenses.

FIG. 3 illustrates this prior art embodiment showing virtual 3D objects 300, display 301, microlens array 302, pupil plane 303 and detailed view 304.

The projected area of the microlens array is approximately identical to the display active area. The number of microlenses m is much smaller than that of pixels so there are k pixels (k>>1) under the normal projection of each microlens on the display plane. Let's call cluster of a microlens to this set of pixels. If d is the microlens pitch, the LFD at the plane of the microlenses is discretized in multiples of d and the k pixels of each microlens cluster are used to create the prescribed luminance in k discrete directions per each microlens position. A pencil in Lanman's LFD is formed by the rays issuing from the aperture of a microlens with directions lit by a single pixel. So finally we get that there m times k pencils whose luminance is going to be controlled by the display. Let I(x,y) be the normalized illuminance function of the display. Then the normalized four-variable luminance function L(x, y, p, q) is approximated by L(x, y, p, q)≈I(d·(int(x/d)+½)+f·p, d·(int(y/d)+½)+f·q), where int(x) means the integer part of x. This approximation is assuming a square microlens array and is limited to p and q values that fulfill |f·p|<d/2; |f·q|<d/2.

For HMD applications, the light field is going to illuminate one or both user's eyes (their pupil ranges to be more precise) and the eye ball center is at fixed position relative to the display. State of the art LFD techniques do not take into account important aspects of the human vision. For instance, the human eye is able to perceive high resolution only for rays focused on the fovea (area located at the retina—back of eye globe—, aligned with the pupil and eye center): rays focused outside this area are perceived blurred. The eye resolution worsens as the peripheral angle of the incoming radiation increases, i.e., as the image point on the retina is further from the fovea. This is due to variable density of photoreceptors in the retina ("Curcio 1990").

SUMMARY

HMD devices intended for mass production must use a relatively inexpensive optic, which means a few optical parts in general made by plastic injection. Then, the degrees of freedom in the optical design are scarce and should be used wisely. In particular these degrees of freedom should not be wasted in improving the image quality of rays that will never reach the fovea. The design degrees of freedom should be used according the best expected eye resolution of the retina point where they could land.

When there is no information about the fovea position (for instance in HMD with no gaze tracking) then we can weigh the rays proportional to the average human resolution of the point of the retina where they are sent, for a given gazing position, times the probability to find the eye at that gazing position and averaging for all possible gazing positions. A ray impinging on the eye sphere can be characterized by the point of intersection $r_e \alpha$ ($\alpha$ is a unit vector and $r_e$ is the eye sphere's radius) and its direction $\theta$ (also a unit vector). Let $\gamma$ be the (unit) gaze vector, $p(\gamma)$ the probability density function to gaze at direction $\gamma$ and let $d\Omega_\gamma$ be the differential of solid angle so $\int p(\gamma) d\Omega_\gamma = 1$. This probability density function has been studied for instance in "A. Terry Bahill, Michael R. Clark, Lawrence Stark, "Dynamic overshoot in saccadic eye movements is caused by neurological control signal reversals," Experimental Neurology 48-1 (1975)." For practical purposes it is often assumed that $p(\gamma)=0$ if $\gamma$ is outside a cone of half-angle 30 deg around the front direction, i.e., the gazeable region is a cone of 30 deg and the probability is evenly shared among the directions within that cone. Observe that this doesn't mean that the FOV is a cone of angle 30 deg. If $V_e$ is the human eye visual acuity as a function of the angle formed by the incoming direction and the gazing vector (we are implicitly assuming here a negligible kappa angle, which is not always true, see "Artal") and P is the transmission function of the pupil (P=1 if the ray impinges within the pupil and 0 otherwise) then the weighting function should be $w(\alpha,\theta)=\int P(\alpha \cdot \gamma) V_e(\theta \cdot \gamma) p(\gamma) d\Omega_\gamma$. The expenditure of degrees of freedom in the design procedure should be approximately proportional to this weighting function so the optical design has better image quality for the rays potentially focused on the fovea than for the remaining rays. This is important for the design process since the rays potentially going to the fovea form a small subset of the rays reaching the pupil range. This aspect of human eye response is taken into account in HMD using non LFD, such as the ones disclosed in PCT1 and PC6. When the optical system resolution is a function of $\alpha$ and $\theta$ such that it improves or deteriorates similarly as $w(\alpha,\theta)$ we say that the optical resolution is matched to the average eye resolution.

When there is information about the fovea position, then the set of rays reaching the fovea (which is a subset of the set of rays potentially reaching the retina) are known and this information can be used to improve further the image quality received by the fovea, for instance by improving the digital display information of the pixels emitting light sent to the fovea. In general the information about the actual fovea position at a given instant cannot be used in the optical parts design because the optics does not have moveable parts or components varying their optical characteristics with time fast enough to follow fovea's movements.

As we have said, both in Huang 2015's and Lanman's approaches, all pencils have the same importance in the optimization process and calculation, i.e. the weighting function is the same for all rays. Consequently the LFD system shows the same performance for all the pencils in the image, independently on whether they may reach the fovea or outside it.

Mali 2017 has recently introduced a factorized LFD similar to Huang 2015's but considering the eye in a fixed position and discretizing the (x,y) coordinates non-uniformly according to the human eye resolution. Since such discretization is fixed to the eye and not to the user's skull, Mali's approach requires eye-tracking to be implemented.

In contrast, in the embodiments described in the present application the LFD is optimized according to the ray weighting function defined before so the pencils that eventually hit the fovea are the ones consuming more degrees of freedom in the design which usually leads to get the best performance. By doing that, the quality of the image produced by the light field is much better for the actual observer. We are assuming that the LTD is rigid with respect the user's skull and so is the center of the eye (approximately) but not the eye pupil, nor the fovea since the eye globe may rotate inside the skull's eye cavity. The rays that may eventually be imaged in the fovea are those that enter into an eye pointing towards the central part of this eye globe, so they would pass near to the eye globe center if no eye was there. To be more precise we can say that for these rays being focused into the fovea they have to cross the eye pupil and they should impinge the eye so they would pass at a distance to the center of the eye globe not significantly greater than the eye pupil radius if no eye were there. The eye pupil diameter varies from 2 to 7 mm (see for instance Andrew B. Watson, John I. Yellott; A unified formula for light-adapted pupil size. *Journal of Vision* 2012; 12(10):12, doi: 10.1167/12.10.12). We can set it at 4 mm for practical purposes. Note that when the crystalline lens is accommodated to image the infinity in the retina, the fovea region covers approximately an angle cone of 5 degrees full-angle, so the rays imaged in the fovea would form approximately a conical tube of 4 mm diameter with a small angular divergence (±2.5 deg) if the eye cavity were empty. When the crystalline is accommodated to other distances the angular divergence of the rays imaged in the fovea is a different bundle but still their trajectories inside the eye cavity would form a conical tube with small angular divergence (almost a 4 mm diameter cylindrical tube) if the eye cavity were empty.

The relative acuity of the different parts of the retina is very different but there is no clear definition of the fovea in terms of that acuity. For this reason we will use the name fovea not with the clinical definition but just as the region of acuity above a certain level and consequently its size will not be always 5 degrees but from 1 to 7 degrees depending on the particular application.

Consider a Light Field (with plenoptic or luminance function $L(x, y, p, q)$), where x and y are 2 Cartesian coordinates and p, q are their respective optical direction cosines) which is either being sampled to be shown later or being shown to a human eye in a Head Mounted Display, for instance. In the same way as an illuminance distribution $I(x,y)$ is restored with a set of small surface regions (real or virtual) of constant illuminance and color called sub-pixels, a light field can be restored with a set of tiny pencils of rays (with approximately constant luminance and color) that we call simply pencils. The restoration process in both cases is imperfect due to the discretization done during both: sampling and displaying. In a conventional display the image is restored at a given distance from the observer, unlike the case of a LFD which can display pixels at different distances from the viewer and change these distances over time. These image pixels are called 3D pixels. The virtual location of the 3D pixel is given by the waist of the bundle of rays of the pencils forming it considering all these rays as straight lines extended from the straight portions of the ray trajectories in free space between the LFD and the eyes. In general, a 3D pixel uses more than one pencil per 3D pixel (otherwise its location is not selectable). For a given gazing direction, a pencil may be split into rays that enter the pupil and rays that do not. The rays (portion of a pencil) that enter the pupil may or may not reach the fovea. Only the part of the pencils reaching the fovea (and thus crossing the eye pupil) contributes to the location of the 3D pixel via accommodation of the eye. A conventional display can also be considered as a particular case of LFD in which every pencil is formed by the rays issuing from a real or virtual surface region called ipixel whose location coincides with that of the 3D-pixel. In this particular case there is a single pencil per 3D-pixel and, of course, the distance from that 3D-pixel to the observer is not selectable and in general is identical for all 3D-pixels.

We assume that the plenoptic function is defined with respect a reference system (x, y, z) which is fixed to the user's skull, so the human eye moves relative to this reference system, but the eye globe center is (approximately) fixed to it. Our invention consists in a Light Field discretization strategy which can be successfully used in (1) sampling, recording, transmitting and/or storing a light field to be displayed in a HMD or (2) in displaying a light field.

(1) For computing, sampling, recording, transmitting and/or storing a light field, the strategy consists of sampling a Light Field (of a real or rendered scene) with a variable sampling step so the sampling is more dense for the pencils potentially going to the fovea and/or coming from the gazeable region of the virtual screen which use to be at the central part of the scene being sampled. The pencil density may gradually decrease for pencils with decreasing likelihood to hit the fovea, i.e., pencils which more often hit the retina outside the fovea. The pencil density may also decrease gradually for the pencils coming from the non gazeable region of the virtual screen (usually the peripheral regions of the scene) as their ipixels are further away from the gazable region. The benefit of this strategy is using more efficiently the limited quantity of information needed to transmit, to store or to recover the Light Field.

(2) For displaying a light field, this strategy consists of designing the optics, display and/or luminance calculation of a LFD so the pencils potentially focused on the fovea and/or coming from the gazeable region of the virtual screen, attain the maximum resolution (measured as pixels per degree detected on the retina of a normal human eye) in comparison with the remaining parts of the image (so letting the rest of rays have a graded minor influence on the optics and display design and on the luminance calculation). Only the pencils potentially focused on the fovea and/or coming from the gazeable region of the virtual screen are used to generate 3D-pixels that use more than 1 pencil per 3D-pixel. The remaining 3D-pixels use just one pencil as ipixels in a non Light Field stereoscope. The benefits of this strategy are two-fold: First, the design degrees of freedom of the optical system are used more efficiently allowing to have an optical system with an optical resolution matched to the typical human eye resolution. Secondly, the number of pencils is minimized because only the rays potentially reaching the fovea can be used for accommodation. Minimizing the number of pencils also minimizes the number of pixels of the digital display feeding the LFD (Lanman's architecture) or optimizes the calculation of the transmittances in Huang 2015's architecture.

We call Human-Vision-Adapted Light Field (HVALF) to a LF following this the above described Light Field discretization strategy.

BRIEF DESCRIPTION OF DRAWINGS

The above and other aspects, features and advantages will be apparent from the following more particular description of certain embodiments, presented in conjunction with the following drawings. In the drawings.

DETAILED DESCRIPTION

Figure 1:
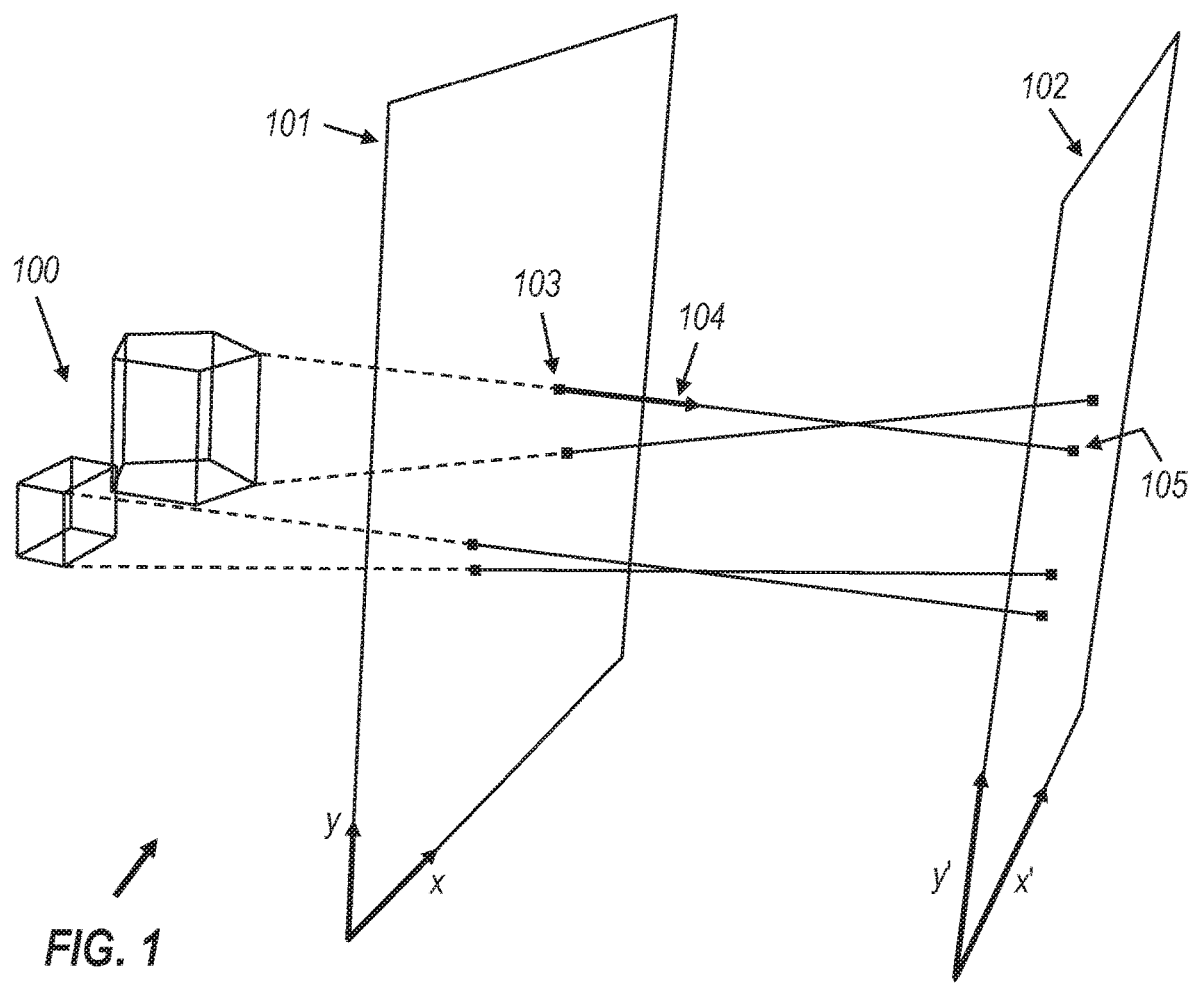
FIG. 1 shows a schematic view of a general light field display, generated by a set of 3D objects, when crossing two reference planes x,y and x',y'.

A better understanding of various features and advantages of the present invention will be obtained by reference to the following detailed description of embodiments thereof and the accompanying drawings, which set forth illustrative embodiments that utilize particular principles of the present disclosure. Although these drawings depict embodiments of the contemplated methods and devices, they should not be construed as foreclosing alternative or equivalent embodiments apparent to those of ordinary skill in the subject art.

The described embodiments are in the area of virtual reality projection devices, in which in general two fixed or moving Light Fields are projected on the eyes of a user. The two Light Fields are preferably different, to provide stereoscopic visualization of depth. The described embodiments aim to provide simultaneously an ultra-wide field of view, high resolution, low weight, and small volume. The wide field of view, combined with the feedback from a head-tracking sensor to compensate for head movement, can make it possible to present a three-dimensional virtual reality fixed relative to the ground, which will provide a more complete immersive experience.

For an effective immersive experience, the ultra-wide field of view is to be provided independently of the eye pupil orientation relative to the head. This approach considers the pupil range as a design parameter, preferably defined as the region of the eye sphere (more exactly a region of the rolling pupil sphere) formed by the union of all the eye pupil regions generated when the eye is rotated. It is then a spherical shell in good approximation. If all physically accessible pupil positions for an average human are considered, the boundary of the maximum pupil range is approximately an ellipse with angular horizontal semi-axis of 60 degs and vertical semi-axis of 45 degs, relative to the front direction and subtended at the center of rotation of the eye. However, for a practical immersive design, an elliptical cone of semi-axis in the 15 to 30 degrees range can be considered sufficient.

We have been implicitly assumed that the axes of the eye's rotational symmetry should preferably be coincident with the gaze vectors, i.e., with the straight lines linking the center of the eye pupil and the fixation point. These straight-lines pass near the center of rotation of the eye, but not exactly through it. The angle formed between the gaze vector and the pupillary axis (line perpendicular to the cornea that intersects the center of the entrance pupil) is called angle kappa. "In average, angle kappa is around 4 degrees horizontally in the temporal direction. However, some eyes are nearly on axis, and even with the kappa angle negative (towards the nasal direction), and in others it can be as large as 8 degrees in the temporal direction. The same variability appears in the vertical direction, ranging from 4 degrees superior to inferior, although in average eyes are vertically centered (kappa angle zero vertically)" ("Artal"). Besides that, there is no true center of eye rotation, because the vertical and horizontal movements have different centers of rotation, 12 mm and 15 mm posterior to the cornea, respectively. This can be approximated to a point at approximately 13 mm posterior to the cornea, in a direction tilted by the kappa angle with respect the papillary axis. We call this point center of the eye sphere. The skilled reader will understand from the descriptions herein how to refine the design to take into account that these straight-lines do not meet exactly at one point.

The pupil range gives a spatial boundary for the point of entrance of the rays into the eye. This boundary together with an angular limitation of ±50 degrees (approximately) around the gazing vector for any point of the pupil range gives a complete phase-space boundary of the rays potentially reaching the retina. For a ray being actually focused on the retina it is additionally necessary that it impinges the pupil range inside the circle where the eye pupil is positioned. The full set of rays potentially reaching the retina defines the domain of the plenoptic function L.

The main interest of LEDs for HMD is to avoid the visual fatigue due to the discrepancy appearing between the convergence function and the accommodation function. Convergence involves the differences between the images sent to both eyes. Accommodation is a function involving the eyes separately. The accommodation function is effective when the observation distance is smaller than 1~2 m. Human ocular accommodation functions as a "closed-loop" negative feedback controlled mechanism where sensory information falling on the retina is processed in the brain to change the optical power of the eye until the desired part of the image is focused (Shrikant R. Bharadwaj, "Accommodation Mechanisms" in Handbook of Visual Optics, P. Artal ed., CRC Press, 2017). To achieve the adequate accommodation in a LFD it is necessary that several pencils of rays imaged on the fovea be virtually coming from a certain point. All these pencils will be almost parallel. The divergence between them depends on eye pupil diameter and virtual point distance to eye. For instance with an eye pupil diameter of 4 mm, a virtual point located at 750 mm will be displayed by pencils having a divergence not greater than $\tan^{-1}(4/750) \approx 0.3$ degrees. An important question is how many of these pencils are needed to achieve the adequate accommodation. Huang 2014 suggests that a set of 3×3 pencils is enough to achieve a plausible approximation of retinal blur which allows the brain to find the adequate accommodation.

As said before, not all of the rays impinging the eye sphere are equally important for human vision. The most important rays are those focused in the fovea, followed by the remaining rays crossing the eye pupil. The rest of the rays, i.e., those hitting the pupil range outside the eye pupil are useless since they don't reach the retina. The relative importance of the rays can be quantified as proportional to the visual acuity of the position of the retina where they hit. The visual acuity of human vs. the location on the retina is a well know function (see for instance https:en.wikipedia.org/wiki/Visual_acuity or FIG. 5-14 in Grüsser, Grüsser-Cornehls: Physiology of vision, in: Fundamentals of Sensory Physiology, $3^{rd}$ edition, 1986 or Linda Lundström and Robert Rosén, "Peripheral aberrations" in Handbook of Visual Optics, P. Artal ed, CRC Press, 2017). This function has a strong maximum peak at the center of the fovea and a noticeable notch reaching 0 at the so called blind spot. The peak of this function reaches 1 (arc minutes)$^{-1}$ in a very narrow range of 1.5 degrees approximately. When the eye is focused at infinity the visual acuity $V_e$ is approximately only function of the peripheral angle $\beta = \cos^{-1}(\theta \cdot \gamma)$.

When there is no knowledge of the eye pupil position (only that it must be inside the pupil range), then the importance w of a ray (which can be characterized by 4 coordinates such as x, y, x', y' or, alternatively, by the 2 unit vectors $\alpha, \theta$) for human vision can be set proportional to the average value of the visual acuity $V_e$ for that ray when the eye is gazing at direction γ times the probability density function to find the eye pupil at that position p(γ) and times the pupil transmission. We assume that the visual acuity $V_e$ depends only on the angle formed by the incoming ray and the gazing vector, i.e., depends only on $\beta = \cos^{-1}(\theta \cdot \gamma)$. The averaged value should be taken over all possible pupil positions within the pupil range $w(\alpha, \theta) = \int P(\alpha \cdot \gamma) V_e(\theta \cdot \gamma) p(\gamma) d\Omega_\gamma$, where, as said before, $d\Omega_\gamma$ is a differential of solid angle and is the $P(\alpha \cdot \gamma)$ transmission function of the pupil. The integral is extended over the pupil range.

Although saccadic eye movements of 45° or more are possible, in natural viewing such eye movements are extremely uncommon: excluding very tiny eye movements (<1°), nearly 90% of saccadic eye movements have amplitudes of 15° or less, with similar patterns observed in the horizontal, vertical, and oblique directions (Andrew J.

Anderson, "Eye Movements" in Handbook of Visual Optics: Fundamentals and Eye Optics, Volume One, P. Artal ed., CRC Press 2017). Additionally, as explained in PCT6, due to the vignetting produced by the clear aperture of the exit surface of the lens surface closest to the eye, the peripheral regions of the digital display in a conventional HMD are non-gazeable (can only be seen with the peripheral vision). This result is defining the pupil range which we usually set at ±20 to ±35 deg to be safer.

For optical design purpose we can assume that the probability $p(\gamma)$ to find the eye pupil at some position is constant or has a small variation within the pupil range. In this case, the most important rays share in common that they point towards the central part of the eye when they hit the eye globe, or, in other words, if no eye was inside the eye cavity, then all of these rays would pass near the eye center, being the closest to center the most important ones (approximately).

Figure 4:
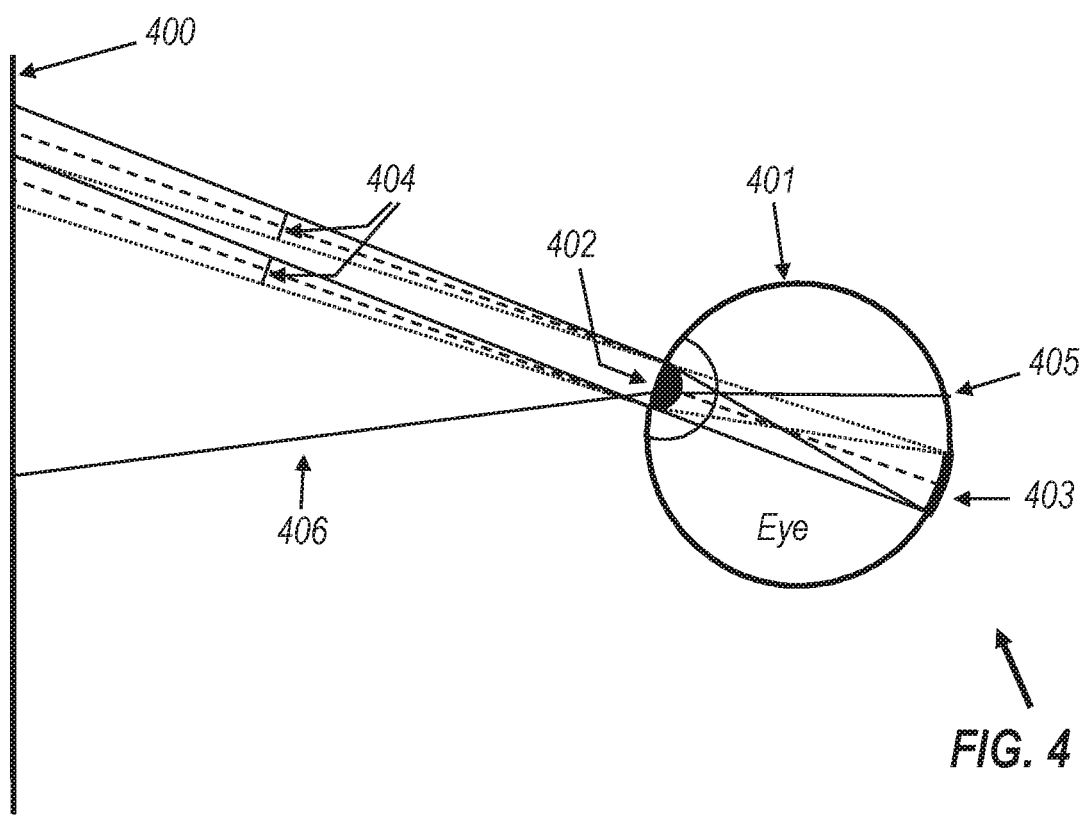
FIG. 4 illustrates how the human eye works. With the eye relaxed (focused at infinity), the rays crossing the pupil so the angles 404 with the front direction are within ±2.5 deg approximately are the ones that reach the fovea (higher resolution area). The remaining rays reach the retina outside the fovea (lower resolution area).

FIG. 4 illustrates some of the characteristics described above for the human eye. Element 400 is a light field display (LID) emitting bundles of rays spanning a small angle 404 that enter the eye through pupil 402 and are focused on the fovea 403 at the back of the eye ball 401. Bundles of rays 404 focused on the fovea 403 require high resolution. Also shown is ray 406 that is focused at position 405 outside the fovea and therefore does not require high resolution.

Human-Vision-Adapted Light Field HVALF

We call Human-Vision-Adapted Light Field HVALF to a light field pencil discretization whose pencil density is maximum for the set of pencils that can potentially be imaged into the fovea and decreases gradually as the closest-to-the-fovea retina image point of the pencil is further from the fovea. To be more precise, consider a space x-y-x'-y' such that x, y are 2 surface coordinates on a sphere of big radius centered at the eye sphere's center which will be called virtual screen and such that x', y' are another 2 surface coordinates on a plane containing the eye center and normal to a straight line defining the front direction of the eye. These coordinate systems are fixed relative to the skull.

The domain of definition of the plenoptic function is a region of this space x-y-x'-y'. This domain represents at maximum the full set of rays potentially reaching the retina when the eyes rotates. In practice this domain is the set of rays potentially crossing the pupil (for any pupil position within the pupil range) which come from the region of x,y subtending the FOV angle at the center of the eye. When a light field is discretized, this domain is divided in regions called pencils, each one of them containing a 4-parameter set of rays (each ray is represented by a point of the x-y-x'-y' space). In the same way as in the case of conventional displays where a 2D image is discretized in sub-pixels and the rays issuing from the same sub-pixel have essentially the same luminance L and color, in the case of LED, the plenoptic function is discretized in pencils and the rays belonging to the same pencil have essentially the same luminance L and color.

Figure 5:
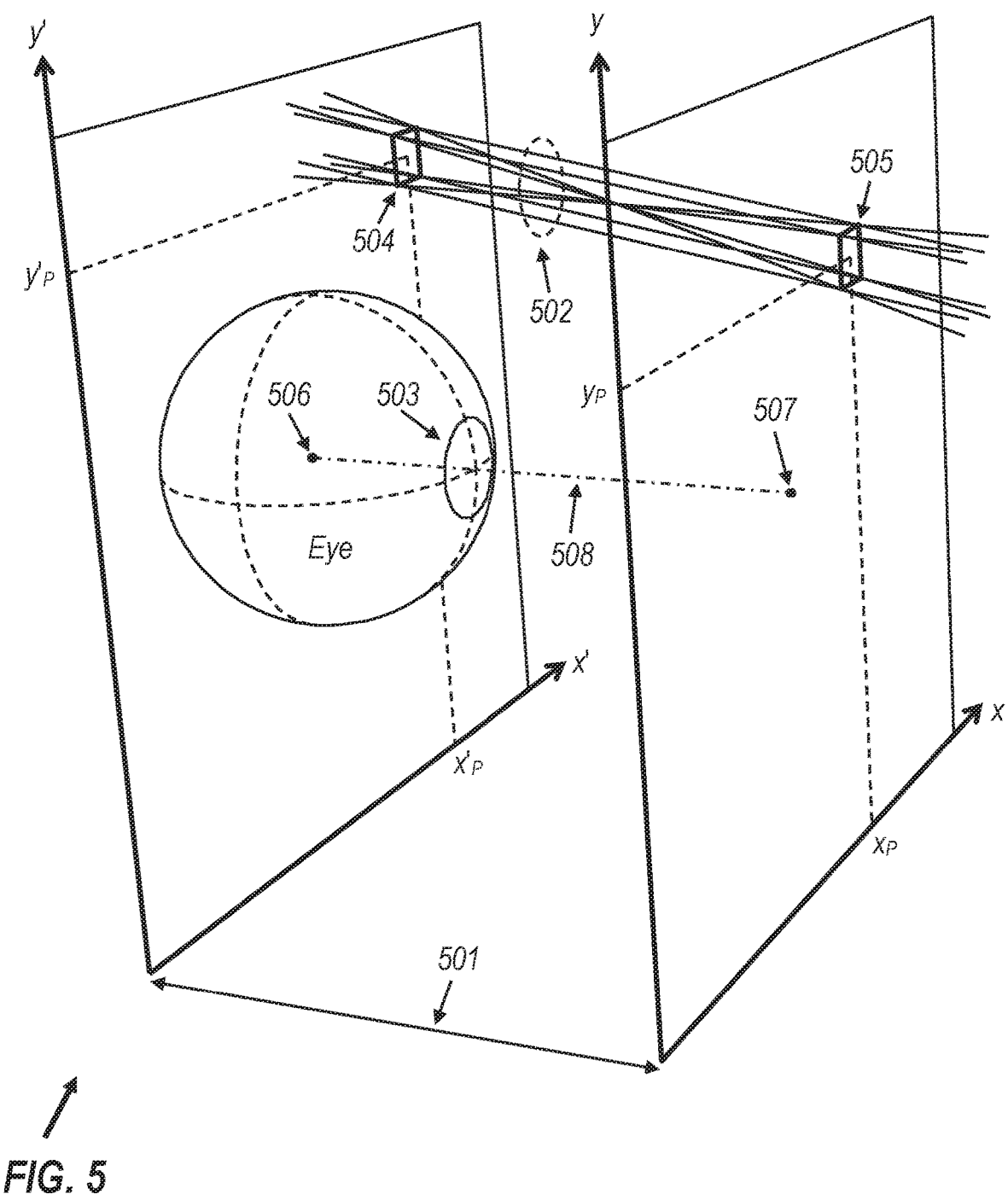
FIG. 5 shows plane x',y' through the center of the eye and surface x,y at a large distance (not to scale) from the eye. These two sets of coordinates may be used to define light rays crossing them.
Figure 6:
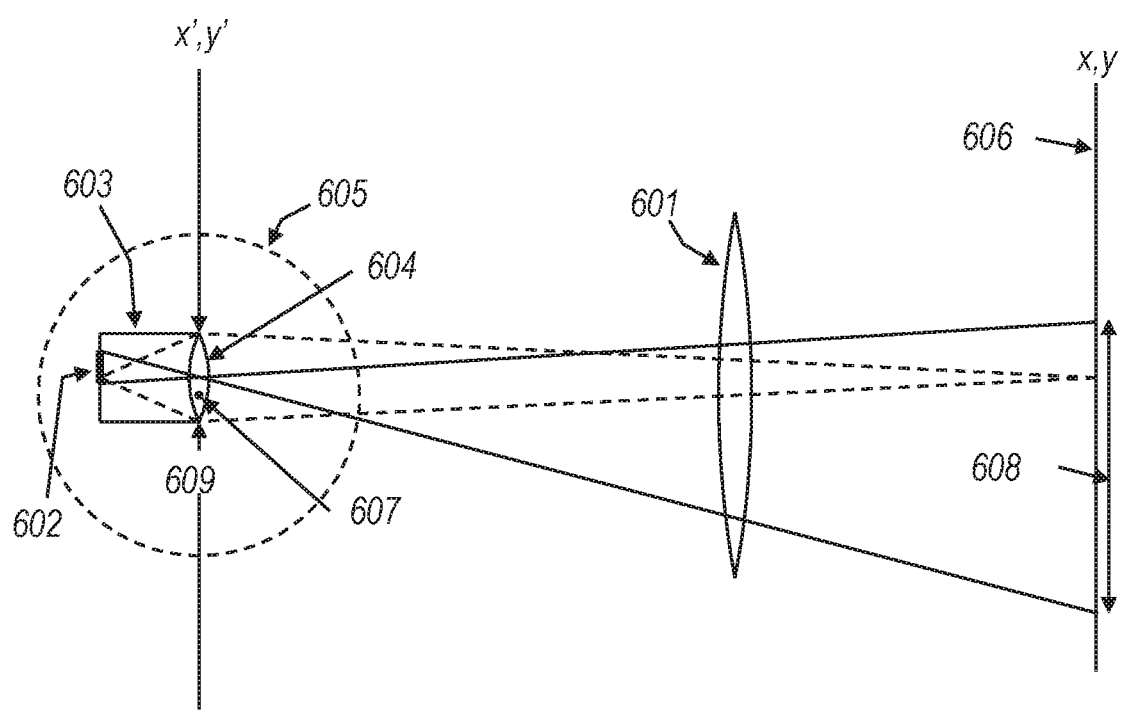
FIG. 6 shows an apparatus for measuring pencils density.

FIG. 5 illustrates this configuration showing plane x',y' through the center of the eye sphere 506 and perpendicular to the frontwards direction, and surface x,y at a large distance $\Delta$501 (not to scale in this drawing) from the eye. Let 502 or $\wp$ be a generic pencil. Its ray representation forms a region of the x-y-x'-y' space around the point $x_P, y_P, x'_P, y'_P$. Only those pencils that enter the eye pupil 503 will be visible so 502 is not visible. The eye is gazing frontwards in the example of FIG. 5 and so the pupil is normal the straight line 508. Each pencil is a 4-parameter set of straight lines intersecting the plane x',y' at region 504 and surface x,y at region 505. Regions 504 and 505 are not necessarily rectangular. The intersection of the pencil with the plane x',y' is called ipixel and the intersection with the surface x,y is called pencil print $P_p$. The intersections are calculated with the straight line extension of the free space trajectories of the rays, i.e., as if the eye cavity were empty.

The origin of coordinates x',y' is at the center of the eye 506 and the origin of coordinates x,y is at position 507 on line 508 perpendicular to plane x',y' and surface x,y. Note that the pupil 503 may rotate relative to the center of the eye 506.

A HVALF is a light field discretization whose pencil distribution on the x,y virtual screen and on the x',y' plane is such that density of pencils on the x',y' plane, or on the x,y virtual screen (preferably on both surfaces), decreases as the distance to the origin increases. A HVALF whose pencil density is not only decreasing from the origin in the x',y' plane but is also decreasing from the origin in the x,y virtual screen is doing a better use of the available pencils. This strategy allows an increase in the perceived resolution for the same number of pencils when it is compared with the conventional strategy where the density of pencils, both at the virtual screen and at the pupil range is approximately constant.

Let's define the pencil density in phase space at the point $x_a, y_a, x'_a, y'_a$ as the number of different pencils found among the rays of the phase space region $(x-x_a)^2 + (y-y_a)^2 \le R^2$, $(x'-x'_a)^2 + (y'-y'_a)^2 \le R'^2$ divided by the phase space volume defined by the rays intersecting those two circles. R and R' are constants, for instance R'=2 mm and $\tan^{-1}(R/\Delta)=1.5$ deg, where $\Delta$ is the distance from the center of the eye to the virtual screen. R and R' should keep their values if several pencil densities are to be compared.

One possible way to measure the pencil density at a point $x_a, y_a, x'_a, y'_a$ is by lighting each pencil one by one and collecting the radiation of the pencils intercepted by a circular nonimaging detector with radius R' centered at $x'_a, y'_a$ and placed at the plane x',y'. In order to simulate also the aperture stop with radius R placed at the point $x_a, y_a$ of the virtual screen, the optical arrangement of FIG. 6 can be used. Element 601 is the optic creating the light field with pencils emitted leftwards and whose density we wish to measure. Said optic 601 creates a virtual image 606. This optical arrangement consists of a thin lens 604 with circular aperture 609 of radius R' together with a shield 603 and a photodiode sensor 602 with circular active area of radius r', which is placed at a distance from the thin lens 604 such that the photodiode only receives radiation coming from points of the virtual screen within the circle 608, i.e., the circle $(x-x_a)^2 + (y-y_a)^2 \le R^2$. The lens aperture 609 is at the plane x',y' containing the center 607 of the eye 605. For example, if R'=2 mm, $\tan^{-1}(R/\Delta)=1.5$ deg and $\Delta$=2 m, then a lens with aperture diameter 4 mm and effective focal length f=19.3 mm with a circular photodiode of 1 mm diameter (active area) will achieve the desired performance if the photodiode is placed at the appropriate plane. This photodiode should be movable across this plane normal to the lens axis to be able to scan different values of $x_a, y_a$ and the whole optical arrangement should be movable so the lens aperture 609 is moved across the x',y' plane to scan different $x'_a, y'_a$ values. The simultaneous detection of several pencils can be done by lighting each pencil with chopped light of different chopping frequencies. By analyzing the photodiode photocurrent, for instance with a spectrum analyzer, it is possible to detect the different chopping frequencies of the collected radiation and so to detect the different collected pencils in a similar way as a tone decoder does.

Eye Box Tolerance

The eye box of a viewing optics is defined as the region where the eye pupil can be located to have a satisfactory vision of the image displayed. Since the eye can rotate, a better characterization of the allowable eye positions with respect to the display is given by determining the allowable location of the eye center plus the solid angle including the allowable range of directions.

Figure 7:
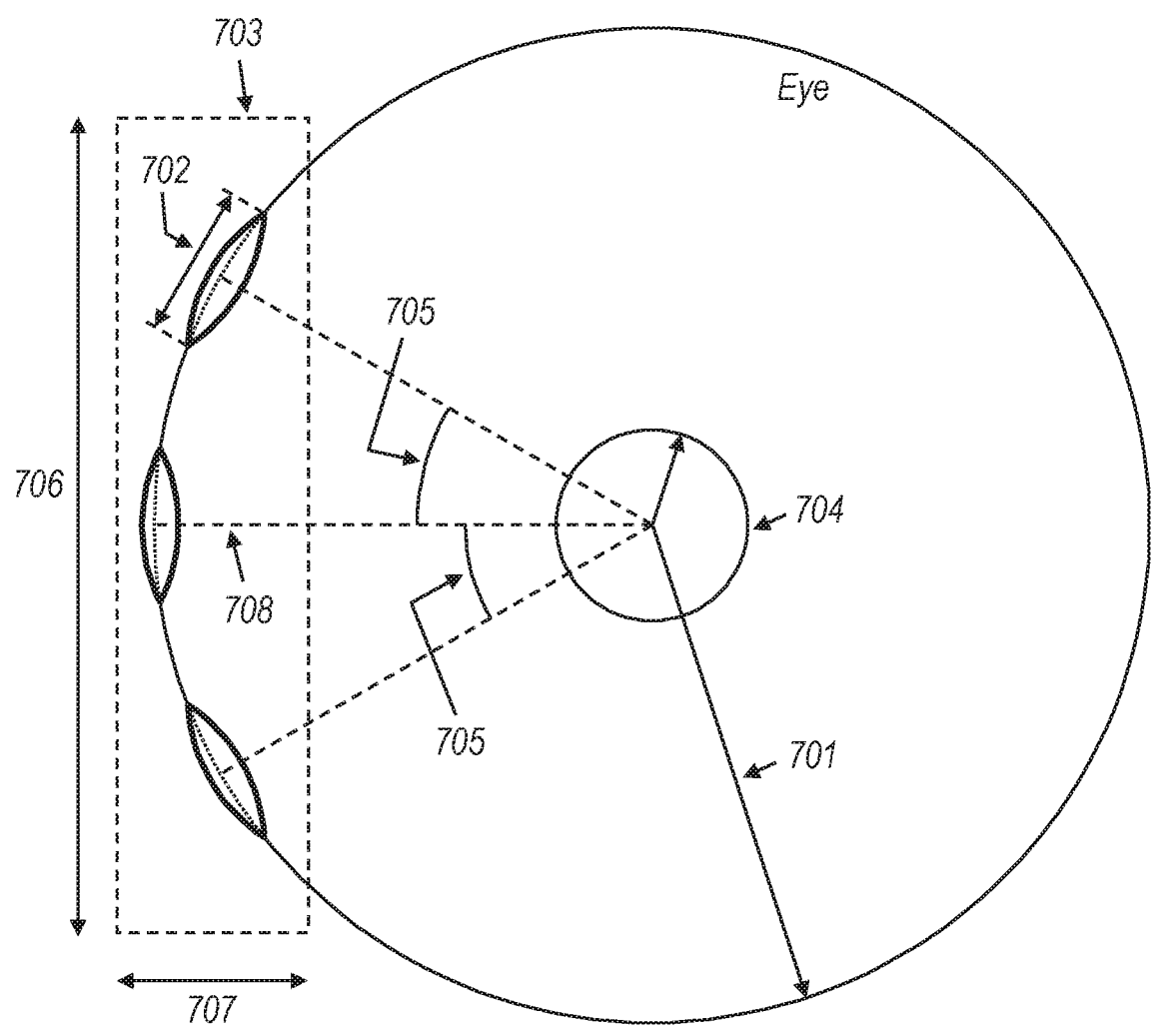
FIG. 7 shows the movement of a pupil of diameter 702 by an angle 705 (half pupil range) and the set of allowable eye center positions 704. Together, these movements define eye box 703.

FIG. 7 shows an example of eye position tolerance characterization, which can be this one: the set of allowable eye center positions are a 2.5 mm radius sphere 704 centered at the nominal eye center position and the range of allowable gazing directions 705 is a 30 degree half-angle cone around the frontward direction. Note that the range of allowable gazing directions is not the field of view (FOV) since the FOV also includes peripheral vision. The range of allowable gazing directions coincides with the pupil range for a negligible pupil size. So, another way to characterize the range of allowable gazing direction is the pupil range (region of the rolling pupil sphere comprising all admitted eye pupil positions).

Referring again to FIG. 7, consider an eye radius 701 of 13 mm and an eye pupil radius 702 of 2 mm. Then, the previous eye position tolerance characterization corresponds approximately to an eye box 703 with cylindrical shape of $2\times(1.3\times\sin(30)+2.5+2\times\cos(30))\approx21.5$ mm base diameter 706 and $2\times2.4=5$ mm height 707.

In general, the eye box is specified just as a surface, without specific tolerance in the frontward direction 708. With such specification, the eye box of the example would be the circle of diameter 21.5 mm corresponding to the central cross section of the cylinder of FIG. 7.

Figure 8:
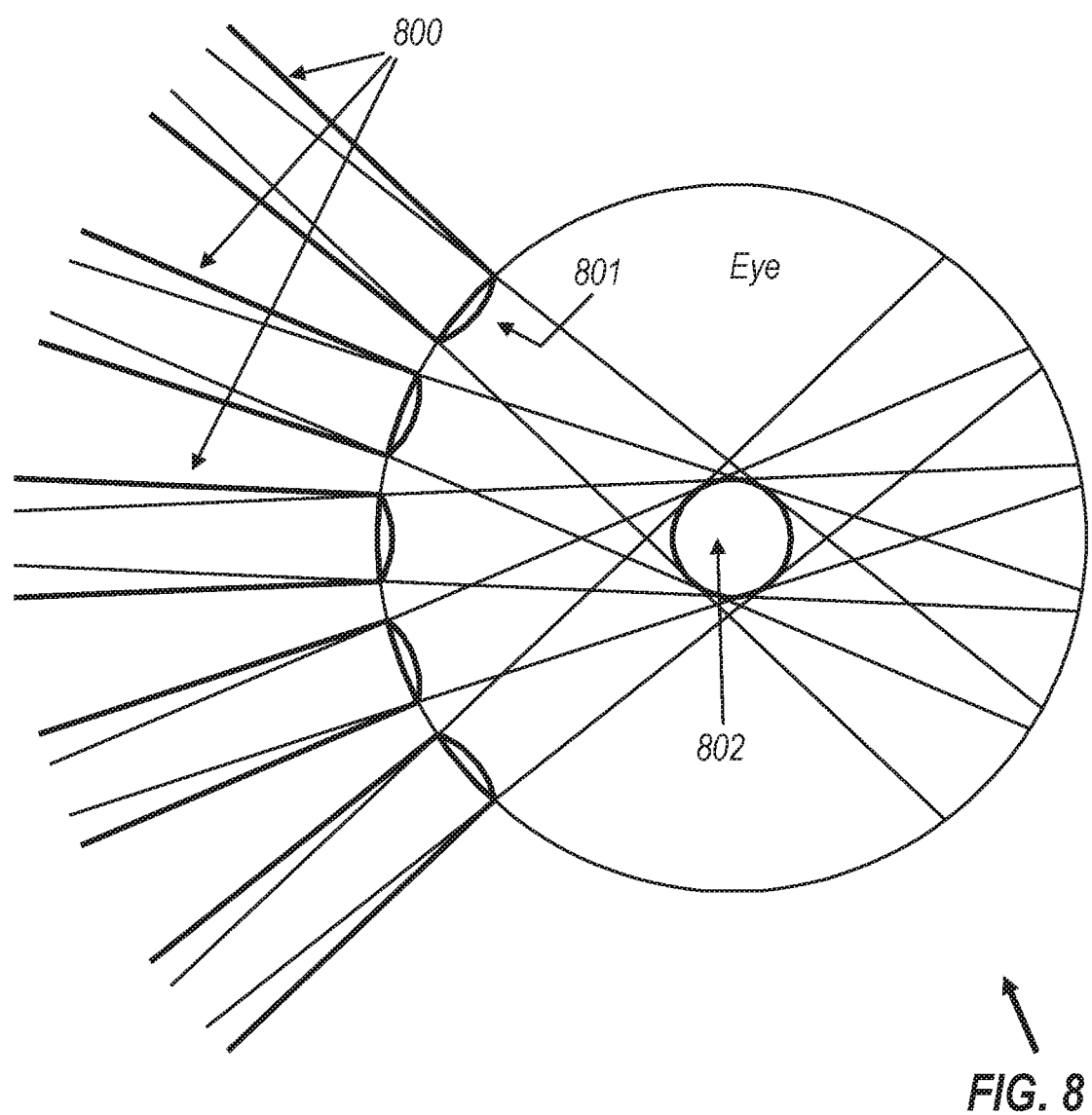
FIG. 8 shows the bundle of rays that can potentially each the fovea. These rays would intersect a sphere 802 at the center of the eye if no eye were there.

FIG. 8 illustrates the possible movements of the eye defining which rays potentially reach the fovea. Here, ray bundles 800 demand high resolution. The eye pupil may be at different positions 801 as the eye rotates to gaze in different directions. Spherical element 802 at the center of the eye cavity is defined by a 4 mm diameter pupil crossed by bundles of rays requiring high resolution. The size of this spherical element is increased with respect the pupil size for several reasons: 1) the angular divergence (±2.5 deg) of the rays sent to the fovea, 2) the eye center tolerance and 3) the abovementioned kappa angle. All these factors may increase this sphere up 8-12 mm diameter. The intersection of this sphere with the first reference plane (plane x',y' passing through the eye cavity center) is called foveal reference circle.

Accommodation and Peripheral Pencils

Figure 9:
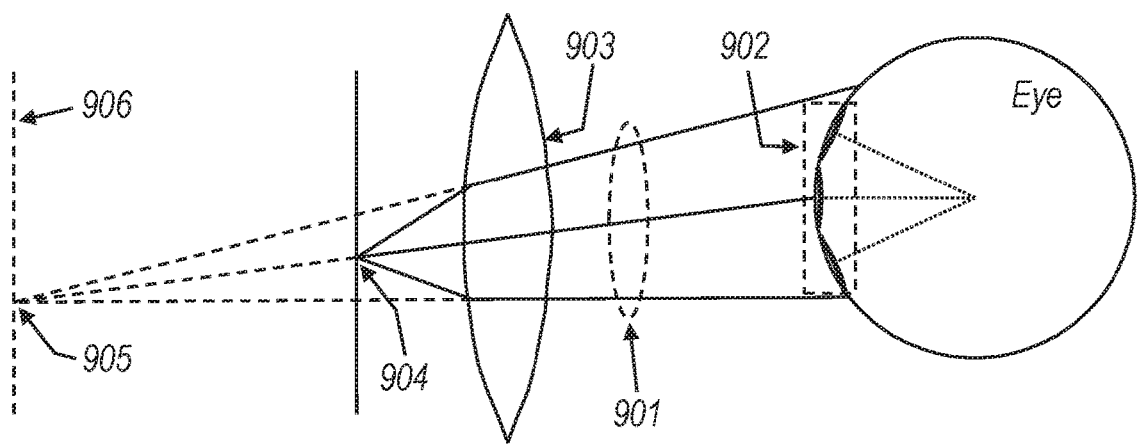
FIG. 9 shows a pencil that in this example covers the whole eye box.

FIG. 9 illustrates a conventional (non LF) display. This display can be considered as a particular LFD where any of its pencils 901 intercepts the whole eye box 902. In this example, lens 903 forms a virtual image 905 (ipixel) of opixel 904 The rays issuing from the ipixel 905 and passing through the interior of the contour of the lens aperture 903 form a pencil. Said ipixel 905 is visible from the whole eye box 902. We call a view of the virtual screen from a point on the eye box to the image of the virtual screen 906 seen by a pinhole camera at that point, i.e., the set of ipixels whose pencils pass through that point. The views of the virtual screen from points of the eye box are essentially identical in this case because the virtual screen is far from the eye and any pencil illuminates the whole eye box.

Almost all of the pencils of a conventional (non LF) display cover completely the pupil range and have a pencil print covering completely the foveal reference circle. The union of several of these type of pencils does not create a useful 3D-pixel and so these type of pencils are useless for getting a variable depth accommodation.

We call peripheral pencil to the one whose pencil print is completely outside the foveal reference circle and intercept a significant area of the pupil range (rays not intercepting the pupil range are not considered). Some non LF displays use occasionally this type of pencils. For instance the pencils whose ipixels are in the outer region of the virtual screen in "PCT6". These ipixels are non-gazeable because the lens rim blocks the direct view.

In a conventional LFD design, pencils do not intercept the whole eye box and consequently the views of the virtual screen are no longer identical for different points of the eye box. The pencil spot on the eye pupil must be smaller than the pupil size to be able to intervene in the accommodation process, i.e., to be able to form a 3D-pixel together with other similar pencils. The density of pencil intersections on the eye box front surface (or any cross section parallel to it) is constant for a conventional LFD, since the eye pupil can be at any position of the eye box. This is the case of the LFD described in "Lanman 2013".

We will call accommodation pencils to those whose pencil print covers only partially the foveal reference circle, in general only a small part of this circle. This partial covering should happen for any position of the eye sphere's center within tolerances. Then an accommodation pencil covers a small part of the pupil range. In a conventional LFD, all of its pencils are of the accommodation type because accommodation requires that several pencils coming from the virtual 3D-pixel cross the eye pupil and be focused on the fovea. This is only achievable with accommodation pencils that only cover partially the pupil. A pencil covering all the pupil may "blind" other pencils for accommodation purposes.

Figure 10:
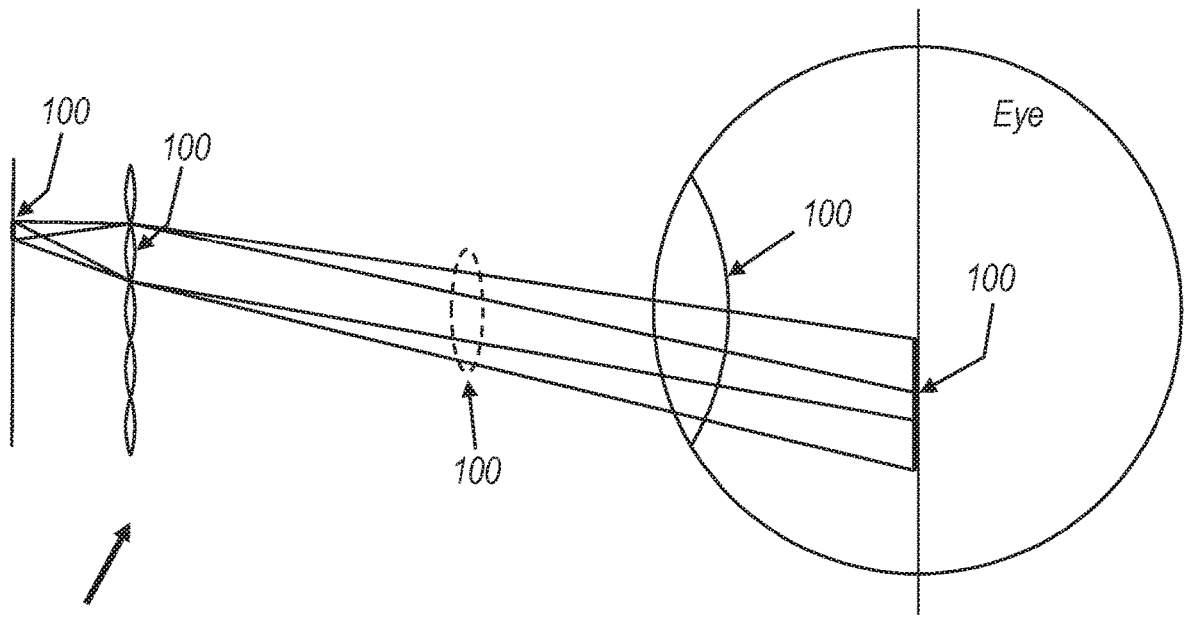
FIG. 10 shows an example of an accommodation pencil whose beam print on the pupil is smaller than the pupil.

FIG. 10 illustrates an accommodation pencil 1001 that falls inside the eye pupil 1002 and is therefore able to participate in the accommodation process. For clarity purposes the eye pupil and the eye sphere are not drawn to scale in this figure. The light emitted from pixel 1003 and redirected by lens 1004 enters the pupil 1002. The pencil print 1005 is smaller than the pupil and is within the foveal reference circle.

Only the portions of the pencils reaching the fovea intervene in the accommodation process. Consequently savings in information quantity and total opixel count may be obtained if the rays reaching the eye at, peripheral angles (so, rays that never reach the fovea) belong to peripheral pencils. Of course, this includes all the rays covering the outer region of the virtual screen (which is non gazeable region and so its rays will never reach the fovea), but also may include ray's from the gazeable region which reach the eye at peripheral angles.

For the purpose of minimizing the number of different pencils and still having accommodation process, HVALF uses accommodation pencils if and only if some (or all) of its rays can potentially reach the fovea and peripheral pencils When none of the rays of the pencil will ever reach the fovea, in the normal usage of the LFD.

For a satisfactory accommodation process, several different pencils (or portions of pencils) per 3D-pixel are recommended. Huangs 2014 recommends a minimum number of 9 views which translates here as 9 different pencils per 3D-pixel, but 4 may be sufficient in practice.

These 2 types of pencils (accommodation and peripheral) also differ in the type of eye receptors for which they should be designed for. Accommodation pencils should be designed for cones, with a higher resolution and higher color sensitivity than rods which are the fundamental receptor of peripheral pencils. Then for a further decrease of the number of pencils, color may be assigned only to accommodation pencils while all (or most of) peripheral pencils are monochrome (white or green). In this situation, the color gamut of peripheral pencils is smaller than the color gamut of the remaining pencils.

EXAMPLES OF APPLICATION

Figure 2:
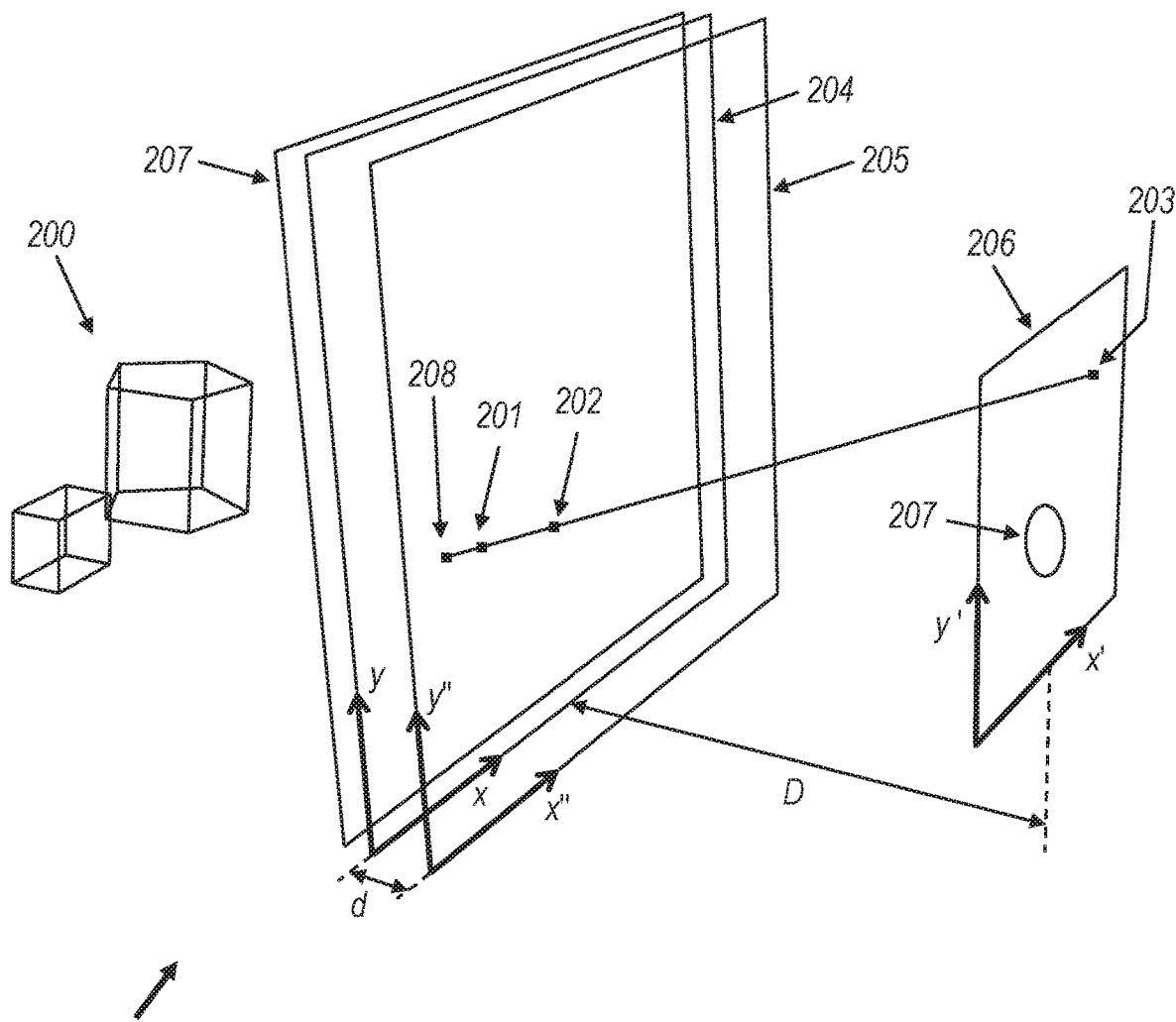
FIG. 2 shows, schematically, a LFD based in Huang 2015's approach, which utilizes stacked LCDs.

Instead of increasing the number of pencils when g increases, we can apply our strategy in Huang 2015's LFD (see FIG. 2), by introducing a weighting function w(x, y, x', y') inside the integral of M to calculate the A and B functions, i.e., $M=\int_\mathcal{R} (L-AB)^2 w dx dy dx' dy'$. This function w must be approximately proportional to the importance of the ray (x, y, x', y'), as introduced before. This function is then greater for the rays that may reach the fovea and decreases as the distance between the fovea and the point of interception of the ray on the retina increases. In this way the best approximation of the product AB to the function L is got in the regions of the domain $\mathcal{R}$ containing pencils that may reach the fovea, and thus, the loss of resolution that appears in the approximation of L by AB is minimized for those pencils. Since the weight function w(x, y, x', y') take very low values relative in zones far from the point pair (x,y)=(0,0), (x',y')=(0,0), and to avoid noisy computation, it is useful to consider a change of variables in the integral to new variables u-v-u'-v' so in this new variables the weight function becomes unitary (that is, w the inverse of the Jacobian of said change of variables). If this change of variable were decoupled so x,y are functions of u,v only, and x are function of u',v', the change of variables would correspond to a reparameterization of the planes to curvilinear coordinates. A uniform discretization of the integral in u-v-u'-v' for its numerical resolution would imply a very nonuniform discretization in x-y-x'-y', which mean that the volume of the pencils with $\Delta u \Delta v \Delta u' v'$=constant (or, inversely, its density) will be correlated with their probability to hit the fovea of the eye. Examples of nonuniform discretizations and embodiments producing them will be disclosed below.

Figure 3:
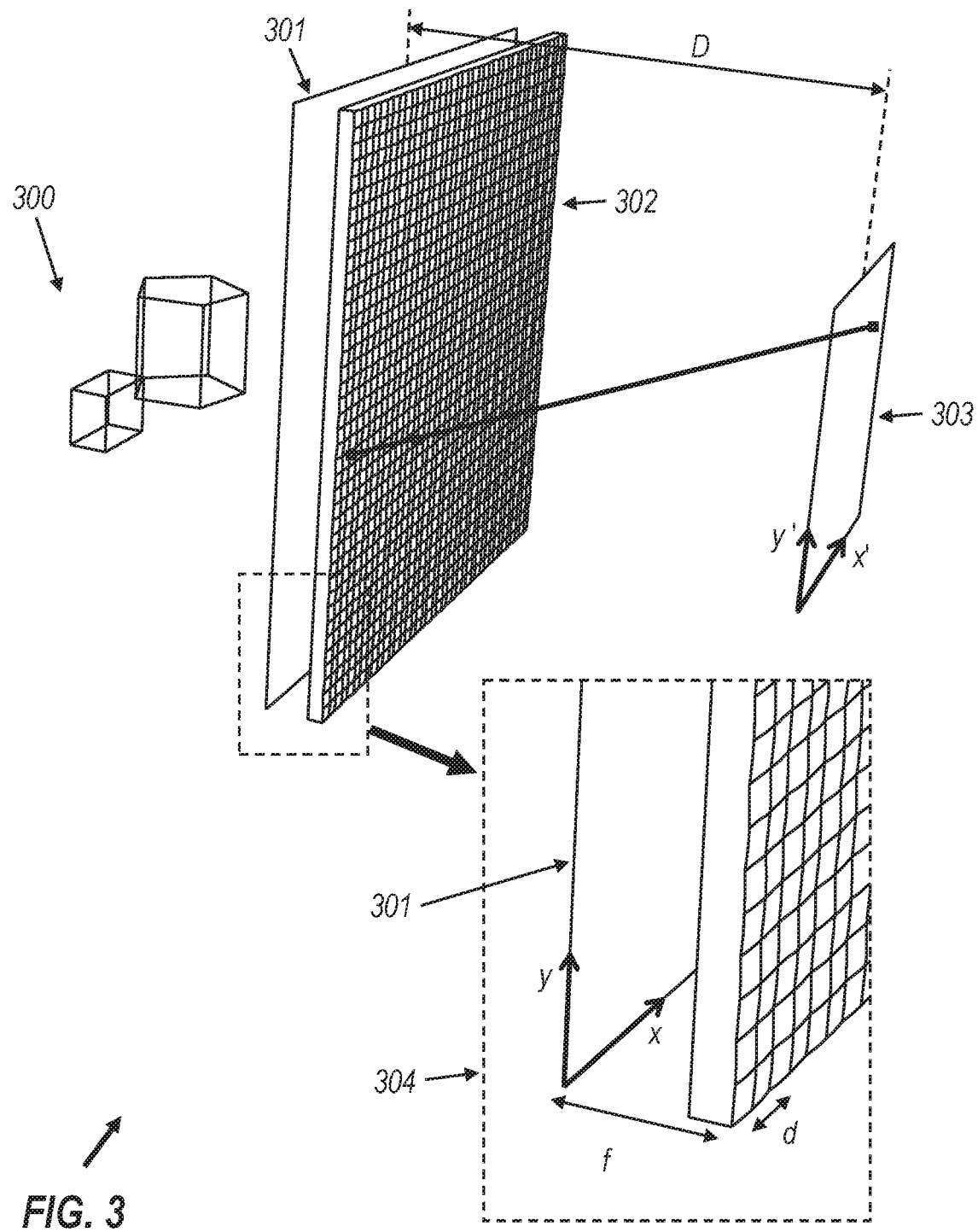
FIG. 3 shows, schematically, a LFD based in Lanman's approach, which utilizes a display and a microlens array.

Our strategy can also be applied to Lanman's LFD (see FIG. 3), by optimizing each microlens so the perceived resolution measured as detected pixels per degree) is variable and it is maximum for the display pixels potentially focused on the fovea (around the so called preferential opixels or popixels in PCT1) for which the lens have a longer focal length than for the rest. The optical design of a lens with variable magnification is disclosed in PCT6. Our strategy can also be applied to the density of pencils in the virtual screen, by allocating more pixels to the clusters of the microlenses imaging portions of the gazeabel region of the virtual screen at the expense of the number of opixels in the remaining clusters.

Figure 11:
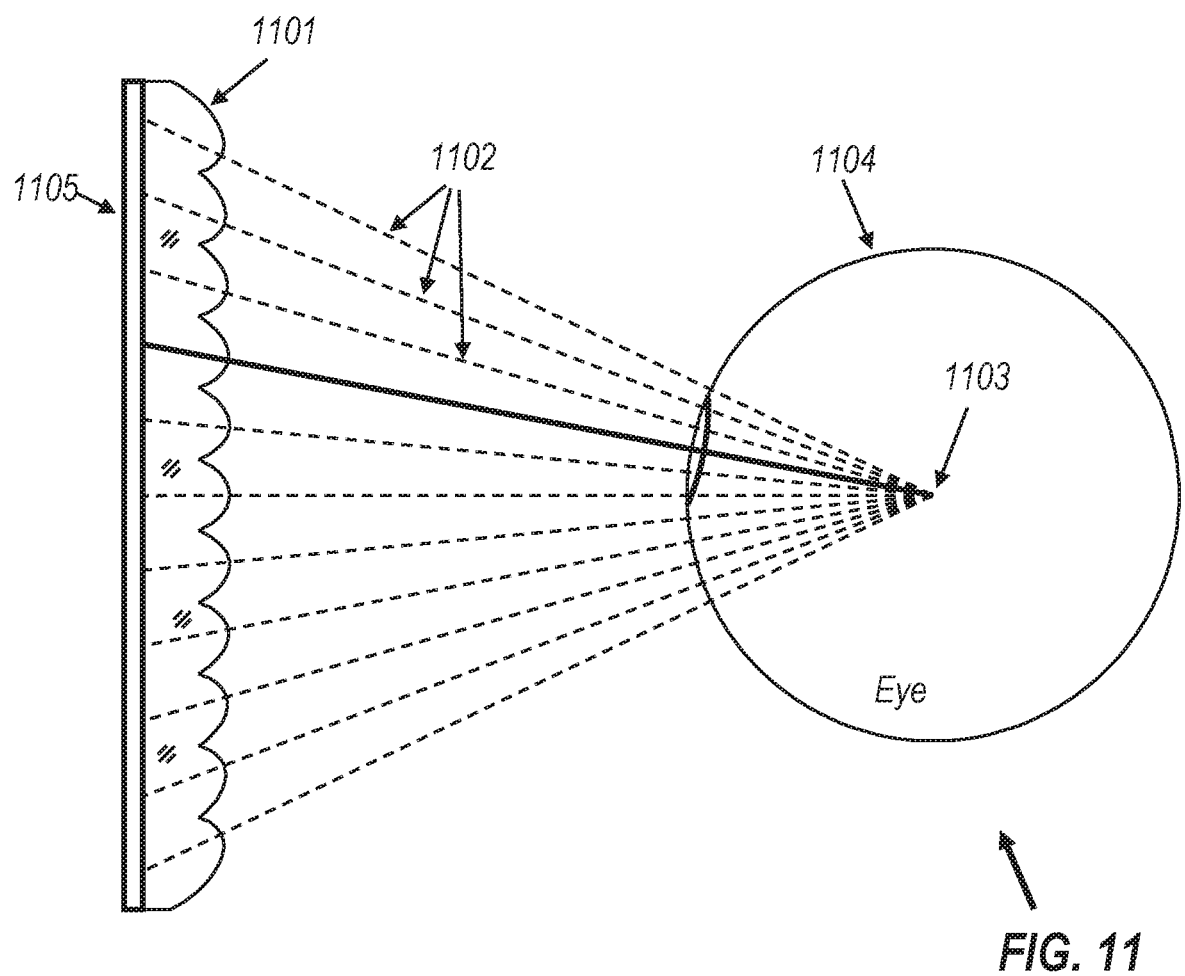
FIG. 11 shows a Light Field Display whose microlenses have rotational symmetry around axes (1102) that point towards the center of the eye.

FIG. 11 shows a particular case of LFD microlens array with lenses formed by a single surface. Since the design degrees of freedom are reduced to that single refractive surface, its profile should be a Cartesian Oval (or close to it). In the case of FIG. 11. the microlens array 1101 is glued to the display 1105 without any additional refractive surface. This gives mechanical stability to the LFD avoiding misalignments between the microlens array 1101 and the display 1105. The microlenses in this case have rotational symmetry but the axes (1102) of that symmetry are not the same, not even parallel. Those axes are approximately the straight lines linking the central pixel of the cluster with the center (1103) of the eye globe (1104). The perceived resolution is decreasing as the peripheral angle increases but the reason for this is not because of an efficient use of the available opixels but because of the poor optical performance of the Cartesian oval for non focal points. To improve the image quality of the microlenses a common single lens can be placed between the eyes and the microlens array to avoid that the outer microlenses work very tilted relative to the display plane. Nevertheless, this architecture doesn't have enough degrees of freedom to have a variable focal length which would allow variable magnification.

Achieving a variable resolution that matches approximately the human eye acuity may also be obtained, for example, by making a display 1105 that has smaller pixels near the optical axes of the microlenses and larger pixels as we move away from said optical axis. This reduces the number of pixels in the periphery of each channel, with the corresponding reduction in information to be calculated and displayed.

Another example for achieving a variable resolution that matches approximately the human eye acuity is having all opixels with the same size in display 1105 but addressing them individually only when they are near the optical axis of each channel, and addressing the pixels in groups of, say, 2 as we move away from the optical axis, an in groups of 3 pixels as we move further away and so on. This strategy reduces the amount of information to be processed.

Another example which requires in this case by a hardware modification, is having the same size for all pixels in display 1105 but wiring or addressing them individually only near the optical axis of each channel, and then wiring pixels in groups of, say, 2 as we move away from the optical axis, then in groups of 3 pixels as we move further away and so on.

Figure 12:
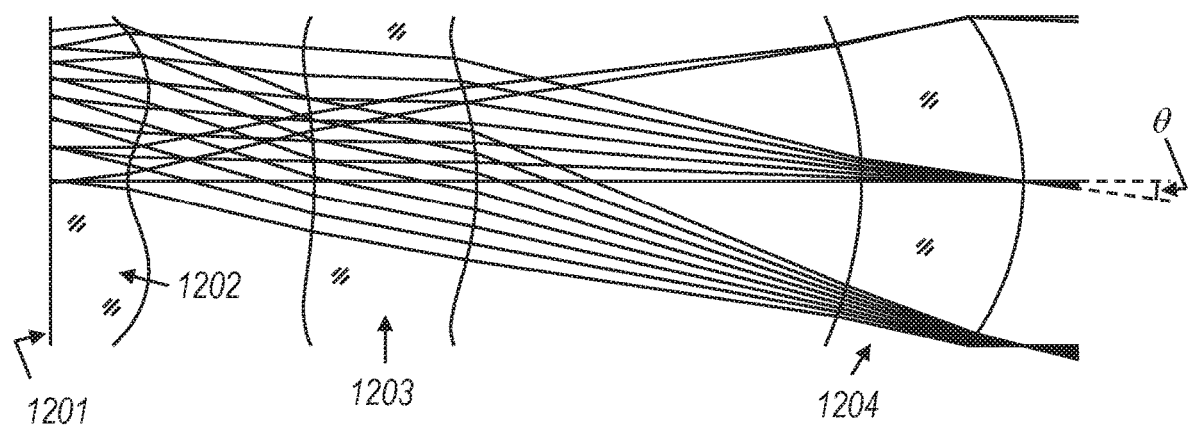
FIG. 12 shows a Light Field Display with variable focal length in each channel.

FIG. 12 illustrates a variable focal length design (as disclosed in PCT6) where each channel is composed of two lenses 1204 and 1203 and an additional refractive element 1202 placed on the display 1201. All the pixels of the display (opixels) have the same size. Together, these optics produce variable magnification channels that project high definition images at central emitting directions (because of a small magnification) and lower resolution images at wider angles (due to a greater magnification), matching the variable visual acuity of the human eye. In general, these optics would be free-form and its directions of high definition emission would point towards the center of the eye. Each one of these microlens apertures is smaller than the eye pupil and it is designed so several pencils may enter the pupil allowing accommodation.

Figure 13:
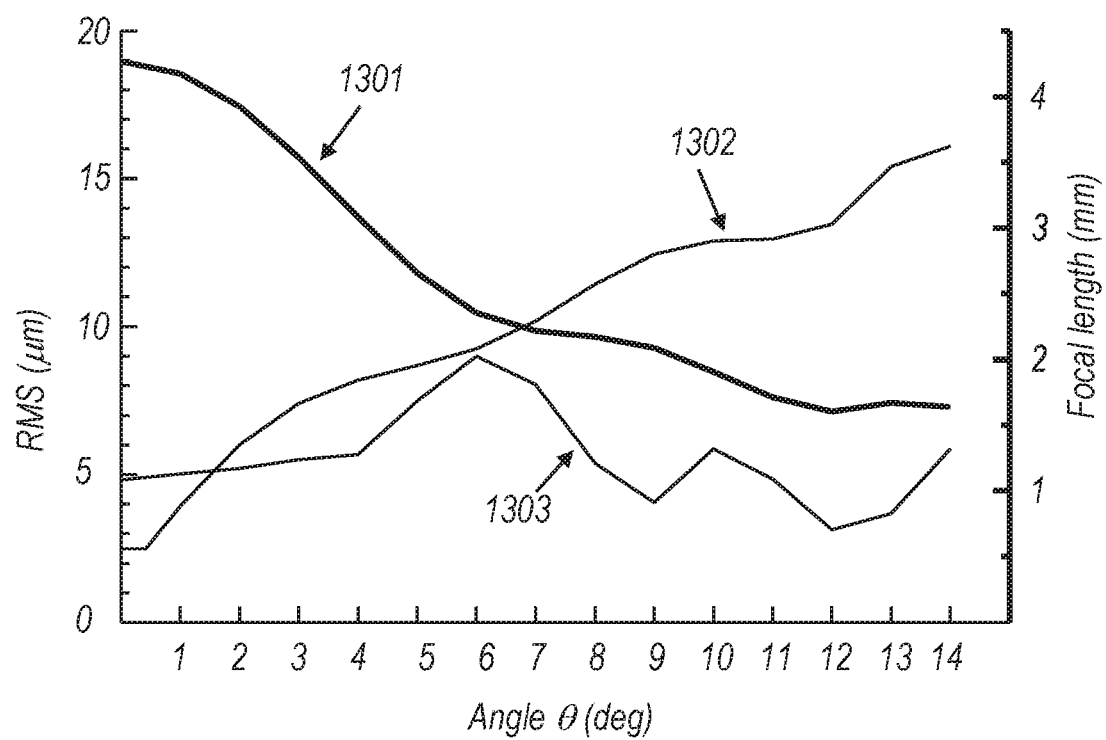
FIG. 13 shows some optical characteristics of the embodiment illustrated in FIG. 12.

FIG. 13 shows some illustrative characteristics of the embodiment in FIG. 12. Curve 1301 shows the focal length variation of the optic as a function of angle θ (see FIG. 12) measured on the vertical axis on the right: Focal length (mm). The focal length is defined as f=dy/dθ where dy is a displacement along display 1201 and dθ is the corresponding variation in angle θ.

Curve 1303 shows the Root Mean Square (RMS) spot size at the display 1201 as a function of angle θ measured on the vertical axis on the left: RMS (μm) where μm stands for microns ($10^{-6}$ m). Curve 1302 shows the resolution of the human eye "projected" onto the display 1201. Suppose that at an angle θ the human eye can resolve an angle Δθ where Δθ is the angular width of a line pair (one black line and one white line). Curve 1302 represents f(θ)tan(Δθ) where f(θ) is the focal length of the optic at angle θ.

Gaze Tracking

In a HMD the hardware is usually fixed with respect to the skull. This includes the optical system. With that reference system, the only possible eye's movements are rotations around its center. The knowledge of the angular position of the eye pupil at any instant (gaze tracking) can be used to increase the performance of the HMD although some of its components cannot benefit from this information. In particular, the optical system is in general made of solid materials with little or no movement and so it cannot take advantage of the instant position of the eye, although it can take advantage of the statistics of this movement (gazeable regions, average saccadic movements), as we have seen before. Nevertheless other aspects of the HMD can take advantage of gaze tracking. For instance image rendering computer processing. In this case, it is possible to render in high definition only those 3D-pixels (or ipixels if the distance of the image to the viewer is not being rendered, i.e. if accommodation is not included) that reach the fovea. Other 3D-pixels that reach the retina outside the fovea may be rendered with a lower resolution. Said 3D-pixels may be rendered with a resolution that matches the decrease in eye acuity for wider angles (peripheral angles). This means that a high density of pencils information is needed for the fovea, but a lower density of pencils may be used for light that reaches the retina outside the fovea. The knowledge of the pupil (or fovea) position allows optimizing the resources for image rendering in the limited time available between frame and frame, but does not help the optical system unless this has parts which can be adapted at the frame rate or faster. One trivial example of this adaptable optics are contact lenses which perfectly track the pupil and continuously affect the rays directed to the fovea.

When the optical system does not have gaze tracking, the position of the pupil within the pupil range is unknown. The pupil may be looking at any direction and all gazeable ipixels must be rendered in high definition. When the eye looks in one direction, it sees the high definition image in that direction. The rest of the high definition image becomes part of the peripheral vision, enters the pupil at wider angles and is not fully resolved by the eye.

Phase Space Description of the Invention

As said before, each light ray position and direction in the system is described by four parameters (x, y, x', y'). This, space cannot be easily represented. However, a substantial understanding of the present invention may also be obtained by considering only the cut of said space through, for example, plane (x, x'), i.e., a plane passing through the eye sphere's center and normal to the left right axis. In this situation, each ray contained in this plane may be described by two parameters. These may be (x, x') or some other two parameters. The description below uses 2 angular parameters to describe the rays. The reason is that the eye pupil rotates around the center of the eye (and that rotation may be described by an angle) and the eye resolution varies angularly relative to the gazing direction.

Figure 14:
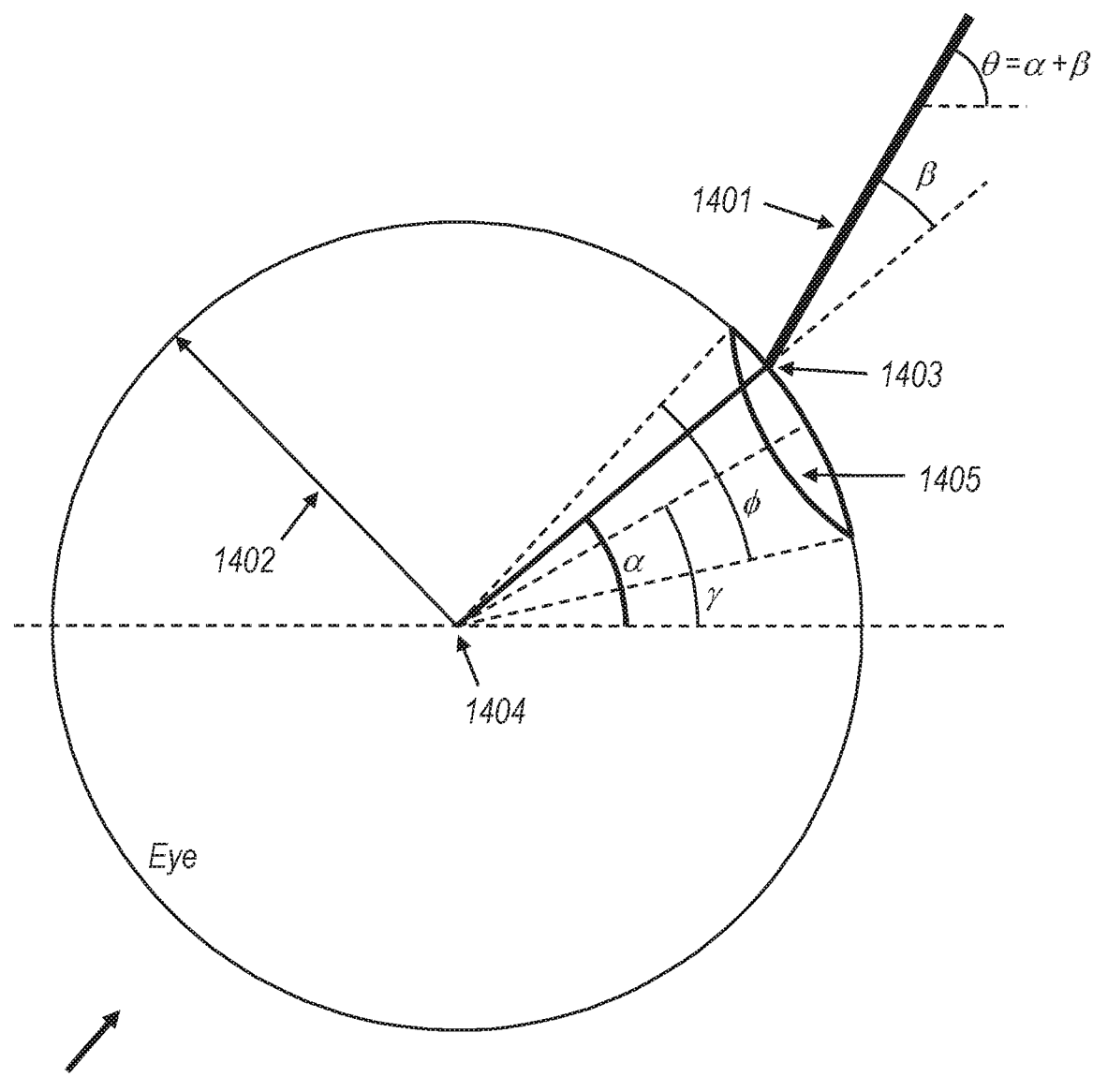
FIG. 14 shows the parameters used to define light rays reaching the eye.

FIG. 14 shows the coordinates used when describing a light ray 1401. The eye has a radius 1402 and angle α defines the position of point 1403 on the surface of the eye ball where ray 1401 hits. Angle β defines the direction of ray 1401. Angles α and β then fully define ray 1401 hitting on the eye. The pupil 1405 spans an angle φ when seen from the center 1404 of the eye. The center of the pupil is tilted by an angle γ relative to the horizontal. Angles γ and φ define the position and size of the eye pupil. Ray 1401 makes an angle θ=α+β to the horizontal.

Figure 15:
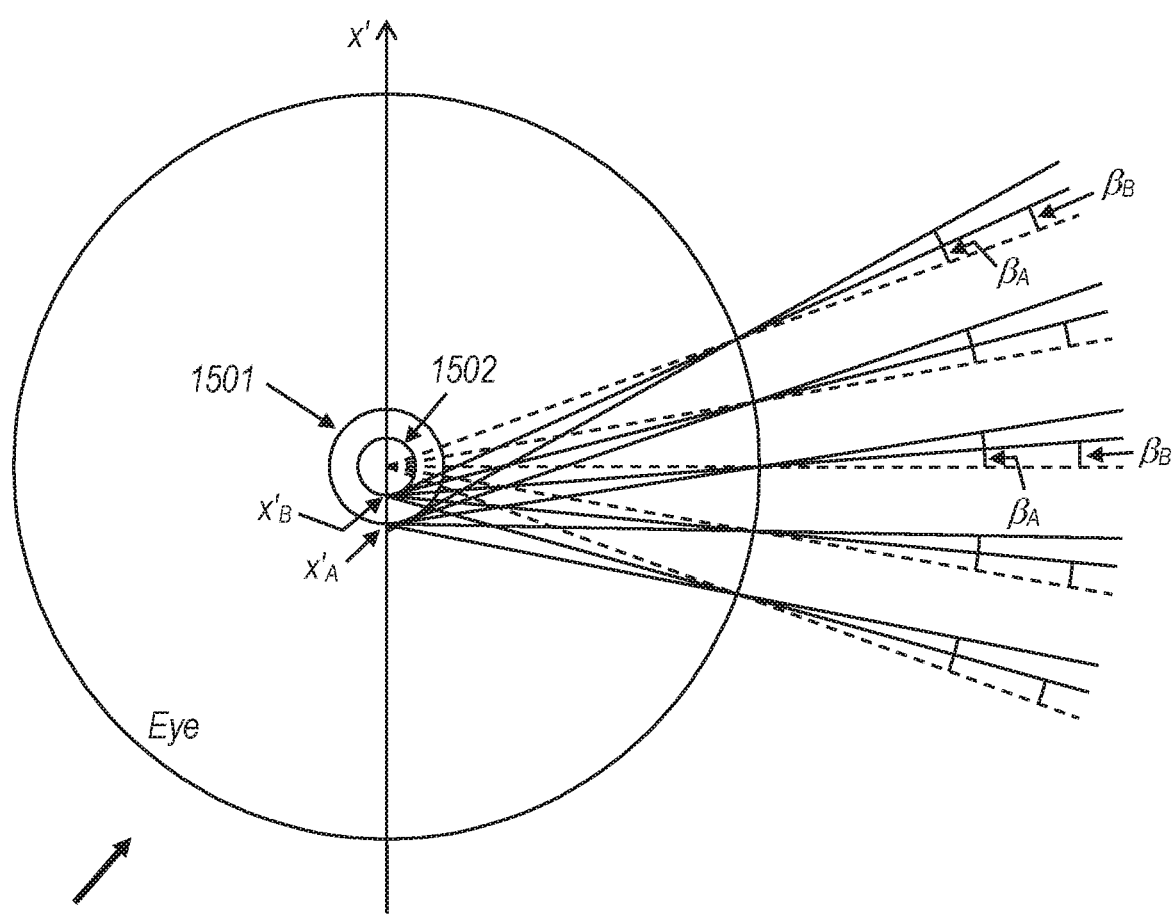
FIG. 15 shows how β=constant is approximately equivalent to x'=constant.

FIG. 15 shows two bundles of rays. One of these bundles has β=$β_A$=constant with a limited range of values of α (that corresponding to the pupil range). Its rays are tangent to circle 1501 and because of the limited range of values of α all of them intersect axis x' near position $x'_A$. Therefore, rays with β=$β_A$ approximately verify x'=$x'_A$. Another bundle has β=$β_B$=constant, also with values of α within the pupil range. Its rays are tangent to circle 1502 and intersect axis x' near position $x'_B$. Therefore, rays with β=$β_B$ approximately verify x'=$x'_B$. Using this approximation, one may use either β or x' as one of the parameters needed to identify a light ray.

Figure 16:
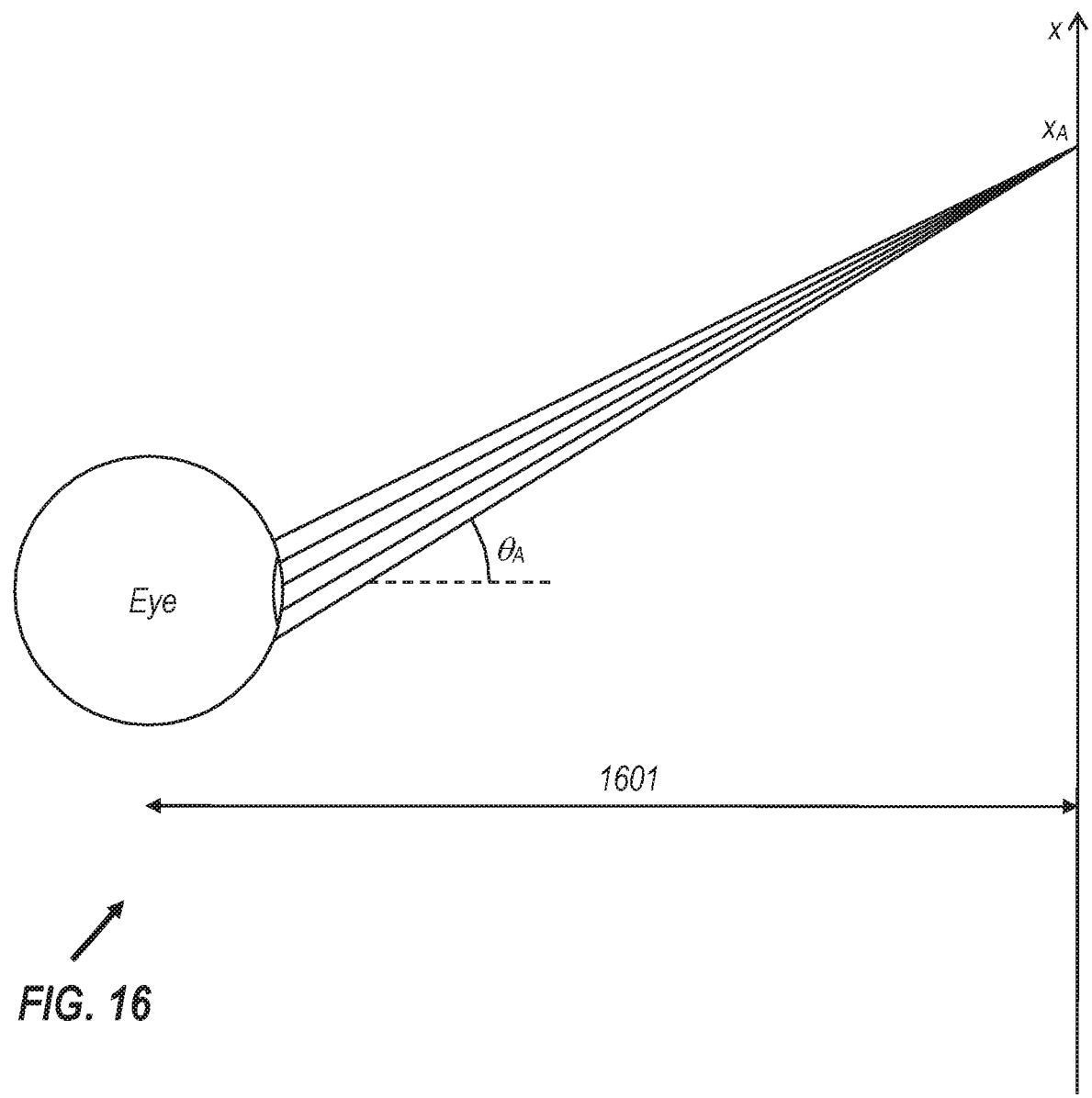
FIG. 16 shows how x=constant is approximately equivalent to θ=constant when axis x is far from the eye.

FIG. 16 shows a bundle of rays emitted from a position x=$x_A$ on axis x. If axis x is at a large distance 1601 from the eye (relative to the eye diameter), then rays with x=$x_A$=constant approximately verify θ=$θ_A$=constant. Using this approximation, one may use either θ or x as one of the parameters needed to identify a light ray.

Figure 17:
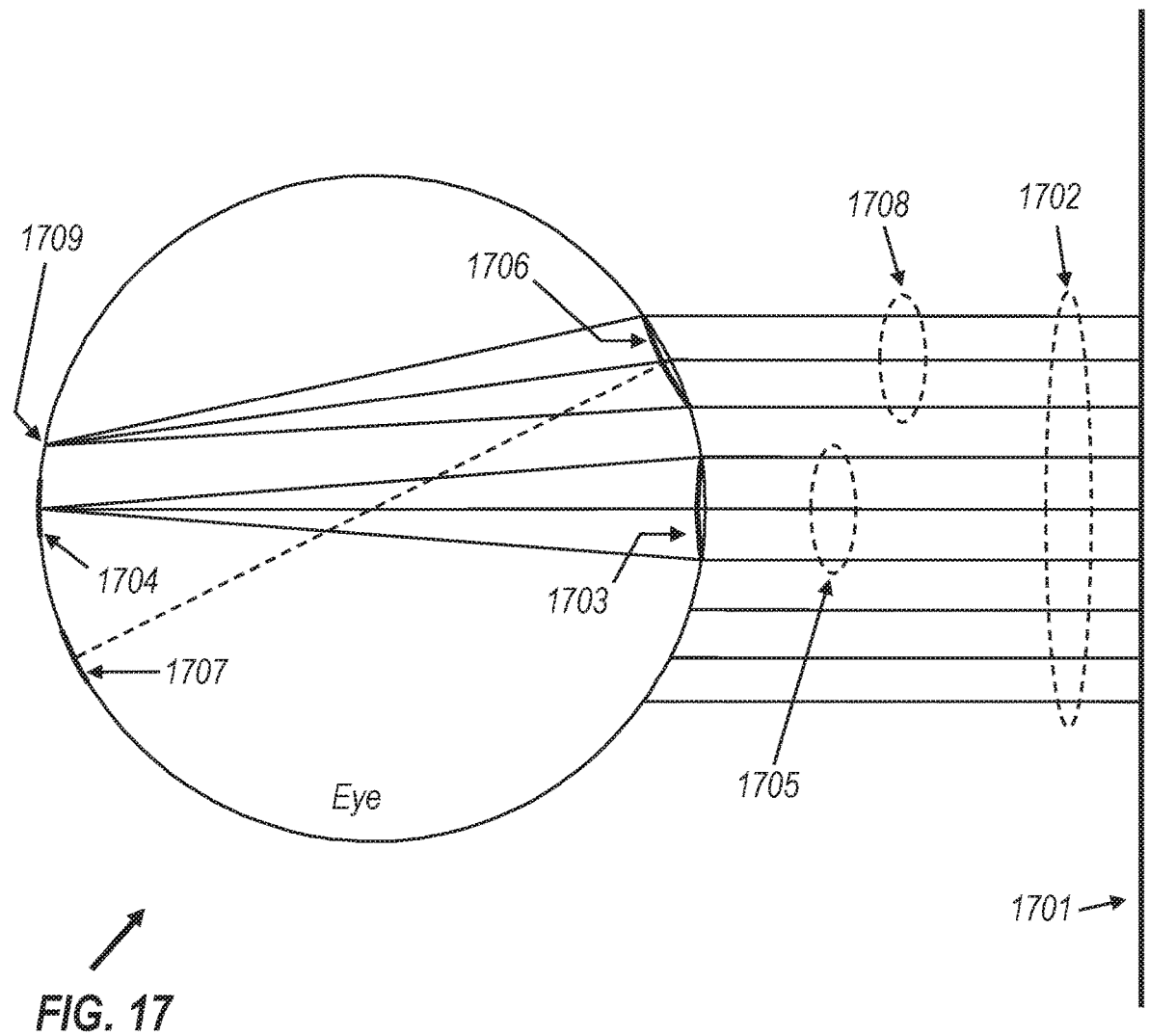
FIG. 17 shows a bundle of rays 1702 coming from a distant point (virtual image) and as the eye rotates, some rays (such as 1705) may reach the fovea while others (such as 1708) may not.

FIG. 17 shows the aperture 1701 of an optic emitting a bundle of rays 1702 that fills at least the whole pupil range. In this example these are parallel rays and appear to come from a 3D point at an infinite distance. When the pupil is at position 1703 facing the incoming light, the fovea is diametrically opposed at position 1704. In that case, a sub-bundle 1705 enters the pupil and is focused at the fovea 1704. When the eye rotates and the pupil is at position 1706, the fovea is diametrically opposed at position 1707. In that case, a sub-bundle 1708 enters the pupil and is focused on the retina at position 1709, away from the fovea 1707.

Figure 18:
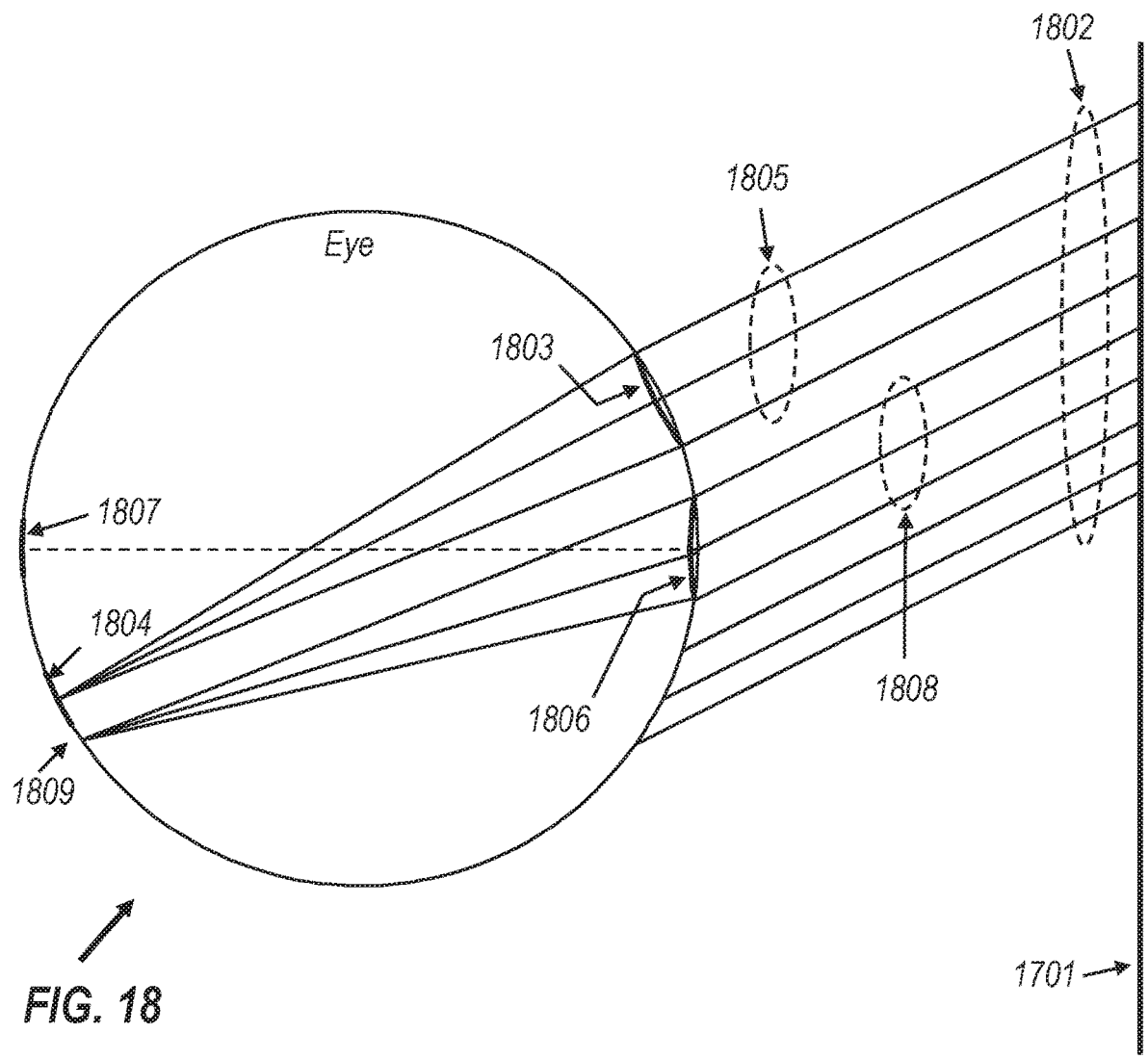
FIG. 18 shows a similar situation to FIG. 17, but for a different bundle of rays 1802 coming from another distant point (virtual image).

FIG. 18 shows the aperture 1701 of an optic emitting a bundle of rays 1802 that fills at least the whole pupil range. In this example these are parallel rays and appear to come from a 3D point at an infinite distance. When the pupil is at position 1803 facing the incoming light, the fovea is diametrically opposed at position 1804. In that case, a sub-bundle 1805 enters the pupil and is focused at the fovea 1804. When the eye rotates and the pupil is at position 1806, the fovea is diametrically opposed at position 1807. In that case, a sub-bundle 1808 enters the pupil and is focused on the retina at position 1809, away from the fovea 1807.

Figure 19:
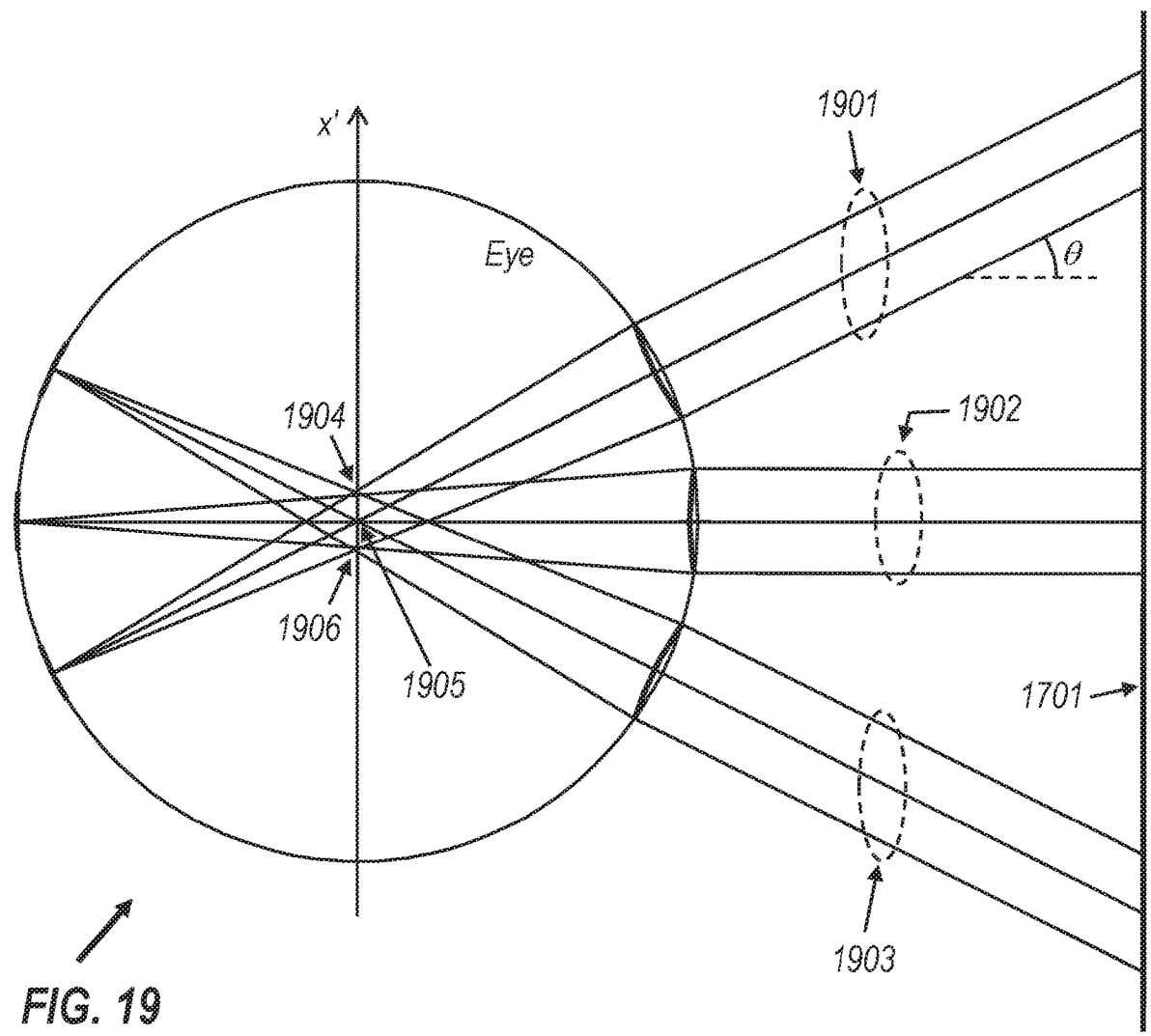
FIG. 19 shows bundles of rays that can potentially reach the fovea.

FIG. 19 shows a configuration containing an aperture 1701 of an optic and considers only the rays that can potentially reach the fovea, such as rays 1705 in FIG. 17 or 1805 in FIG. 18. A few rays are sufficient for the eye to accommodate and, for that reason, only a few rays are needed in bundles 1901, 1902 and 1903. These rays cross axis x' near positions 1904, 1905 (center of the eye) and 1906. Therefore, in order to allow accommodation, it is sufficient to have the rays that may reach the fovea cross axis x' at a small set of points (in this example 1904, 1905 and 1906).

Figure 20:
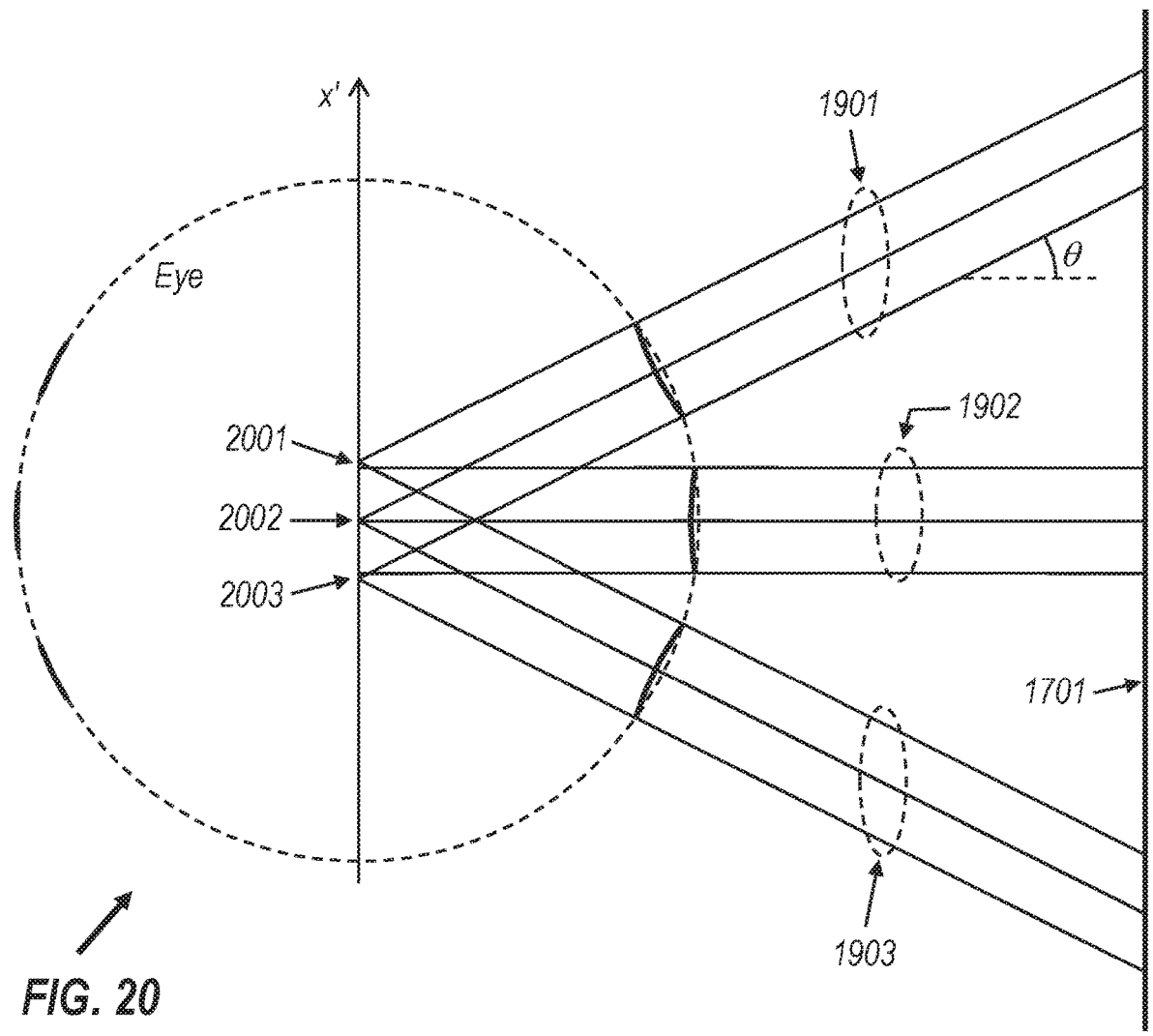
FIG. 20 shows how the rays that can potentially reach the fovea cross a region (2001 to 2003) on axis x' through the center of the eye.

FIG. 20 shows the same ray bundles 1901, 1902 and 1903 as FIG. 19, but now showing their trajectories if the eye was not there. These rays intersect axis x' through the center of the eye near positions 2001, 2002 and 2003. In order to allow accommodation for the rays potentially reaching the fovea, it is then sufficient to record rays crossing a few positions on axis x'. The light field may then be recorded by a small set of cameras placed at positions 2001, 2002 and 2003. These recordings may also be used for peripheral vision, although that is an approximation since the peripheral vision would not pass near the eye cavity center.

Figure 21:
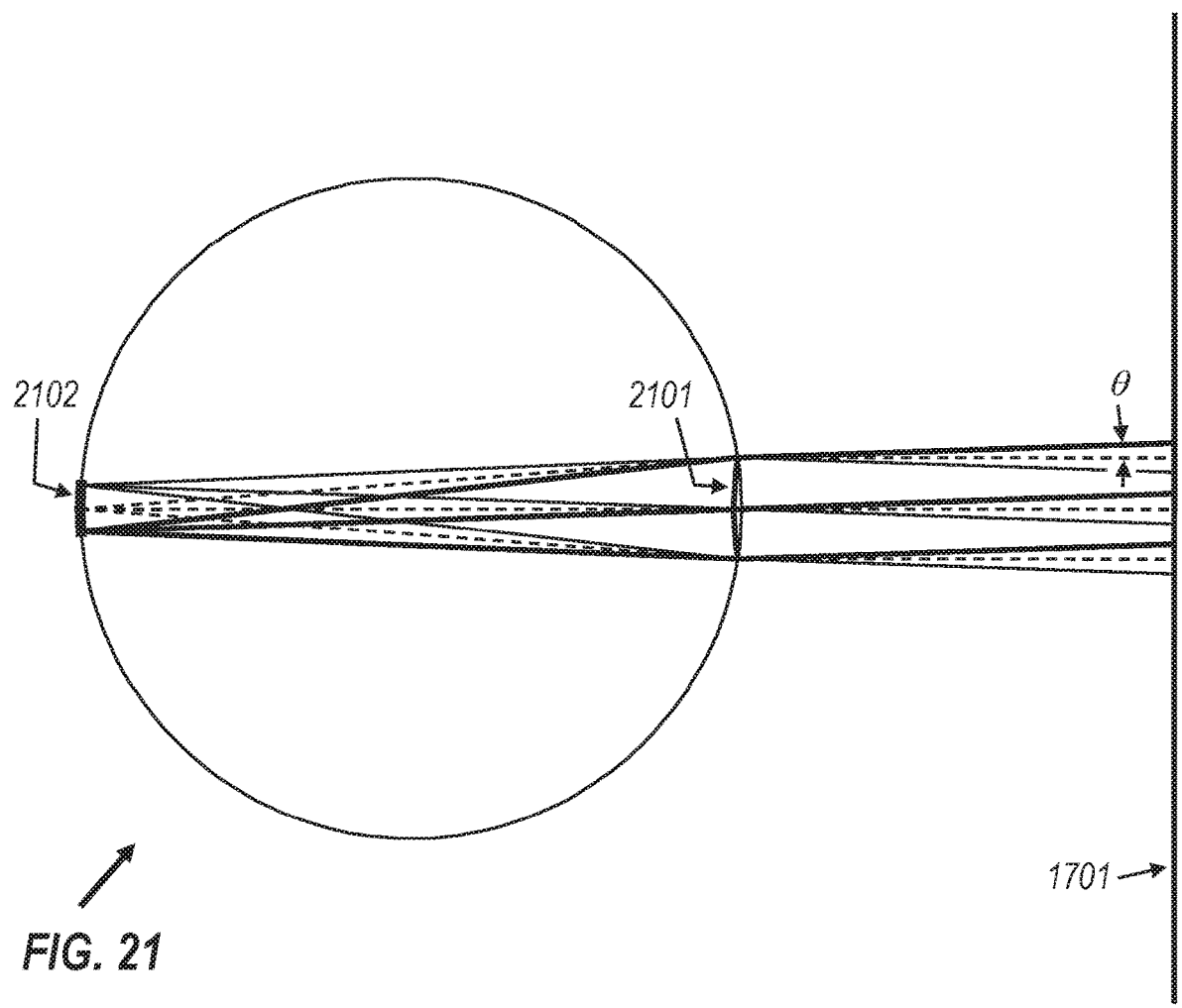
FIG. 21 shows that producing a high resolution at the fovea 2102 requires a high density of pencils in angle θ.

FIG. 21 shows a bundle of rays entering pupil 2101 and forming an image of a distant object on fovea 2102. In order to have a high density of focusing points on fovea 2102 (high resolution) one needs a high density of directions θ for the incoming rays.

By combining the configurations in FIG. 20 and FIG. 21 it may be concluded that in order to allow accommodation and a high resolution image on the fovea, it is possible to describe the light rays by parameters x' (or β—see FIG. 15) and x (or θ—see FIG. 16) with a low density in x' (or β) and a high density in x (or θ). The low density in x' (or β) is illustrated by points 2001, 2002 and 2003 and the high density in θ (or x) is illustrated by the high angular density of angle θ in FIG. 21.

Figure 22:
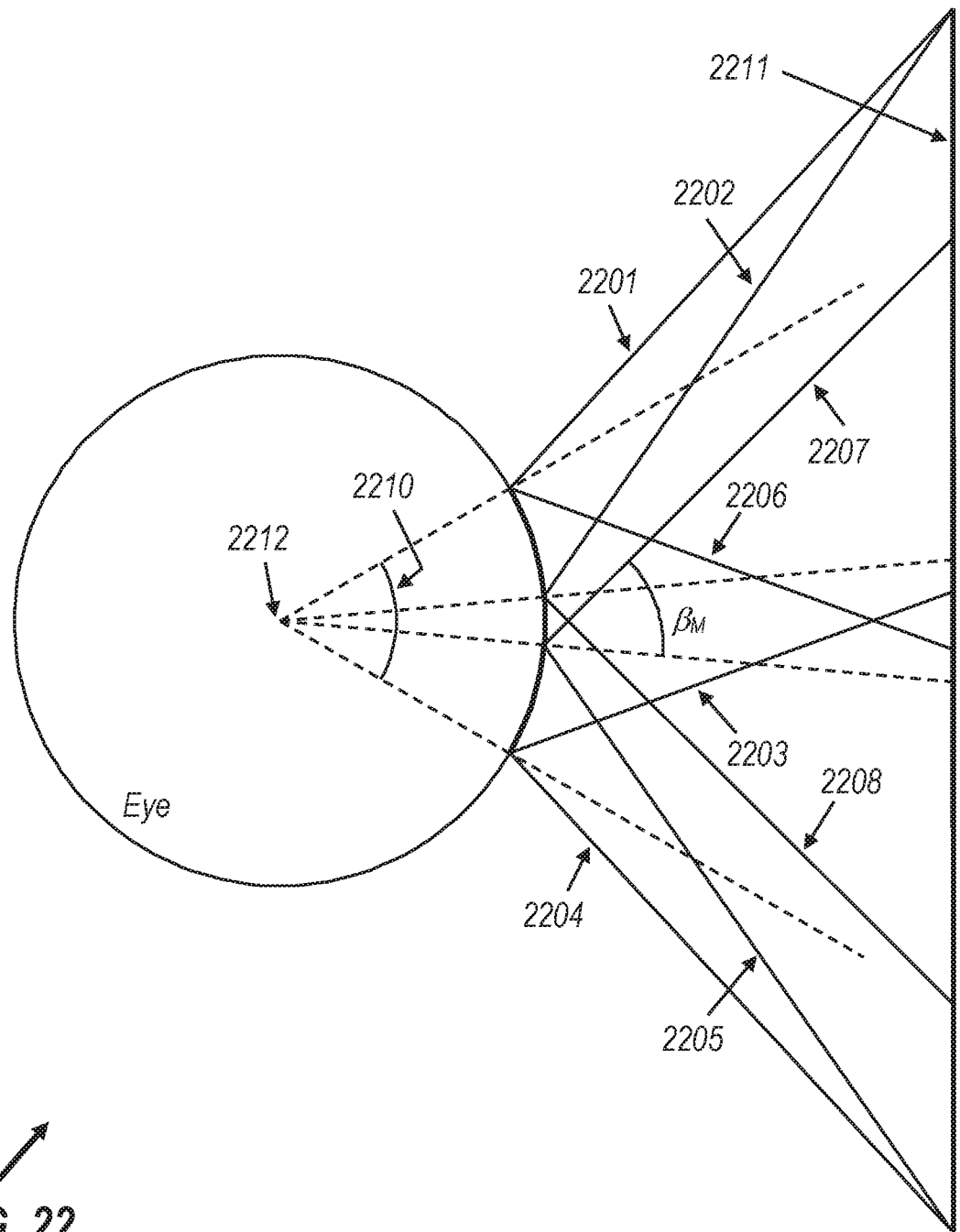
FIG. 22 shows the aperture of an optic that emits rays towards the eye.

FIG. 22 shows an eye looking into an optic with aperture 2211. The eye pupil may move inside the pupil range 2210, which means that angle γ is within pupil range 2210 (approximately since the pupil size makes the pupil range a bit greater than the γ span). Rays reaching the eye have a maximum angle $\beta_M$ relative to the dashed lines through the eye center. Also shown are rays 2201 through 2208.

In Virtual Reality (VR) applications, rays 2201, 2202, 220 and 2207 preferably come from the upper rim of the aperture 2211 and analogously rays 2204, 2205, 2206 and 2208 come from the lower rim of this aperture 2211, i.e., said rim of the exit surface of the VR produces vignetting. On the contrary, in Augmented and Mixed Reality (AR/MR) applications, where the FOV is typically smaller, such a vignetting is usually not produced and rays the 2201, 2202, 2203 and 2207 are approximately parallel (more precisely, they virtually come from the ipixel of the upper edge of the image on the virtual screen) and so are 2204, 2205, 2206 and 2208 virtually coming from the ipixel of the lower edge).

Figure 23:
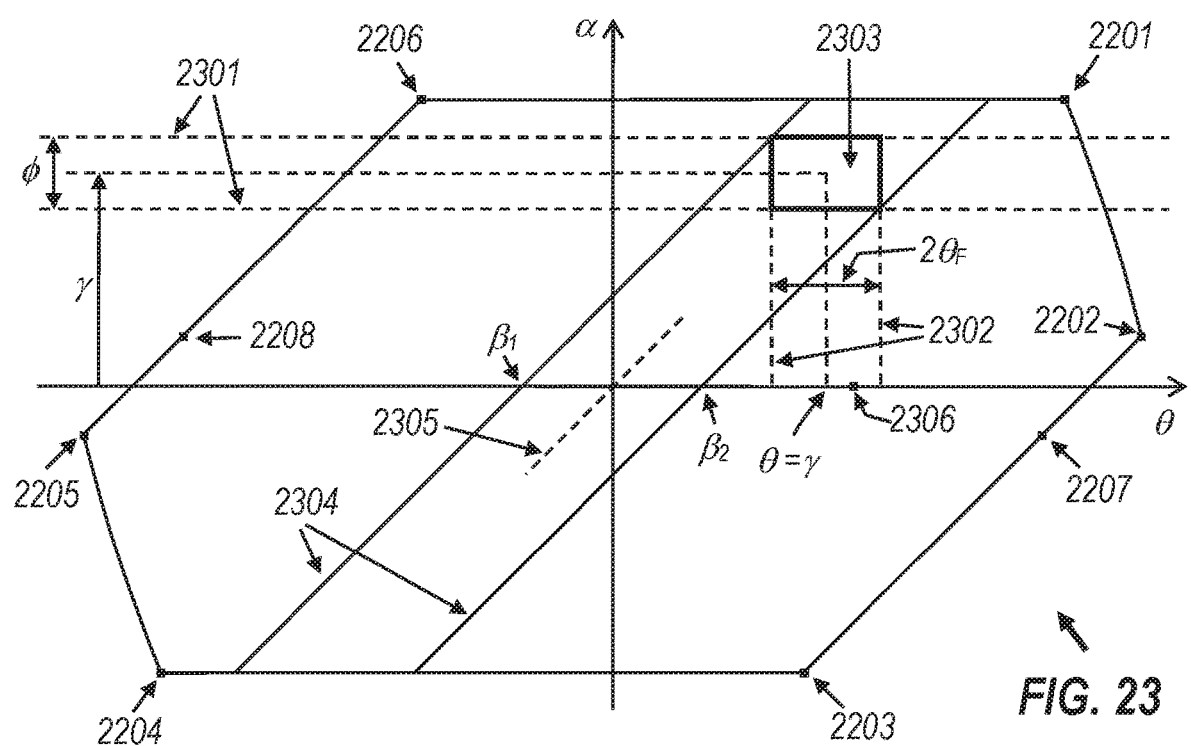
FIG. 23 shows a diagram whose points correspond to rays in a 2D phase space.

FIG. 23 shows a diagram where the rays in FIG. 22 are represented as points in a (θ,α) diagram. Matching numbering in FIG. 23 and FIG. 22 corresponds to the same light rays. As shown in FIG. 14, the pupil is rotated by an angle γ relative to the horizontal and spans an angle φ. The rays entering the pupil must then be contained between horizontal lines 2301 given by equations α=γ±φ/2. Different rays from the same 3D point must reach the pupil to allow accommodation. So, for each 3D point, different rays must be contained between lines 2301.

With the eye being focused at infinity the angular divergence of the rays reaching the fovea is $2\theta_F$. These rays are contained between the vertical lines 2302 given by equation $\theta=\gamma\pm\theta_F$. By intersecting the regions bound by 2301 and 2302 we get rectangle 2303 of rays that enter the pupil and reach the fovea. The center of this rectangle always lie on the straight line 2305 with equation α=θ. In this diagram, when angle γ varies (eye rotates), lines 2301 move up and down and area 2303 moves diagonally across the diagram keeping its center along line α=θ. Lines 2304 bounding the movement of 2303 are then given by $\alpha=\theta\pm(\theta_F+\phi/2)$. Observe that the rays sharing the same value of β form a line θ−α=β=constant and, therefore, lines 2304 and 2305 are lines of constant β being the value of the constant equal to the value of θ when α=0. Thus for lines 2304 $\beta_2=-\beta_1=\theta_F+\phi/2$.

Bundles of rays represented by a vertical line on this graph are rays sharing the same value of θ. Then this type of bundles contain the rays emitted by a point at infinity. A 3D pixel at infinity is formed by a small set of emitting points at infinity. Then, the rays of a 3D pixel at infinity are represented by a "thick" vertical line in this (θ,α) diagram. Resolution at infinity will be measured as density of these thick vertical lines between lines 2302 per unit of θ.

Phase Space Description of a 3D Pixel

Figure 24:
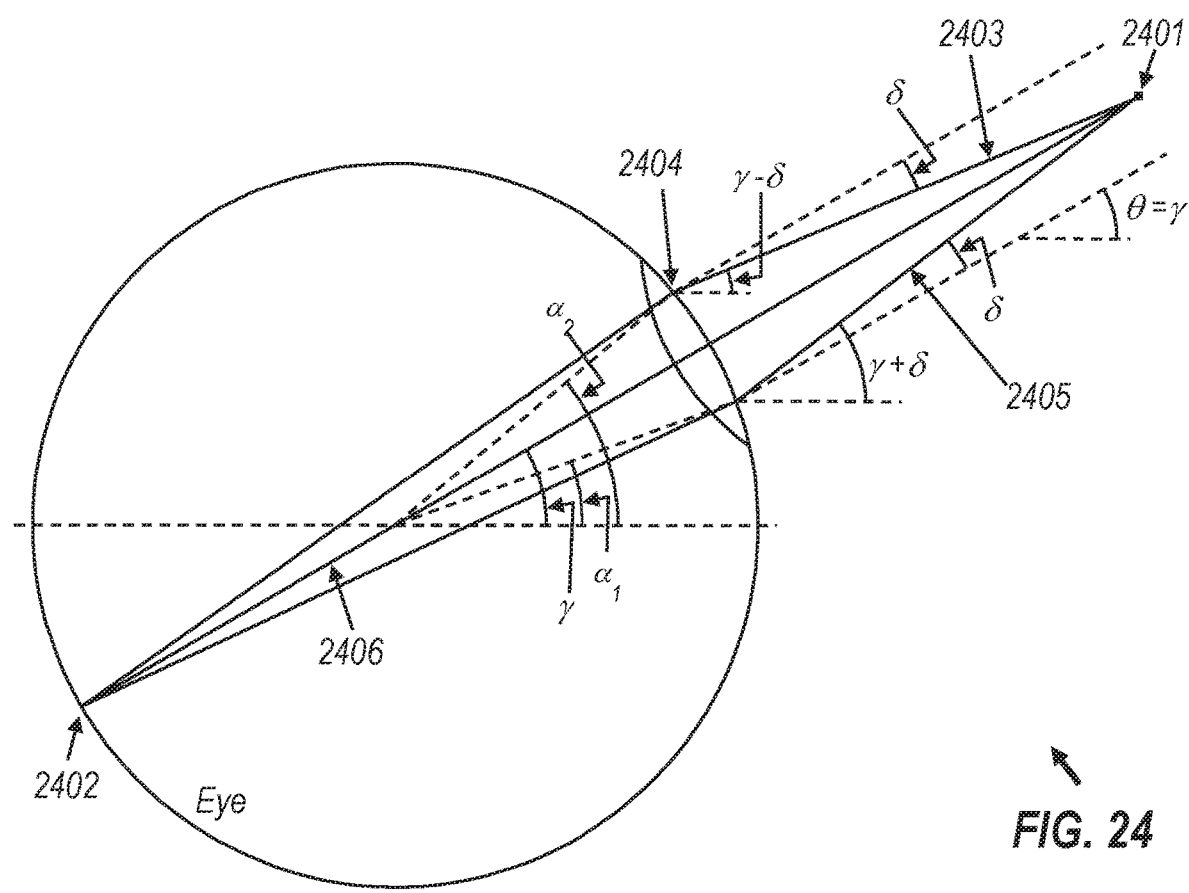
FIG. 24 shows rays involved in the accommodation process (2403, 2405, 2406).

FIG. 24 shows an eye accommodating on a 3D point 2401 and generating an image 2402 on the retina. In a (θ,α) diagram, ray 2403 is defined by position (γ−δ, $\alpha_2$). Note that since the radius of the eye is known, angle $\alpha_2$ defines the position of point 2404 where ray 2403 enters the eye. Accordingly, ray 2405 is defined by coordinates (γ−δ, $\alpha_1$). Central ray 2406 is defined by coordinates (γ,γ).

When the eye is accommodating at the point 2401, the rays reaching the fovea are not exactly the ones with $|\theta|=\leq\theta_F$ but the vertical lines are slightly tilted as we are going to see later. This doesn't affect the definition of the fovea region ribbon bounded by lines 2304.

Figure 25:
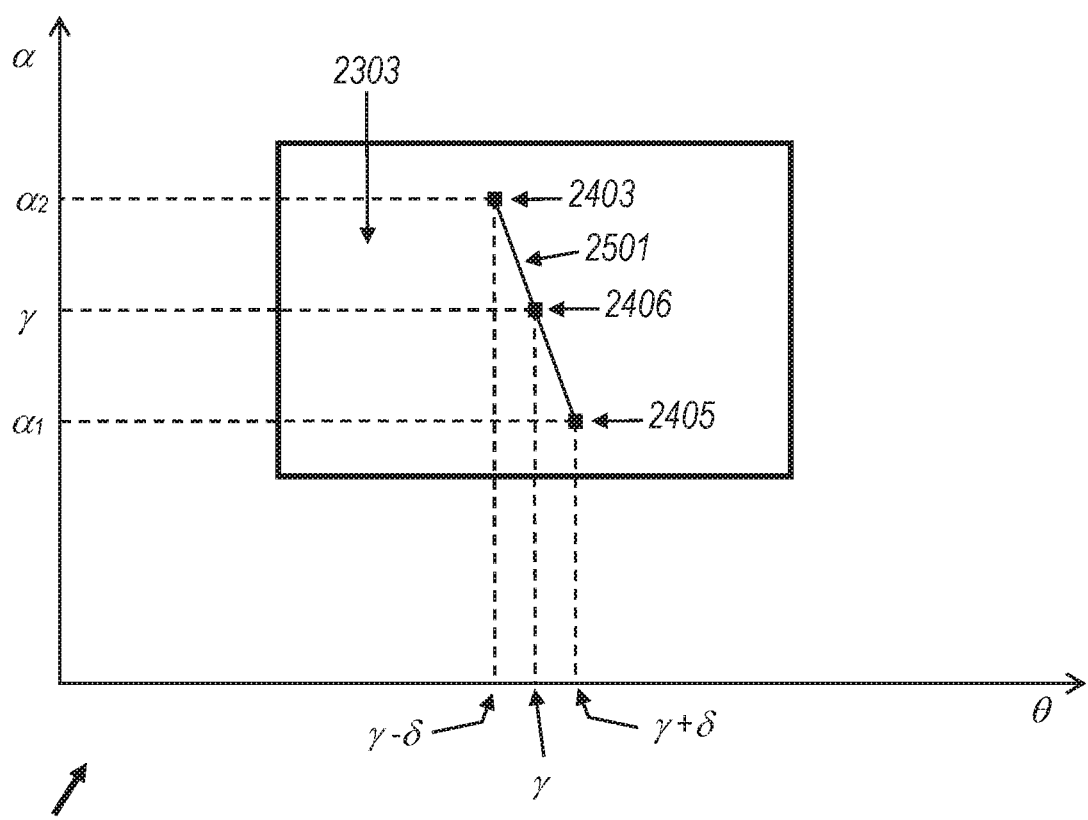
FIG. 25 shows a phase space (θ,α) diagram representation of rays involved in accommodation.

FIG. 25 shows the coordinates of rays 2403, 2405 and 2406 of FIG. 24 in region 2303 of FIG. 23. These rays are represented as points on a tilted line 2501. Note that a 3D point 2401 nearer the eye would have a higher value of angle δ and the vertical line 2501 would make a higher angle to the vertical. Also, a 3D point 2401 at an infinite distance would have δ=0 and line 2501 would be vertical. The bundle of rays issuing from 3D point 2401 at a finite distance from the eye do not form a straight line in the (θ,α) plane but we can approximate that it is so within the rectangle 2303. A 3D pixel at a distance D from the eye and at angle $\alpha_D$ emits rays that represented on the (θ,α) plane can be approximated by the straight line $(\alpha-\alpha_D)/(\theta-\alpha_D)\approx-D/r_e$ for the rays potentially reaching the fovea ($r_e$ is the eye sphere's radius).

Figure 26:
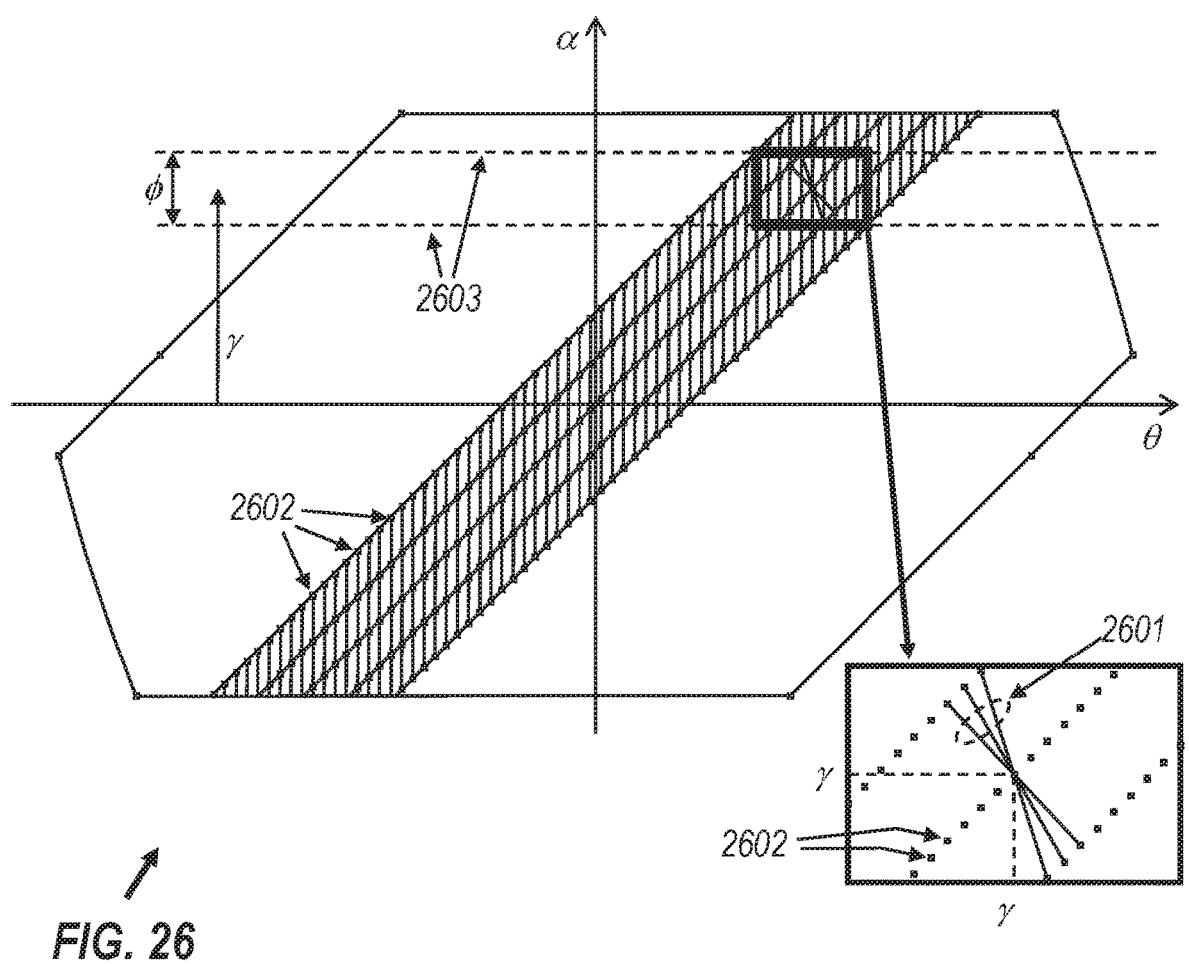
FIG. 26 shows a discretization of the light field with points in a (θ,α) diagram representing rays that can potentially reach the fovea when the eye rotates.

A perfect LFD would be able to modulate brightness and color of any ray potentially reaching the eye. Of course this is extraordinarily complex if not impossible. To simplify the problem, the number of rays with controlled brightness and color is reduced by choosing only a small subset and this small set is grouped in bundles that we have called pencils. This process is called discretizing the set of rays. FIG. 26 shows a discretization of the region between lines 2304 in FIG. 23. These are the rays that may reach the fovea for some allowable pupil position, i.e., varying angle γ. Each pencil is represented by small circle located on the region representing the rays that the pencil contains. This discretization is done in a rhomboidal matrix with θ=constant and β=constant lines and where the step in θ, Δθ is substantially smaller than the step in β, ΔB.

Using this discretization, 3D pixels at infinity can be reproduced by assigning the same brightness and color to the pencils whose representation in the (θ,α) plane are vertically aligned. Then, a high density of different pencils in θ corresponds to a high number of possible θ values with different brightness, i.e., corresponds to high resolution for an image at infinite distance. The low number of different pencils in β is desirable to reduce the number of independent pencils that the system needs to control, to sample or to store. Fewer pencils means a simpler implementation and fewer calculations when generating each frame while displaying an animated image. Nevertheless more than 1 different pencil for the same θ is needed at least to allow for accommodation at finite distances. A low number of β values is desirable to minimize the number of independent pencils, but too few pencils may lead uncomfortable accommodation (Huang 2014).

x-x' Light Field Discretization

An x-x' discretization is that for which the different pencils can be grouped in lines $x=x_0+\Delta x$ and in lines $x'=x'_0+\Delta x'$ where $x_0$, $x'_0$, are constants and $\Delta x$, $\Delta x'$ are only functions of x and x' respectively (in general constants). Because x is approximately only function of $\theta$ (because it is far from the eye) and x' is approximately only function of $\beta$, then this discretization is also called $\theta$, $\beta$ discretization.

Consider a pupil rotation $\gamma$ and a 3D point in direction $\theta$. A 3D pixel at finite distance from the eye can be reproduced by assigning the same brightness and color to the pencils whose representation in the $(\theta,\alpha)$ plane are aligned in tilted lines (with different angles to the vertical) 2601 that connect different points (rays). Vertical lines correspond to $D \to \infty$. By choosing other straight lines arrangements as shown in FIG. 26 we can reproduce the emission of a 3D pixel at distances $D_i=r_e(L/i-1)$ where $L=\Delta\beta/\Delta\theta$ and $r_e$ is the eye sphere's radius ($\approx$13 mm). For instance, assume $\beta_2=-\beta_1=12$ deg; $\Delta\beta=3$ deg and $\Delta\theta=0.05$ deg. Then $L=\Delta\beta/\Delta\theta=60$. Such discretization allows a resolution of $1/\Delta\theta=20$ ipixels per degree for an image at the virtual screen ($D_0 \to \infty$). 3D-pixels can be formed also at $D_1=767$ mm, $D_2=377$ mm, $D_3=247$ mm, and lower distances. This set of distances $D_0$ to $D_3$ (or even a subset of it) is enough to have a satisfactory accommodation (Huang 2014). The resolution for any distance is 20 ipixels/deg taking the central ray of the 3D pixel (the one with $\theta=\alpha=\gamma$) as the angle reference.

Sampling or Rendering a LF with a $\theta,\beta$ Discretization

Sampling or rendering a LF with a $\theta,\beta$ discretization (shown in FIG. 26) is surprisingly simple if we approximate $\beta$ as being proportional to x'. If it is so, a set of pencils of constant $\beta$ is just a set of pencils of constant x'. Then all we have to do is placing several pinhole cameras at the plane x' and sample the image seen from there. For instance, the pinhole camera located at $x'=x'_1$ will give us the brightness and color of the pencils corresponding to different values of $\theta$ and $\beta \approx \tan^{-1}(x'_1/r_e)$ where $r_e$ is the eye sphere's radius. The discretization values of $\theta$ only depend on the pinhole camera, and in general is such that $\Delta(\tan\theta)$ is constant, which is perfectly acceptable for our purposes. This will not generate exactly pencils 2602 but will approximate them. Referring to FIG. 15, parameter x' may be used as an approximation of $\beta$ and referring to FIG. 16, parameter x may be used as an approximation of $\theta$.

Displaying a LF with a $\theta,\beta$ Discretization

Figure 27:
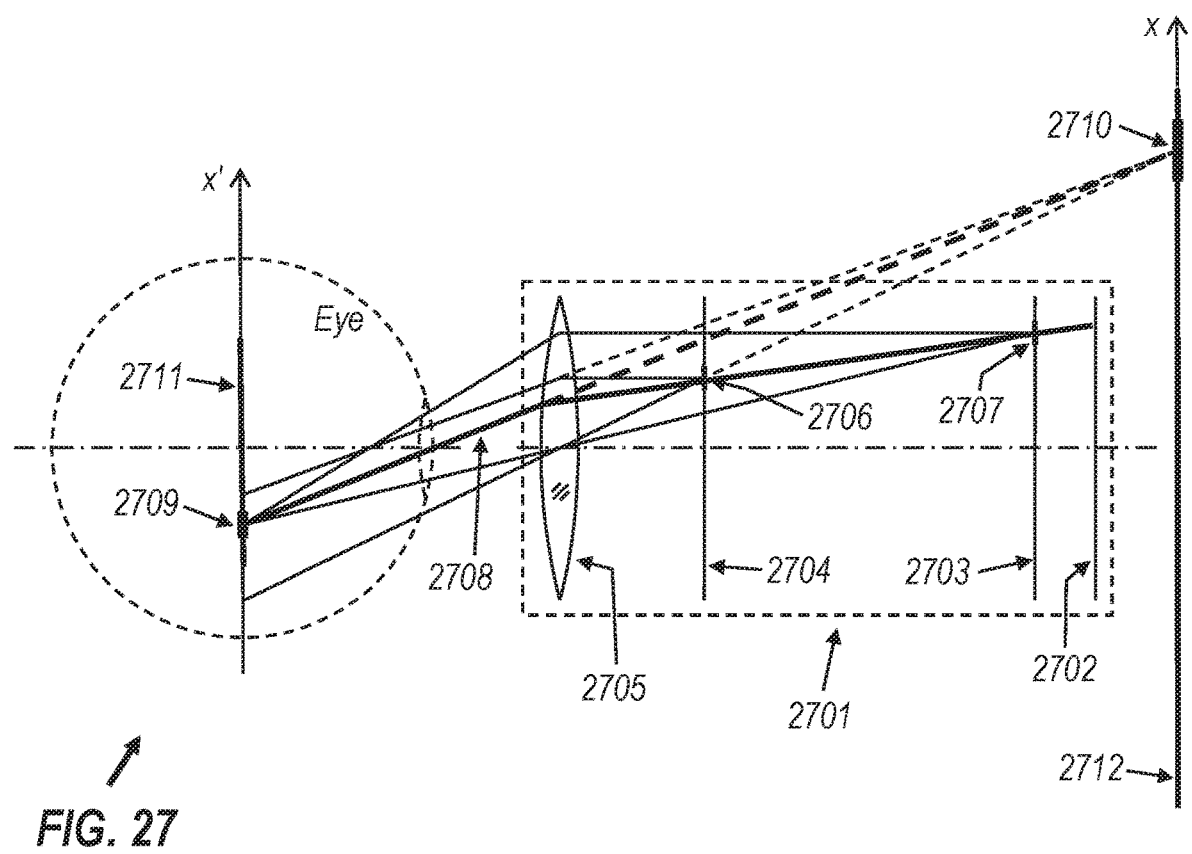
FIG. 27 shows an example of practical implementation of a preferred discretization of the light field.

Conceptually, displaying a LF with a $\theta,\beta$ discretization (shown in FIG. 26) can be done for instance as shown in FIG. 27. The device 2701 contains a backlight 2702 and two Liquid Crystal Displays (LCD) 2703 and 2704. The first one 2703 together with the backlight 2702 may be substituted by an emitting display such as an OLED display. The second display 2704 is an LCD transmissive type. An optic 2705 which may have refractive or reflective surfaces, or both types, forms a real image 2711 of display 2703 at a plane x' through the center of the eye (when the eye is not present) and a virtual image 2712 of display 2704 at a plane x away from the eye. A real light ray emitted from backlight 2702 and crossing points 2707 and 2706 in LCDs 2703 and 2704 will appear as a light ray 2708 crossing virtual image 2710 of 2706 and real image 2709 of 2707. In practice 2706 and 2707 will not be points but have a physical dimension. This means that 2708 will not be a ray, but a pencil limited by finite size images 2709 and 2710. Instead of points 2602 representing rays, we then have areas around those points in diagram $(\theta,\alpha)$ representing the corresponding pencils. In this configuration pencils with constant $\theta$ are approximately lit by rays passing through the same pixel of 2704 and pencils with constant $\beta$ are approximately lit by rays passing through the same pixel of 2703. FIG. 27 shows only a schematic system that achieves exactly the $\theta,\beta$ discretization. The calculation of the images at 2703 and 2704 to generate the LF can be done by using nonnegative tensor factorizations, but when the number of views is small (as disclosed here in) the quality of the factorization. may not be good enough and a time multiplexing scheme may be required to improve it.

The non-negligible size of these pencils is important in the way the device works. As the eye rotates varying angle $\gamma$, region 2303 moves along lines 2304. In its movement, region 2303 moves over part of some pencils (that then become partially visible) and leaves part of other pencils (that become partially out of sight).

Figure 28:
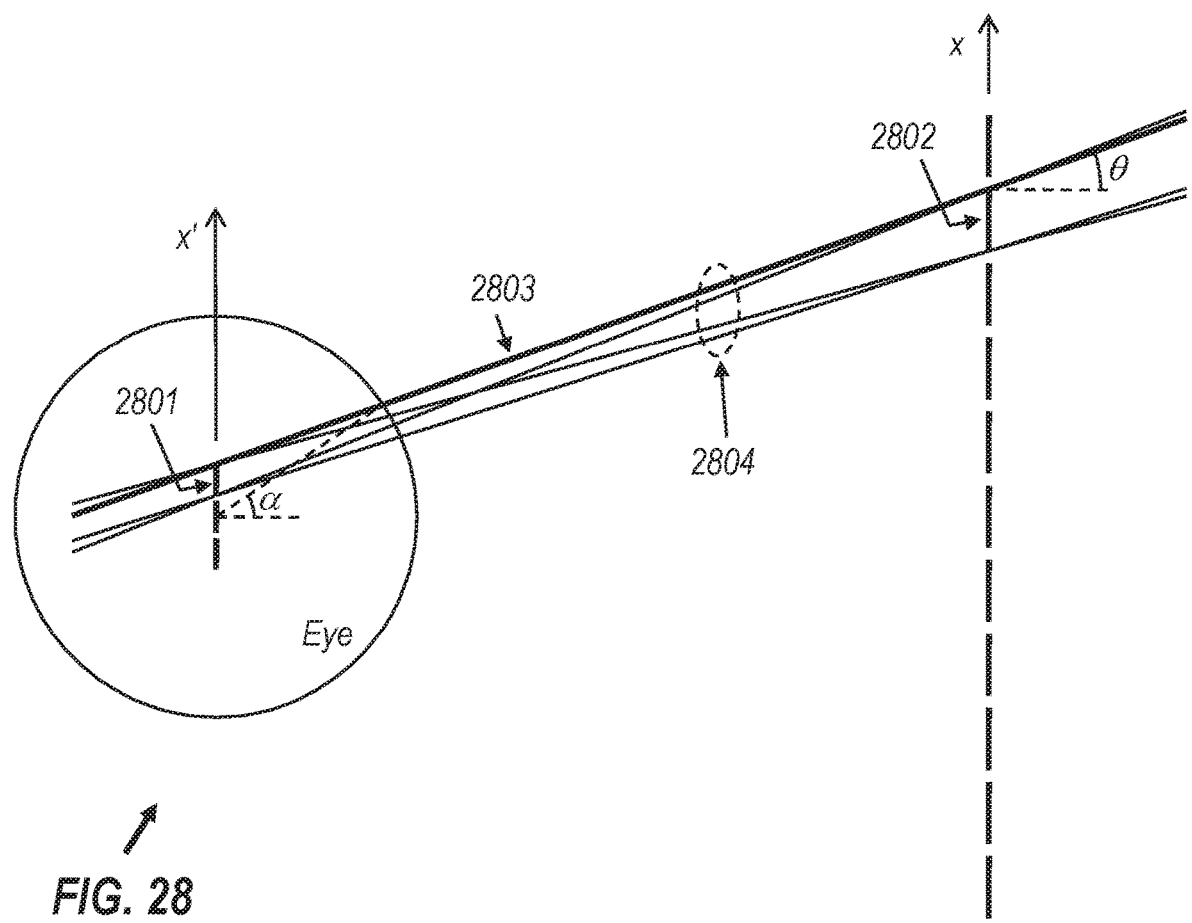
FIG. 28 shows the edge rays of a pencil generated by the exemplary implementation in FIG. 27.

FIG. 28 shows a pencil 2804 defined by real image 2801 (pencil print), similar to 2709 in FIG. 27 and virtual image 2802 (ipixel), similar to 2710 in FIG. 27. Edge ray 2803 of the pencil may be defined by parameters $(\theta,\alpha)$. The other edge rays of the pencil shown cross the edges of 2801 and 2802. For clarity of the figure, the size and positions of real and virtual images 2801 and 2802 are not to scale relative to a realist design.

Figure 29:
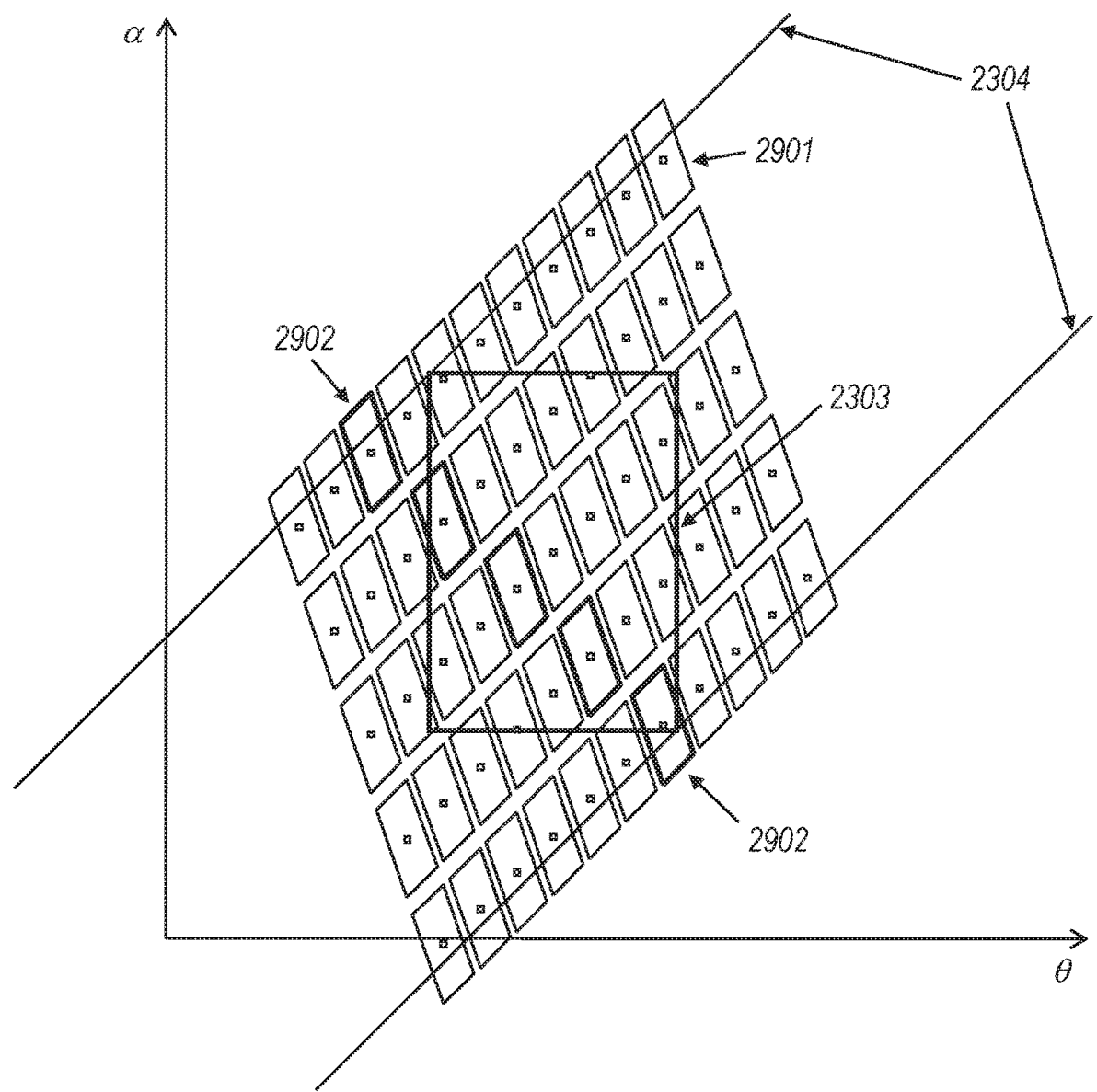
FIG. 29 shows the finite area occupied by pencils in a (θ,α) diagram. It also highlights the pencils 2902 involved in accommodation.

FIG. 29 shows a $(\theta,\alpha)$ representation of pencils, such as pencil 2804 shown in FIG. 28. Each pencil such as 2804 is represented by a quadrilateral shape 2901. The tilt and size of the quadrilateral shapes are not shown to scale.

FIG. 29 also shows lines 2304 (see FIG. 23), that limit the rays that can potentially reach the fovea and area 2303 of rays that enter the pupil and reach the fovea. Area 2303 covers totally or partially a set of pencils that are totally or partially visible, respectively. As the eye rotates, angle $\alpha$ varies and area 2303 moves along lines 2304. In this movement, area 2303 moves over some pencils that become totally or partially visible and leaves behind other pencils that become totally or partially invisible.

In order to display a 3D pixel at a given distance (such as position 2401 in FIG. 24) one may lit, for example, pencils 2902, defining a tilted line (similarly to 1 element of 2601 in FIG. 26). Tilted line 2902 must have several pencils to allow accommodation. The density of lines (such as 2902) along the $\theta$ axis defines the resolution of the system.

People have a tendency to look forward, i.e., small $|\gamma|$ angle, which means that in general rays at small $|\alpha|$ angles are more important. Therefore, as $|\alpha|$ increases, one may reduce the number of pencils in each line 2902, reducing the ability of the optical system to provide accommodation information.

Figure 30:
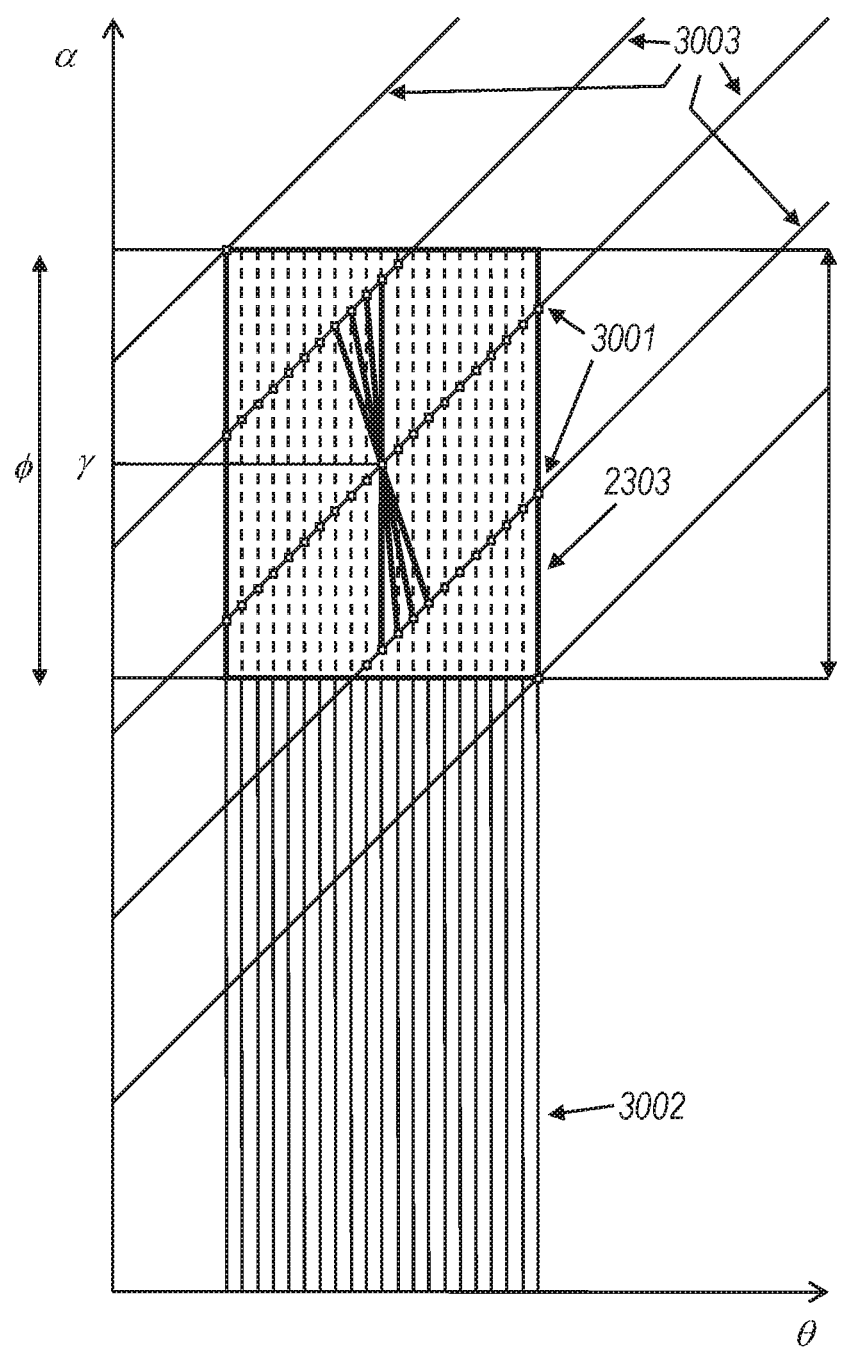
FIG. 30 shows a (θ,α) diagram for an embodiment of the current invention showing a high resolution.

FIG. 30 shows another representation of the phase space shown in FIG. 29. The centers of the pencils 3001 are at the intersections of lines 3002 (constant $\theta$) with lines 3003 (constant $\beta$). As said before, the resolution of the system is given by the density of lines 3002.

Figure 31:
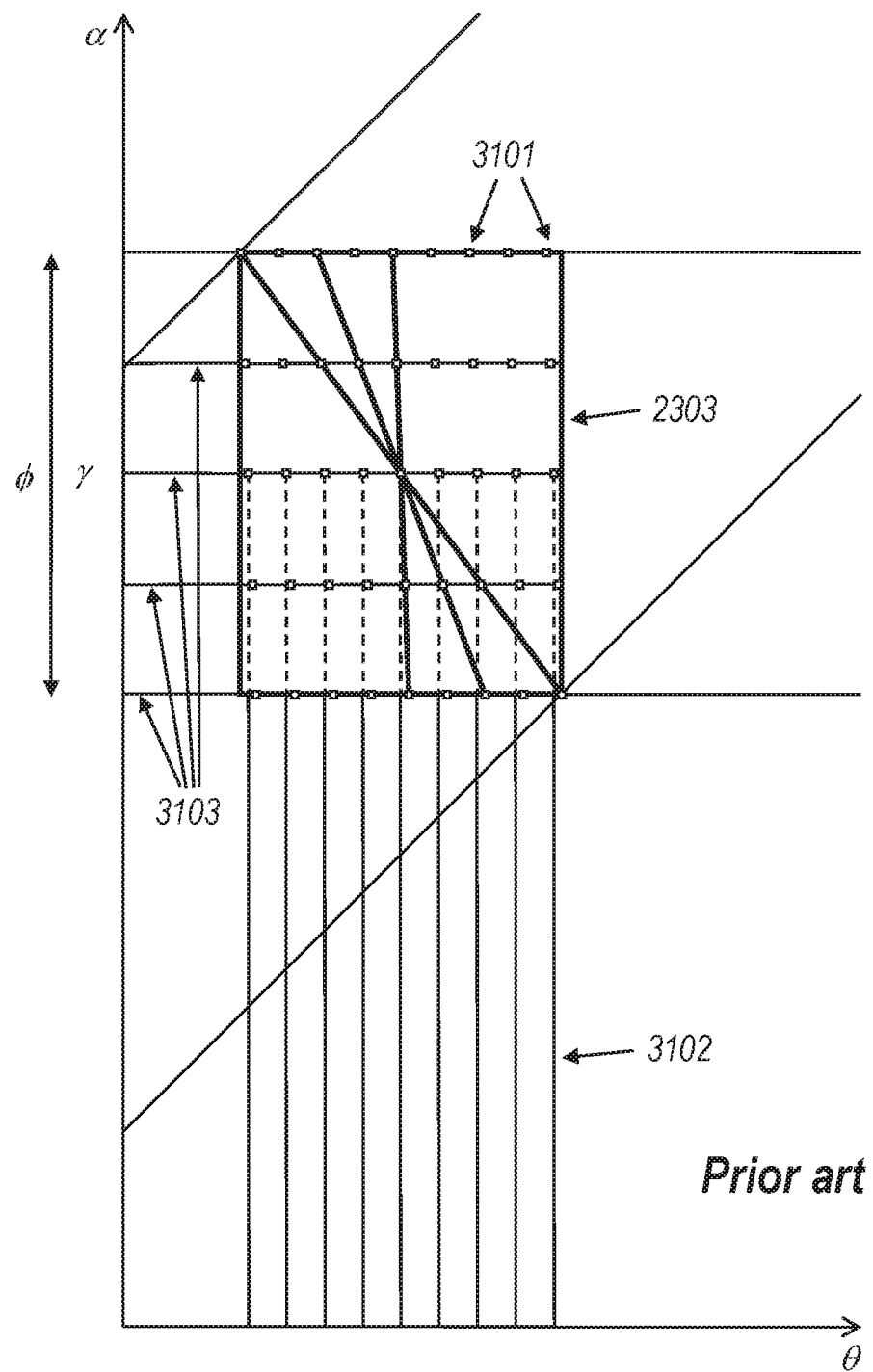
FIG. 31 shows a (θ,α) diagram for an embodiment of the prior art, showing a low resolution.

FIG. 31 shows a $(\theta,\alpha)$ representation of the prior art (Mali 2017). Here, the centers of the pencils 3101 are at intersections of lines 3102 of constant $\theta$ with lines 3103 of constant $\alpha$. The resolution of the system is lower than in FIG. 30, as indicated by the low density of lines 3102.

The number of points (pencils) inside area 2303 is approximately the same in the embodiment in FIG. 30 and in the prior art of FIG. 31. However, the resolution in FIG. 30 is clearly higher than in the previous art of FIG. 31.

The number of pencils usable for accommodation (see element 2601) is lower in the configuration of FIG. 30, but the resolution is higher. This is advantageous since a large number of pencils is not needed to guarantee accommodation.

The configuration of FIG. 30 has another advantage: sampling (or rendering) of the LF can be easily done with a few number of pinhole cameras (as many as different β=constant lines are), while in the previous art of FIG. 31, sampling requires more pinhole cameras (as many as different constant α lines 3103 are).

Light Field Discretization with Accommodation Pencils

Figure 32:
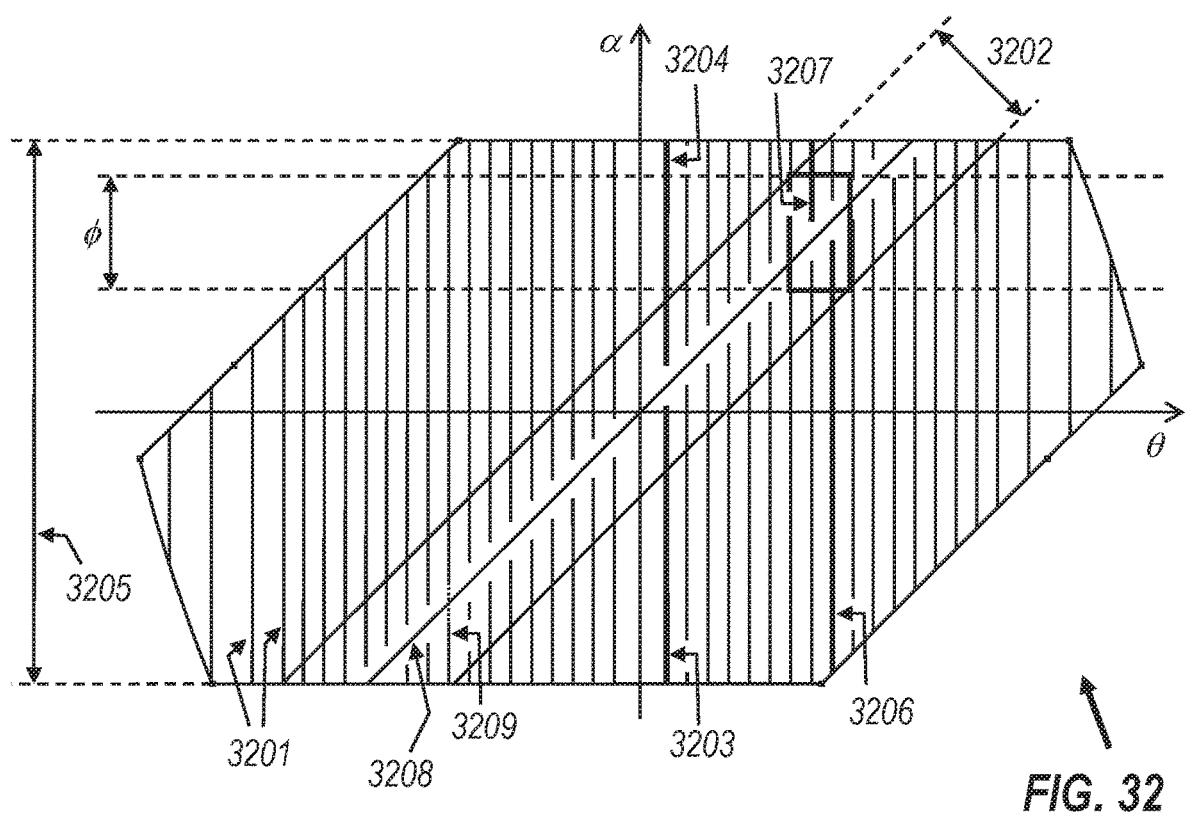
FIG. 32 shows accommodation pencils divided along line β=0, or α=θ and how these may be used for displaying accommodation information.

FIG. 32 shows a discretization of space (θ,α) in vertical pencils. Each vertical line represents a pencil which is very extended in α and very narrow in θ. The rays of some of these pencils, such as 3201, never intersect the ribbon 3202 defined by the rays that can potentially reach the fovea and, therefore, do not intervene in accommodation. For these pencils there is no need to add the information on the distance to the 3D pixel. These are peripheral pencils.

If the image to be shown to the fovea has a resolution of M 3D pixels, then at least M pencils are needed to show them. If the information of accommodation (distance to the 3D pixel) is also to be included for each 3D pixels, then one single pencil per 3D pixel is no longer sufficient and at least another one is needed, resulting in a total of at least 2M pencils (4M or 9M may be consider more conservative numbers to produce a more natural retinal blur). For each gazeable 3D pixel (whose pencils have rays in area 3202 and so can potentially reach the fovea) we consider two pencils (for example 3203 and 3204) separated by line 3208 through the center of the fovea, for which α=θ. These pencils 3203 and 3204 are essentially vertical and cover a small range of angles θ. Said pencils are accommodation pencils because their pencil print is partially inside region 3202. Said pencils may even extend beyond the pupil range 3205, but those rays outside the pupil range will never be visible because the pupil will not rotate to those regions.

When accommodation information needs to be included, pencils of identical or different θ values in the fovea region 3202 may be lit to represent the 3D pixel at different distances from the eye. This is represented by exemplary pencils 3206 and 3207. In this particular configuration there are only 2 pencils available to generate a 3D pixel. In a real 3D geometry, i.e., taking into account not only the rays contained in the plane x-x' but also the remaining ones, this configuration may be formed by more than 2 accommodation pencils such that the pencil prints in the x'y' plane enter into the foveal region and are around the center of the eye and almost tangent to it.

For directions of peripheral vision θ that will never be gazed (such as peripheral pencils 3201 that are outside the fovea region 3202), the resolution (density of pencils on the θ axis) may be reduced as it is done in FIG. 32.

Figure 33:
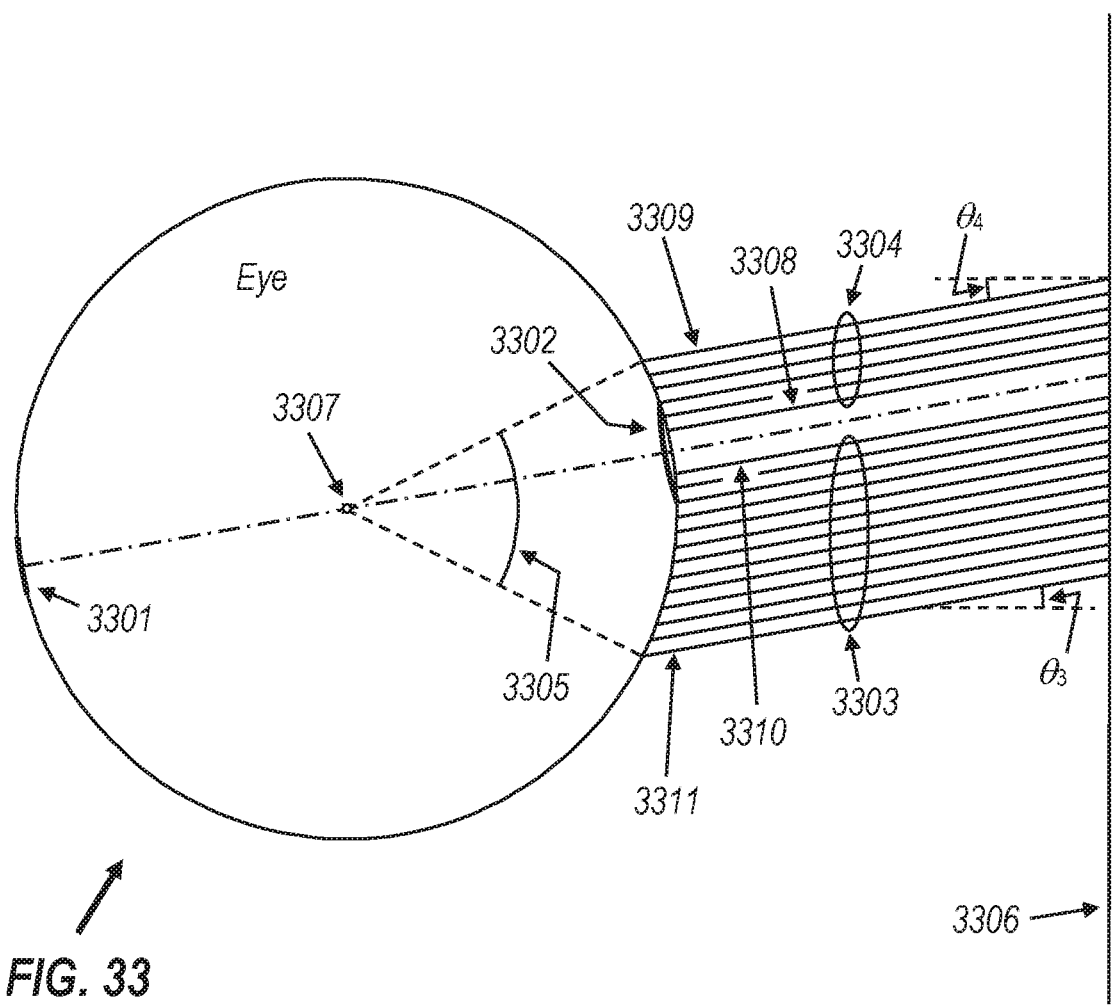
FIG. 33 shows the accommodation pencil division of FIG. 32 in terms of a diagrammatic representation of rays.

FIG. 33 shows pencils 3303 and 3304 corresponding to elements 3203 and 3204 in FIG. 32. FIG. 33 also shows pupil range 3305, fovea 3301, eye pupil 3302 and eye center 3307. Pencils 3303 and 3304 are emitted from aperture 3306 of an optic. Pencils 3303 and 3304 may extend beyond pupil range 3305, but those rays will not be seen because the eye pupil 302 will not reach those extreme positions.

The optic must produce a good image quality for rays such as 3308 or 3310 that may reach the fovea. However, for rays such as 3309 or 3311 that will never reach the fovea, the image quality produced by the optic may be relaxed. The accommodation information is encoded in the light field if one picks pencils that have different angles $\theta_3$ and $\theta_4$, as indicated by pencils 3206 and 3207 in FIG. 32. Only the central rays (such as 3308 and 3310) of pencils 3304 and 3303 enter the pupil 3302 reaching the fovea 3301, and only those are used in accommodation for that particular pupil position.

Figure 34:
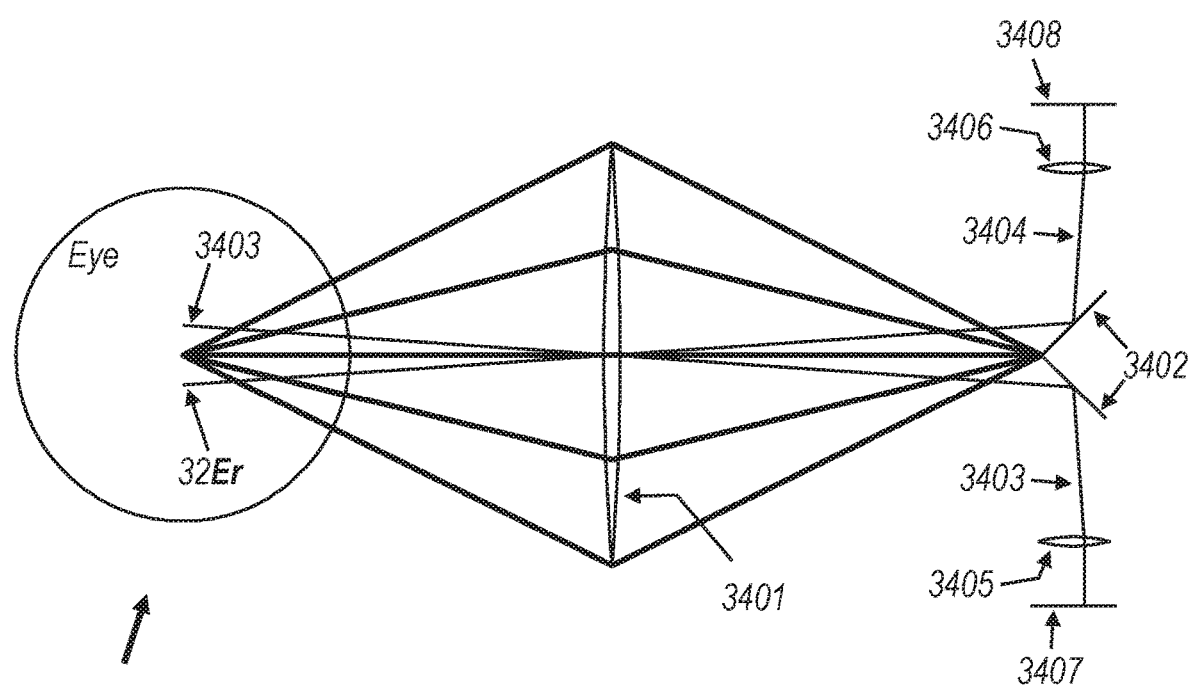
FIG. 34 shows a diagrammatic representation of a possible practical implementation of the configuration in FIG. 32.

FIG. 34 shows a diagrammatic representation of a possible implementation of the pencil separation represented in FIG. 32. Consider rays travelling in reverse direction from within the eye towards the outside world. Optic 3401 (which may have refractive or reflective surfaces, or both types) forms an image of the center of the eye onto the vertex of V-shaped mirror 3402. Said mirror splits rays 3403 and 3404 through optics 3405 and 3406 (which may also have refractive or reflective surfaces, or both types) onto displays 3407 and 3408. In a real 3D geometry, this mirror wouldn't be in general V-shaped but pyramidal. For instance using a square base pyramid and 4 displays it is possible to implement a LFD with 4 accommodation pencils per 3D pixel.

Figure 35:
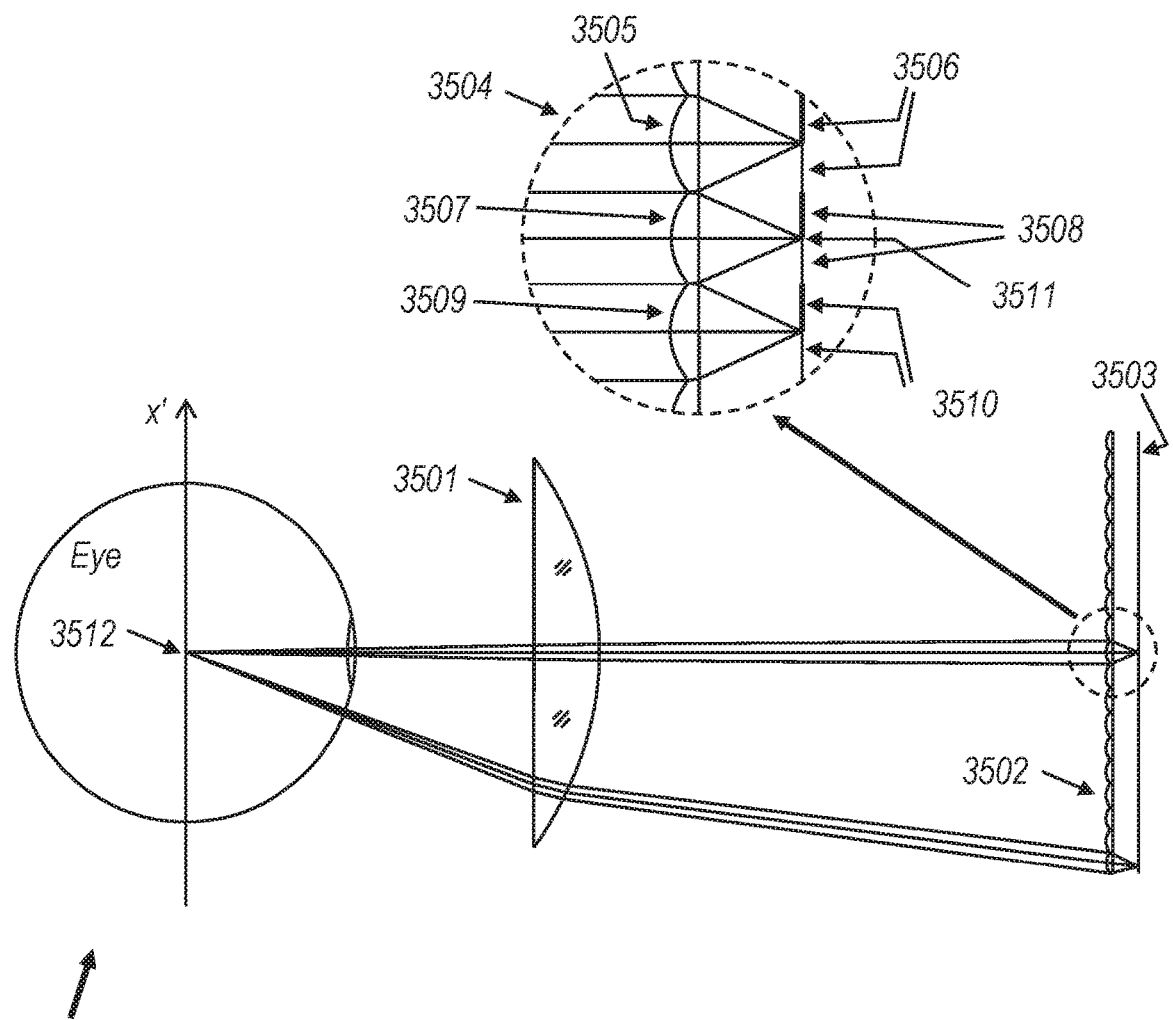
FIG. 35 shows another possible configuration in 3D geometry with 4 accomodation pencils/3D pixel.

FIG. 35 shows another possible configuration in 3D geometry with 4 accommodation pencils/3D pixel. This configuration combines a conventional HMD whose "non-fight-field" display is replaced by a special display to transform the whole unit in a HMD with accommodation capability.

The embodiment shown in FIG. 35 comprises an optic 3501 a lens array 3502 and a special display 3503. The only difference with a conventional HMD is that in the later there is no a lens array and the display is located at the aperture plane of 3502.

Optic 3501 forms a virtual image (not shown) of the aperture of the lens array 3502 far to the right in the same way that a conventional HMD optic forms a virtual image of its display.

Insert 3504 shows a detail of the lens array and special display. Microlens 3505 as a cluster with two red pixels 3506 associated to it. Microlens 3507 has a cluster with two green pixels 3508. Microlens 3509 has a cluster with two blue pixels 3510. This forms a set that repeats along the lens array 3502 and special display 3503.

Rays emitted from the center 3511 of the green cluster are collimated by microlens 3507, collected by optic 3501 and focused at the center of the eye 3512. The top green pixel of cluster 3508 is then imaged on axis x' below the center of the eye 3512. Accordingly, the bottom green pixel of cluster 3508 is imaged on axis x' above the center of the eye 3512. This generates a green edge pencil that illuminates axis x' above eye center 3512 and another pencil that illuminates axis x' below eye center 3512. These pencils are of the type 3203 and 3204 shown in FIG. 32. The same reasoning may be applied to the red cluster 3506 and blue cluster 3510. FIG. 35 depicts a two-dimensional configuration. In three dimensions, cluster 3506 would have four red pixels under microlens 3505. Accordingly, there would be four green and four blue pixels in each corresponding cluster.

The design steps for transforming a "non-light-field" VR system in a LF one with 4 accommodation pencils/3D pixel are:

1. Take any existing VR lens design which uses a conventional electronic display, for instance, with RBG stripe design.

2. Substitute the display with a new one which is made as follows:

2.1 The display uses a 2× higher ppi electronic display with the same subpixel geometry as the original one, but such that each subpixel is replaced by 4-adjacent pixels that have now the same color as the subpixel that they substitute.

2.2 In front of each cluster place a microlens whose aperture has the same size and contour as the cluster. Notice that each of these microlenses have its own color (that of its subpixels) and its aperture occupies the same area as the subpixel of the conventional electronic display of step 1. Then the array of microlenses has a resolution (in ppi) identical to that of the conventional electronic display of step 1.

2.3 The microlens profiles are designed with the following minimum condition: the cluster center is imaged, through the VR lens, on the center of the eye cavity (i.e., on the origin point of the plane x'=y'=0). Preferably the microlens is also imaging the points on the neighborhood of the cluster center (at the emission plane) on the plane x',y', so the pixel pattern of every cluster is reproduced as pencil prints on the plane x',y'.

The microlens design should be such that the cluster must illuminate trough the microlens the full pupil range. in conventional VR lenses with focal lengths around 40 mm, this implies the microlens should emit the light with a half angle of about 15 to 20 degs and have an f-number in the 2.5 to 3.5 range. For instance, for f/3 and 45 micron microlens side, the microlens focal length will be around 135 microns. On the other hand, the magnification ratio of the microlenses between the plane of the clusters and the plane passing thought the center of the eye (plane x',y') is approximately the ratio of the focal lengths (40/0.0135), so about 300 in this example. This means that a 4 mm disk the plane (x',y') will correspond to a 13 micron disk on the clusters' plane. A gap between clusters of 3 to 5 microns should be a good design value, provided that the f/3 microlens of this example, if diffraction limited, will resolve about 3.5 microns in the visible spectrum.

A configuration with other number of accommodation pencils/3D pixel is trivial from this description for the case of 4.

A similar strategy can be used to capture a Light Field, just substituting the display by a sensor, so each microlens has its own color filter.

Figure 36:
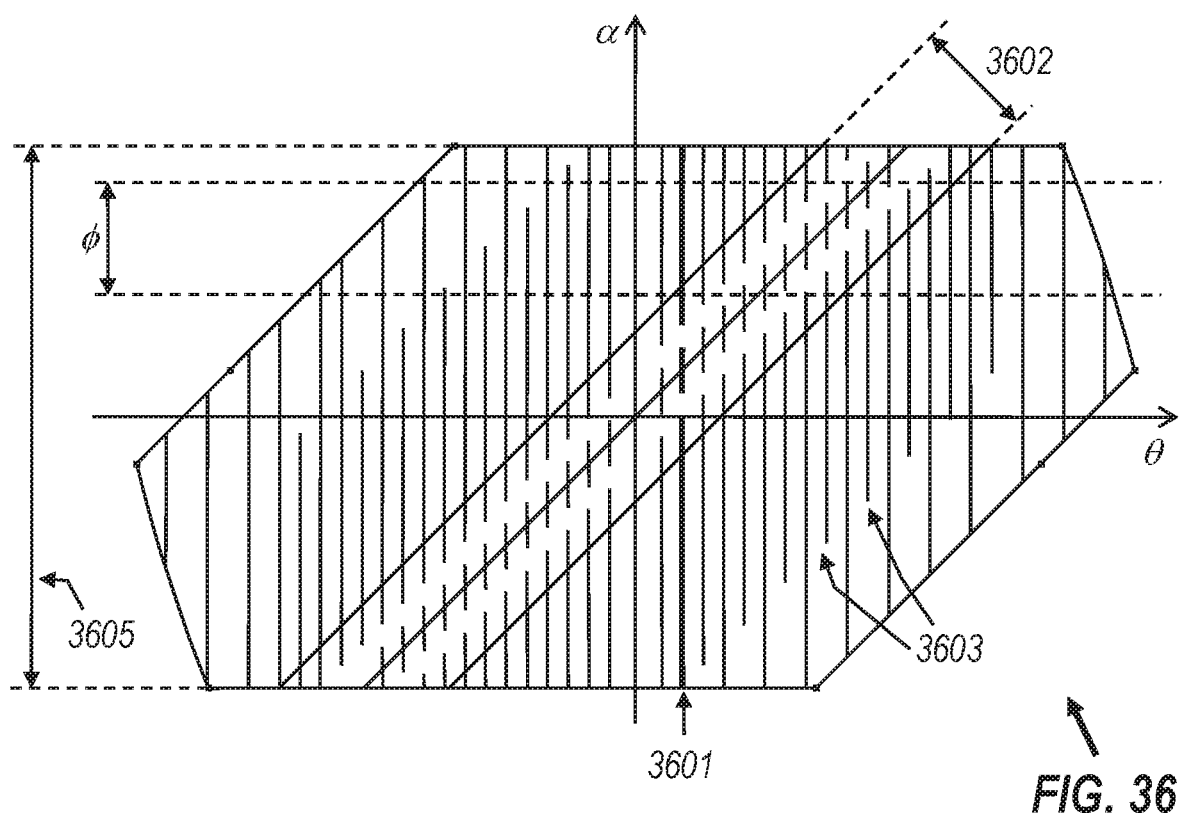
FIG. 36 shows a configuration similar to that in FIG. 32 but with an increased number of pencils that may reach the fovea, improving the accommodation.

FIG. 36 shows a configuration similar to that shown in FIG. 32, but in which we now have three accommodation pencils 3601 for a given value of θ (or a narrow range of θ values), as represented by the three bold vertical lines. The phase space foveal region 3602 now includes part of the top and bottom pencils of 3601 and the full pencil at the center of 3601, in a total of three pencils that may contribute to accommodation.

The resolution away from the foveal region 3602 may be lower and not all pencils need to extend to the edges of diagram (θ,α), as exemplified by short pencils 3603, reducing the resolution in those areas.

Figure 37:
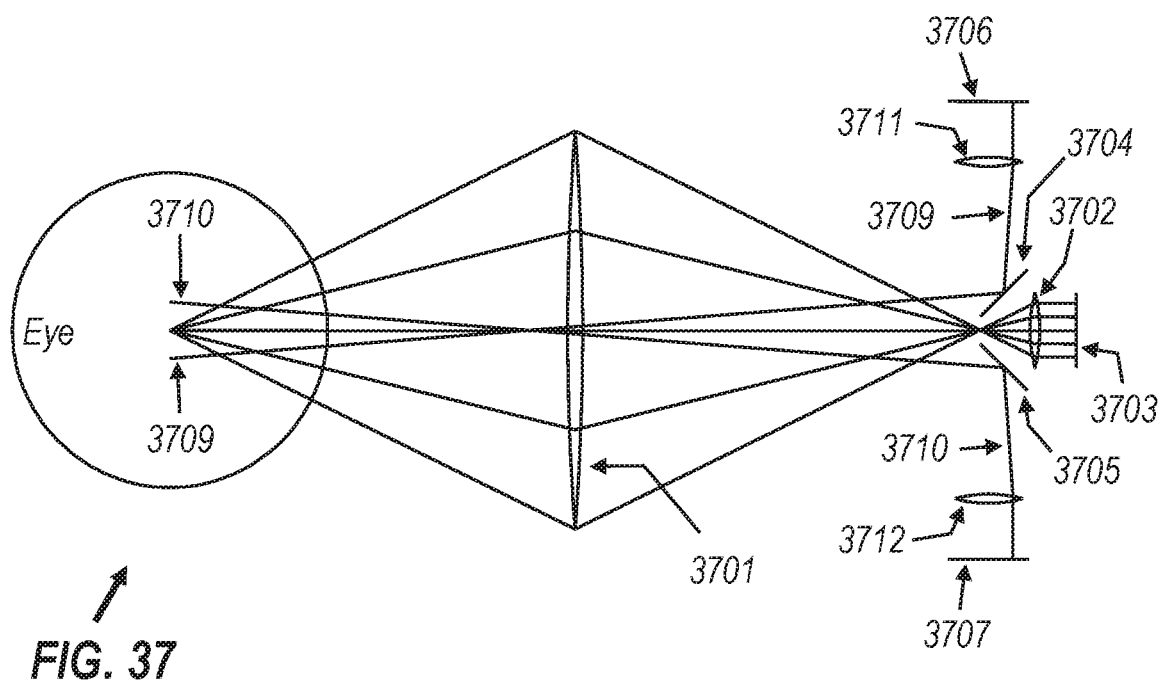
FIG. 37 shows a diagrammatic representation of a possible practical implementation of the configuration in FIG. 36.

FIG. 37 shows a diagrammatic representation of a possible implementation of the pencil discretization represented in FIG. 36. Consider rays travelling in reverse direction from within the eye towards the outside world. Optic 3701 which may have refractive or reflective surfaces, or both types) forms an image of the center of the eye whose central part is captured by an optic 3702 (which may also have refractive or reflective surfaces, or both types) onto a display 3703. The remaining rays coming from the center of the eye are split by mirrors 3704 and 3705. Said mirror splits rays 3709 and 3710 through optics 3711 and 3712 (which may also have refractive or reflective surface, or both types) onto displays 3706 and 3707.

Figure 38:
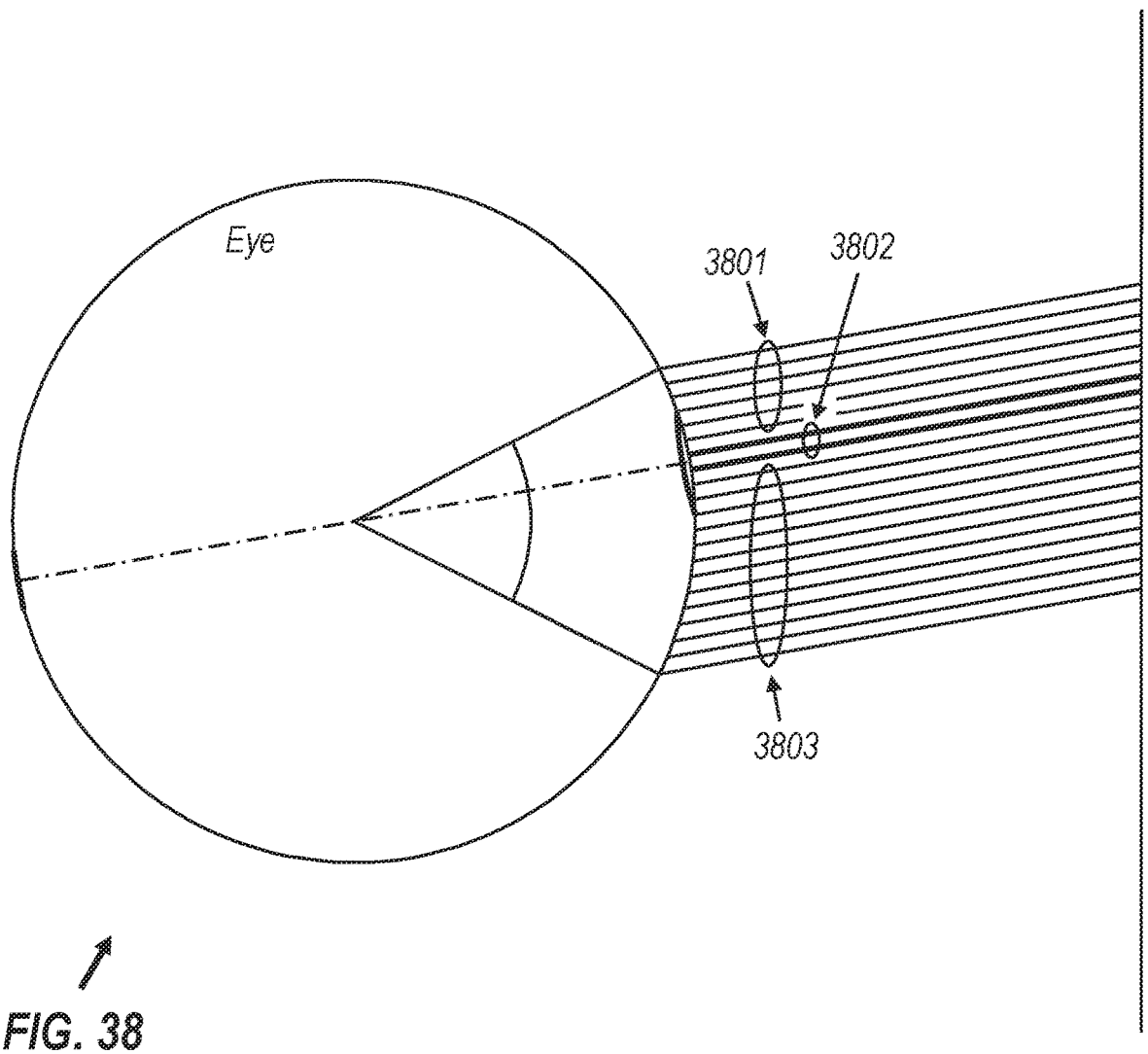
FIG. 38 shows the accommodation pencil division of FIG. 36 in terms of a diagrammatic representation of rays.

FIG. 38 shows three pencils 3801, 3802 and 3803, as represented by the three pencils 3601 in FIG. 36. Also in this case, to generate a 3D pixel at a finite distance, the three pencils 3801, 3802 and 3803 may be selected to have different θ values, as was the case in the configuration show in FIG. 33.

Figure 39:
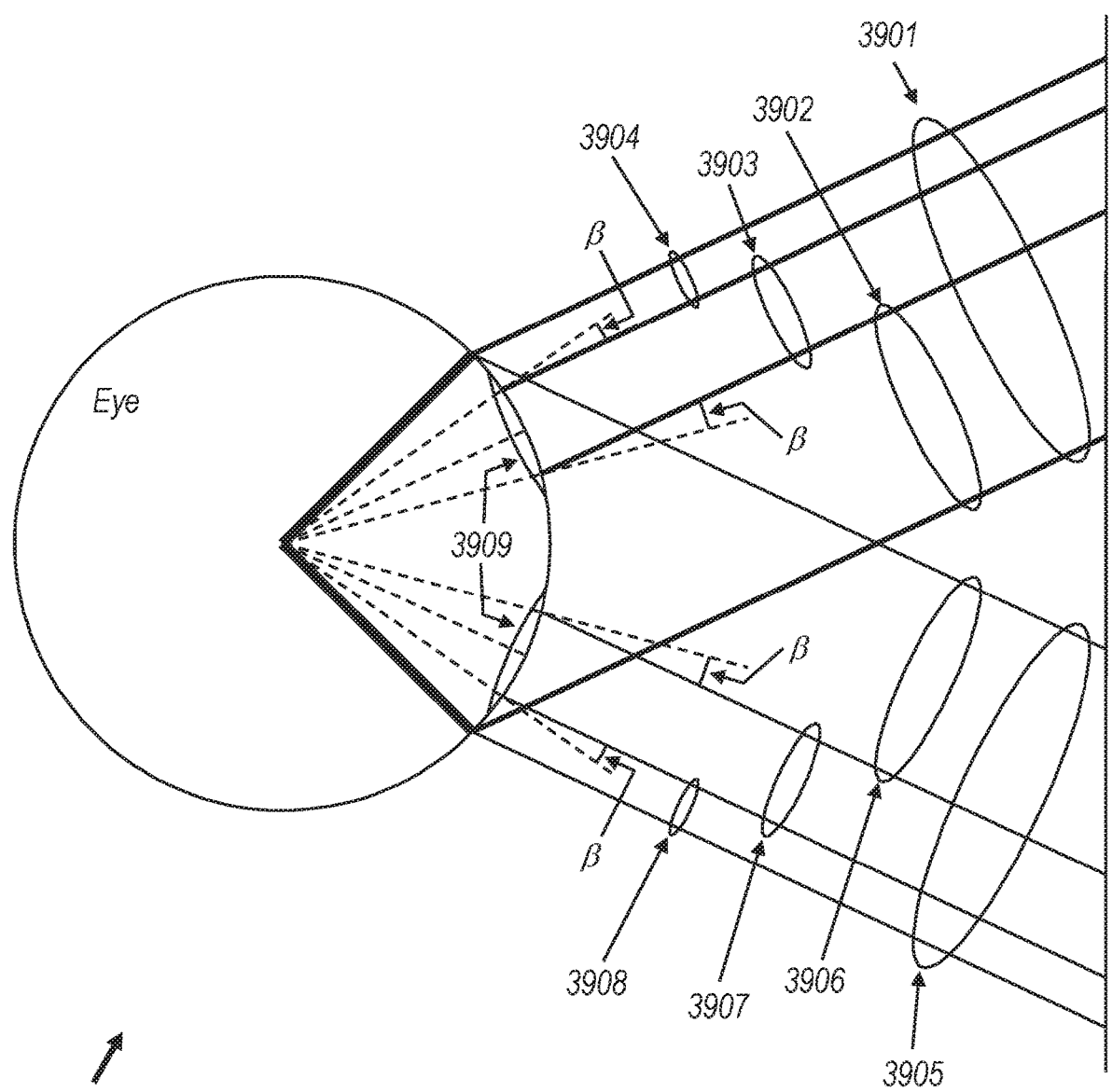
FIG. 39 shows how a consistent division of accommodation pencils for different pupil positions occurs at constant values of angle β.

FIG. 39 shows the ray trajectories of the three accommodation pencils 3601 for a given value of θ of FIG. 36. These three pencils 3902, 3903 and 3904 together form the bundle 3901. Also, pencils 3906, 3907 and 3908 gathered together form bundle 3905. In order to always divide the bundles consistently inside the pupil for different pupil positions 3909, the splitting occurs along rays of constant angle β. In a (θ,α) diagram, the pencils are then limited along lines of constant β, such as lines 2304 in FIG. 23.

Figure 40:
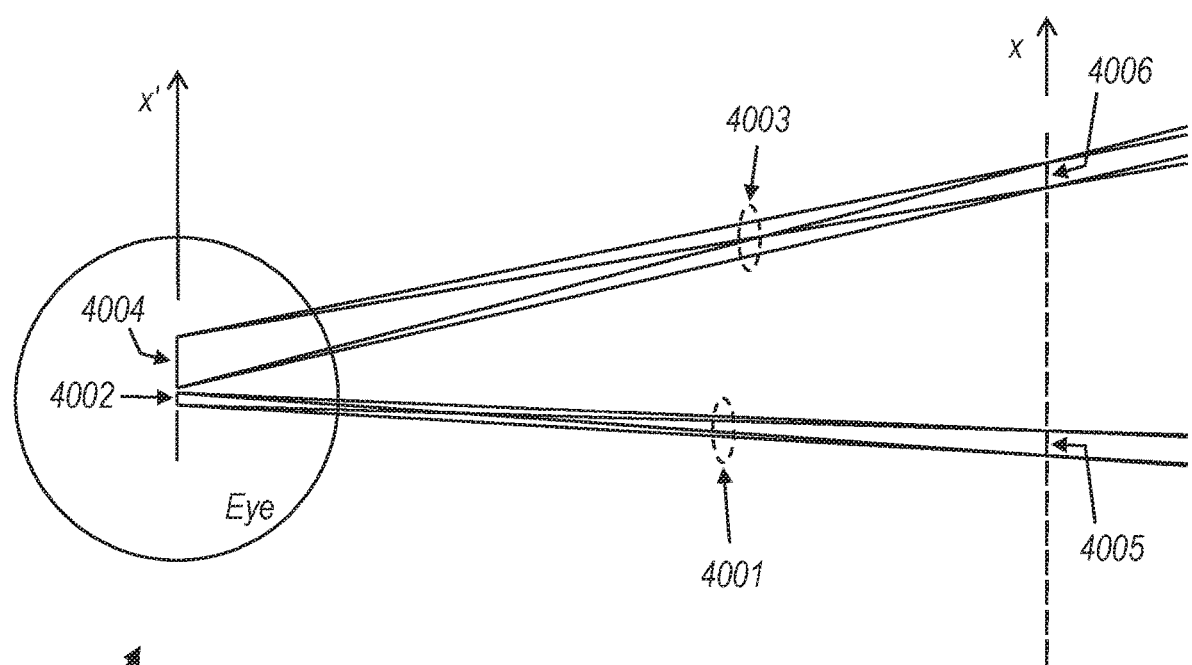
FIG. 40 shows pencils whose beam prints on axis x' have different areas.

FIG. 40 shows a configuration similar to that in FIG. 28 but in which the pencils have beam prints of different sizes on axis x'. Pencils such as 4001 that intersect axis x' near the center of the eye have a small beam print 4002. However, pencils such as 4003 that intersect axis x' further away from the center of the eye have a large beam print 4004. Pencils 4001 and 4003 are also bound by corresponding ipixels 4005 and 4006.

Remember that due to limited pupil range, a discretization in angle β, as illustrated in FIG. 39, is approximately equivalent to a discretization in coordinate x' as illustrated in FIG. 40 (see FIG. 15).

Figure 41:
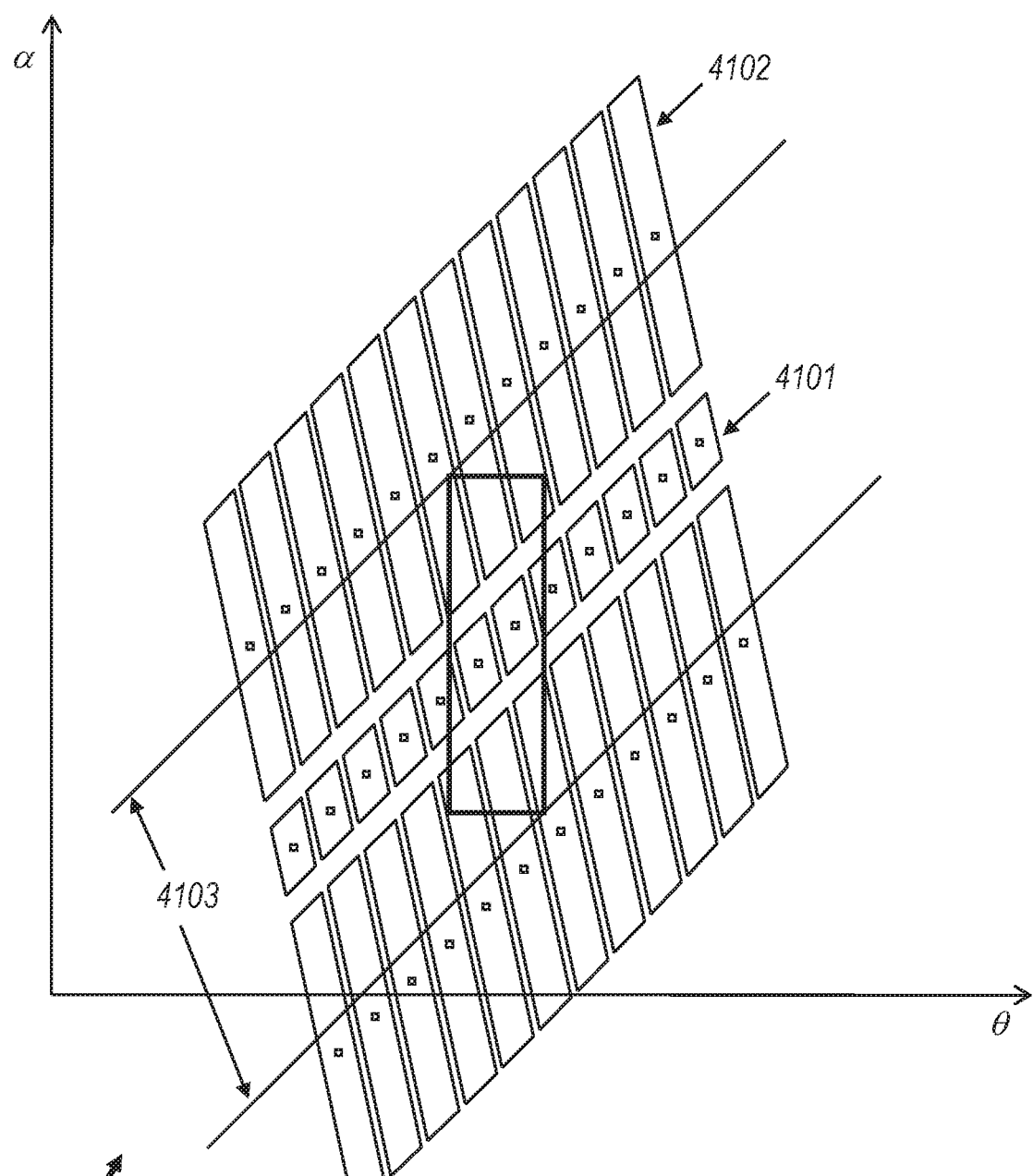
FIG. 41 shows a (θ,α) representation of the pencils in FIG. 40.

FIG. 41 shows a (θ,α) representation of pencils such as 4001 or 4003 shown in FIG. 40. Pencils that have a small beam print on axis x' such as 4001 are represented as short (in vertical) regions in the (θ,α) diagram, such as 4101. Pencils that have a large beam print on axis x' such as 4003 are represented as tall (in vertical) regions in the (θ,α) a diagram, such as 4102. Lines 4103 bound the area defined by the rays that can potentially reach the fovea.

3D Geometry

Figure 42:
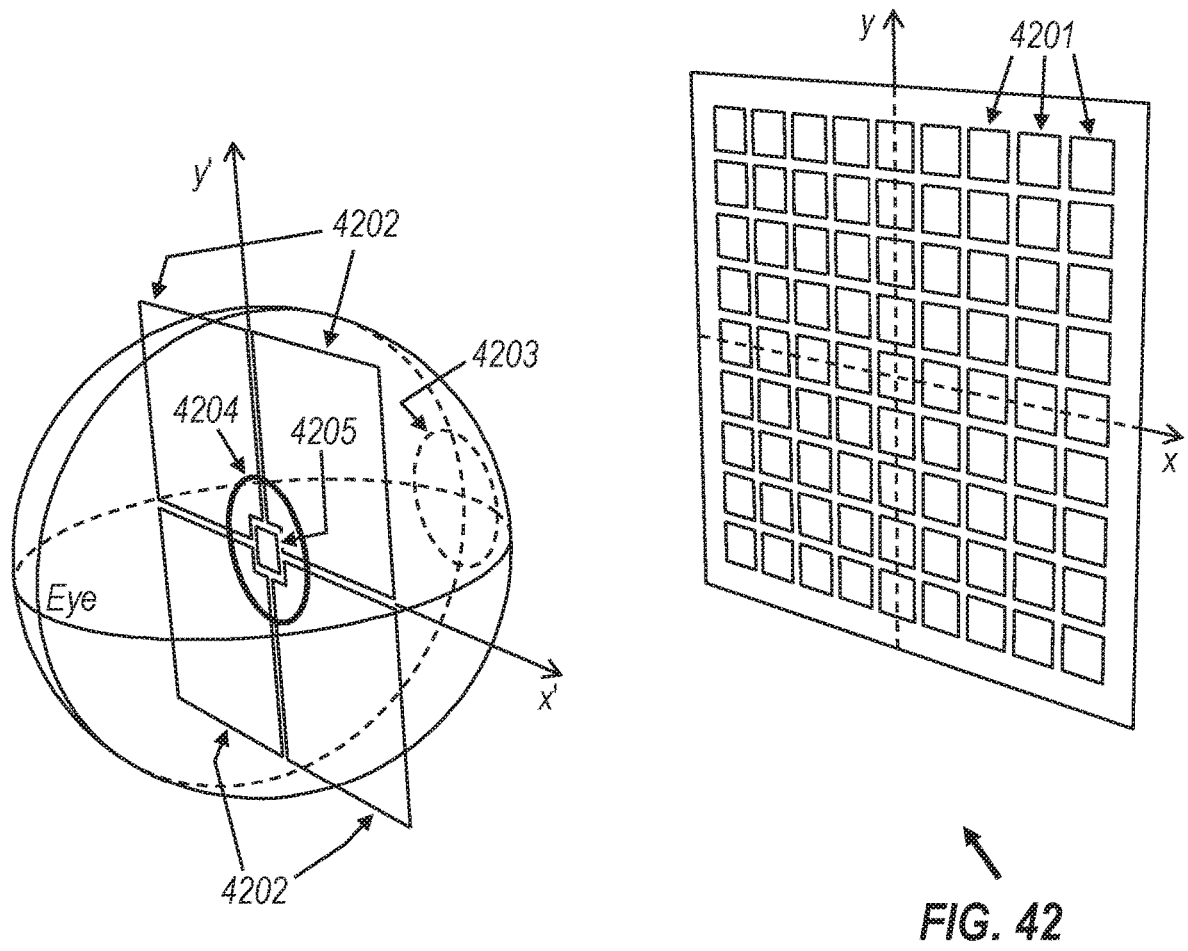
FIG. 42 shows a discretization of planes x,y and x',y' defining the pencils.

As we have seen before, in 3D geometry, i.e., when we consider all the rays and not only those contained in the x,x' plane, 4 parameters are necessary to characterize a ray. The concepts explained before can be easily extended to 3D geometry. For instance, FIG. 42 shows a possible discretization of the x',y' and x,y planes in areas defining their pencil prints and their ipixels. A set of rays that cross one of the areas 4201 on plane x,y and one of the areas 4202 or 4205 on plane x',y' constitute one pencil (similarly to pencil 502 defined by areas 505 on plane x,y and 504 on plane x',y', see FIG. 5). Every pencil in this discretization is an accommodation pencil although their pencil prints are quite different. Pencils defined by areas 4202 on plane x',y' are much wider than pencils defined by area 4205 on plane x',y'. The portions of pencils that enter region 4204 intervene in accommodation while pencils or portions of pencils that fall outside of region 4204 do not intervene in accommodation. In one embodiment, 4205 is eliminated and only four adjacent square regions are defined instead of 4202 ones. The boundary of region 4204 results from the intersection of sphere 802 (see FIG. 8) at the center of the eye with plane x',y'. Also shown in FIG. 42 is eye pupil 4203. This representation assumes that there is no vignetting of the pencils.

This pencil discretization is somehow ideal and helps to understand the concept of pencils. Observe that in general a pencil is not the set of all the rays linking its pencil print and its ipixel, but just a subset of it. And in general the ipixel distribution corresponding to the pencils sharing the same pencil print does not need to be the same as the ipixel distribution of the pencils sharing another pencil print. So in general we will have 5 different ipixel distributions 4201 on plane x,y each one of them corresponding to one of the pencil prints on x',y'.

Figure 43:
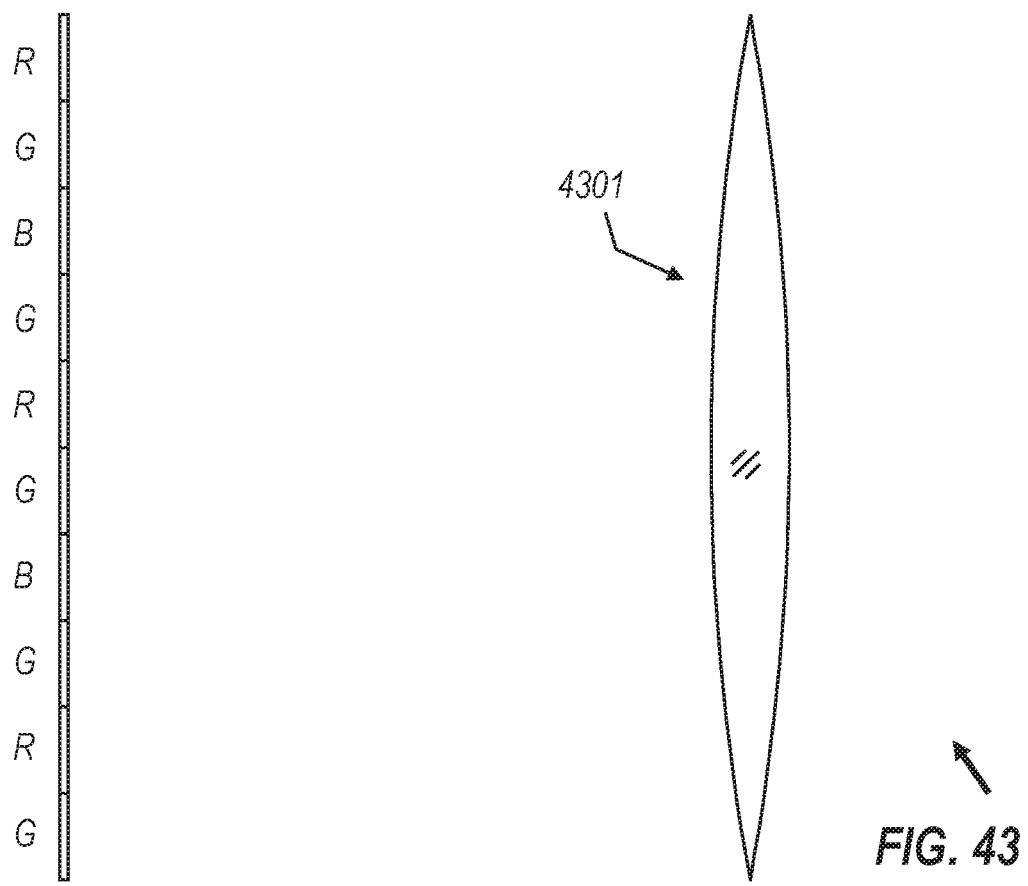
FIG. 43 shows an embodiment with higher resolution in the green channel than the blue or red.

FIG. 43 shows an embodiment with a lenslet 4301 and its cluster on the display composed of many red, green and blue sub-pixels. Said display has a higher density of green sub-pixels (G) than blue (B) or red (R) sub-pixels. The resolution perceived by the human eye is mostly defined by the green so this configuration results in a higher perceived resolution. This configuration may be combined with the embodiments described above.

Figure 44:
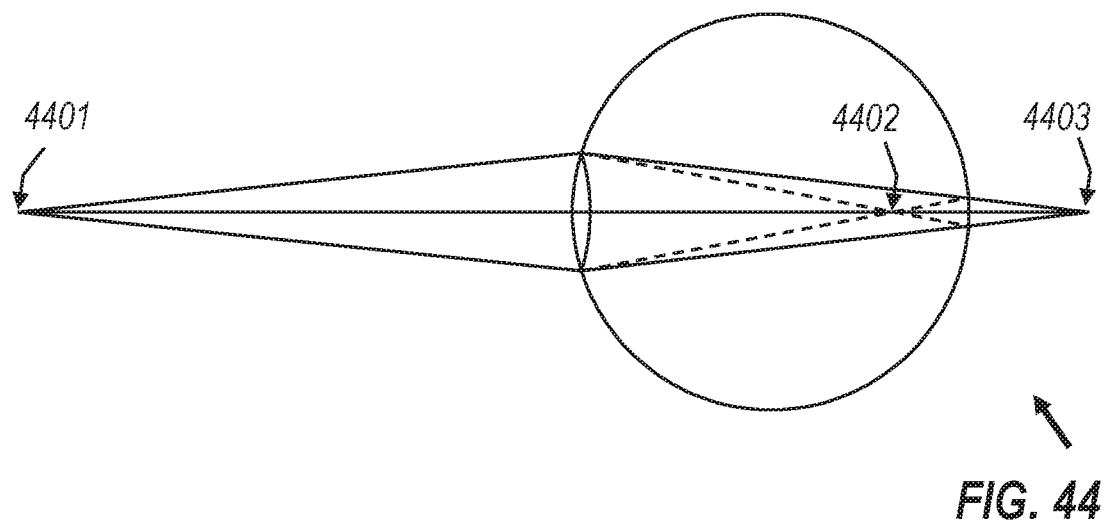
FIG. 44 shows the chromatic aberration of the eye in which both the blue and red ends of the visible spectrum are focused away from the retina.

FIG. 44 shows the behavior of the human eye under polychromatic light. Polychromatic light emitted from a point 4401 is split by the eye according to its wavelength. Blue light is focused at a position 4402 inside the eye while red light is redirected towards a point 4403 outside the eye. Neither of these colors is perfectly focused onto the back of the eye. This defocusing, however, provides a clue for the eye to accommodate at the right distance. This brings the intermediate green color into sharp focus providing the perception of resolution. This defocusing of the blue and red colors could be used to induce accommodation at a desired distance. The green color, freed from accommodation, could have a higher resolution resulting in a system with a higher perceived resolution.

Figure 45:
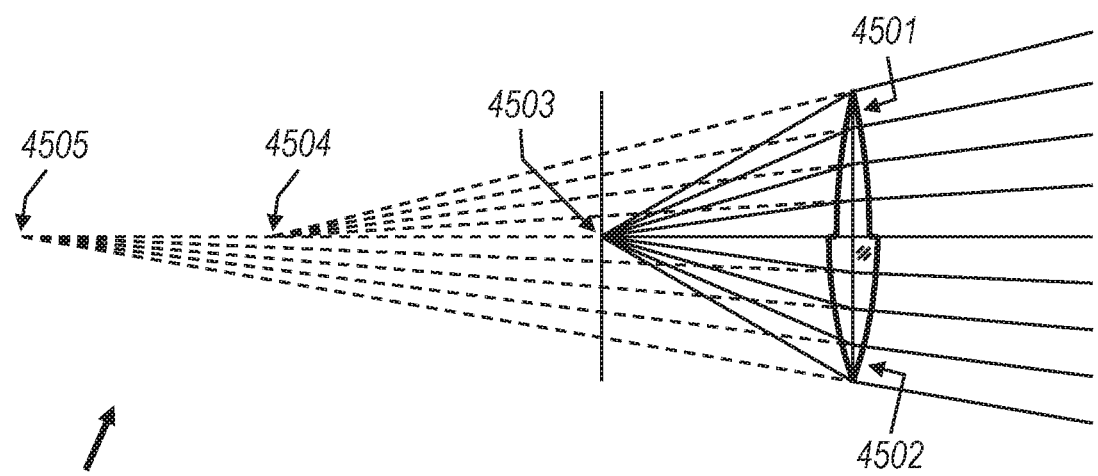
FIG. 45 shows a multifocal lens.

FIG. 45 shows a multifocal lenslet conceptually similar as the ones used in ophthalmology applications (see for instance Salerno L C, Tiveron M C, Alió J L., "Multifocal intraocular lenses: Types, outcomes, complications and how to solve them" Taiwan J Ophthalmol 2017; 7:179-84). This lenslet is divided into sections, 4501 and 4502 each with a different focal length. These take the light emitted from a point 4503 on the display and generate virtual image points 4504 and 4505. In general, the lens may be split into different sections. Several of these lenses may be combined into an array. So the pencils generated by these lenslets will have 2 or more waists. These lenses will give the eye different depth clues for accommodation.

Recording and Storing a HVALF

Because a HVALF uses less pencils to get the same perceived resolution and FOV than a conventional LF, this discretization scheme can also be used with advantage for recording and storing LF scenes.

Let us assume that recording a LF scene is done using several pinhole cameras (i.e., cameras whose entry pupil size is negligible). The pencils are again divided in 2 sets: those potentially focused on the fovea when displaying the LF (accommodation pencils) and the remaining ones (peripheral pencils). The first set is recorded with several pinhole cameras whose pinhole is located within the circle 4204. If the cameras are identical and face frontwards then each one of its pixels will record the brightness corresponding to a LF with a configuration similar to that of FIG. 42. The relative position of a pixel in its sensor will give the x,y coordinates of the pencil and the position of the camera will give the x',y' coordinates.

Peripheral pencils can also be recorded in a similar way choosing a central point of the pencil print for the camera position or the center of the pupil when this gazes the frontwards direction.

The above description provides a detailed description of the preferred embodiments. The scope of the invention, however, is directed to a display device that includes optics, the display device arranged to generate a light field to illuminate a human eye, having a coordinate system fixed to the user's skull. The light field comprising a plurality of pencils that virtually intersect a first reference surface and a second reference surface, said first reference surface being the plane passing through the eye ball sphere center and is perpendicular to the skull frontward direction, and said second reference surface located at a distance from the user's skull and being a portion of a sphere centered the eye ball sphere center. The center of said second reference surface defined as the intersection point of the line passing through the eye ball sphere center and pointing in the skull's frontwards direction. Each pencil is a set of straight lines, segments of said lines coincident with light ray trajectories illuminating the eye having an approximately equal luminance and color at any time. Each ray is determined by the point pair formed by the virtual points of intersection of the ray with the first and second reference surfaces. The pencil density is higher at the point pair formed by the centers of eye ball sphere and the second reference surface than in at least a region away from that point pair, the pencil density at a point pair, the first point of said pair contained in the first reference surface and the second point of said pair contained in the second reference surface. The pencil density defined as the number of pencils that contain rays passing through two small disks centered at said two points and said disks tangent to their respective reference surfaces, divided by the phase space volume defined by the rays intersecting those two disks.

Optionally in each of the embodiments of the display device the pencil density is maximum at the point pair formed by the eye ball sphere and second reference surface centers.

Optionally in each of the embodiments of the display device the pixel density at a first point pair whose the first point of said pair is the center of eye ball sphere, and the second point of said point pair is located so the line connecting said point with the eye ball sphere center form an angle smaller less than 10 degrees with said skull's frontward, said pixel density is higher than at a second point pair whose second point coincides with the second point of the first point pair, and the first point of the second point pair is located in region away from the eye ball sphere center.

Optionally in each of the embodiments of the display device the pencil density at the first point pair is higher than at any other said second point pair.

Optionally in each of the embodiments of the display device the resolution of the image seen by a pinhole camera. located at eye ball sphere center is higher than when located in region away from the eye ball sphere center.

Optionally in each of the embodiments of the display device the small disk contained in the first reference surface has a radius not larger than 3 mm.

Optionally in each of the embodiments of the display device the small disk contained in the second reference surface subtends an angular radius of not larger than 3 degrees from the eye ball sphere center.

Optionally in each of the embodiments of the display device the number of accommodation pencils intersecting a point in an accommodation volume is at least two, wherein said an accommodation pencil having a pencil print covering only partially a disk contained in the first reference surface with a diameter between 2 and 7 mm diameter and centered at the eye ball sphere center, wherein said pencil print is the region of intersection of the pencil with said first reference surfaces, and wherein every point of said accommodation volume is located in front of the skull at a distance from the eye ball sphere center larger than 10 cm, said every point and the center of the second reference surface subtending an angle smaller 30 deg from the eye ball sphere center.

Optionally in each of the embodiments of the display device the number of said pencils smaller than 16.

Optionally in each of the embodiments of the display device the majority of the pencils in the light field are accommodation pencils.

Optionally in each of the embodiments of the display device the number of said pencils is smaller than 16 and the majority of the pencils in the light field are accommodation pencils.

Optionally in each of the embodiments of the display device the set of points intersected by said accommodation pencils form a 3D pixel, and the set of 3D pixels are distributed in the accommodation volume.

Optionally in each of the embodiments of the display device the optics comprises at least a lenslet array.

Optionally in each of the embodiments of the display device at least one lenslet of the array is multifocal.

Optionally in each of the embodiments of the display device at least two lenslet of said array comprising rotational symmetric optical surfaces whose symmetry axis pass through the center of the eye ball sphere.

Optionally in each of the embodiments, the display device comprises a display, its pixels being wired or addressed individually only near the optical axis of each channel.

Optionally in each of the embodiments, the display device comprises a display and an optic, said optic arranged to illuminate the eye producing a virtual image of the surface of the lenslet array aperture surface on the second reference surface, and wherein at least one lenslet is arranged to produce a real image of the display surface through said optic on the first reference surface, the cluster of said lenslet comprising a plurality of pixels.

Optionally in each of the embodiments, the display device comprises a display and an optic, said optic arranged to illuminate the eye producing a virtual image of the surface of the lenslet array aperture surface on the second reference surface, and wherein at least one lenslet is arranged to produce a real image of the display surface through said optic on the first reference surface, the cluster of said lenslet comprising a plurality of opixels.

Optionally in each of the embodiments of the display device at least one lenslet of said array is arranged to produce at least one pencil whose pencil print intersects a disk contained in the first reference surface with a diameter between 2 and 7 mm diameter and centered at the eye ball sphere center, and the size of the ipixel of said pencil being smaller than size of the ipixel of at least another pencil produced by said lenslet whose pencil print does not intersect said foveal reference circle.

Optionally in each of the embodiments, the display device comprises at least two stacked displays, wherein the light of a first display passes through the second display before reaching the eye ball, said second display being a transmissive liquid crystal type.

Optionally in each of the embodiments of the display device the optics is arranged to produce a real image of the surface of the first display on the first reference surface and to produce a virtual image of the second display surface on the second reference surface.

Optionally in each of the embodiments of the display device the pencils being generated in a time multiplexing scheme such that not all the pencils are lit simultaneously.

Optionally in each of the embodiments of the display device the light field being computed by the minimization of a merit function that weight the rays according to the distance of the straight line supporting the ray trajectory to the eye ball sphere center, said weight the larger the distance of the prolongation straight line of the trajectory of said ray, the smaller its weight.

Optionally in each of the embodiments of the display device the weighting function is approximately proportional to the value of the visual acuity of a normal human eye located at the position of said eyeball sphere with the center of the pupil of said eye located at the point of intersection of said ray with the eye ball sphere.

Optionally in each of the embodiments of the display device the weighting function is approximately proportional to the average value of the visual acuity of a normal human eye located at the position of said eyeball sphere, said average value computed with the pupil of said eye located according to the statistic of the saccades of a normal human eye.

Optionally in each of the embodiments of the display device the light field pencils being defined by a uniform discretization in variables u, v, u', v', said variables corresponding to a transformation whose inverse Jacobian approximately equals the weighting function.

Optionally in each of the embodiments of the display device the light field values are sampled, recorded, transmitted or stored to be displayed.

Optionally in each of the embodiments of the display device the light field values are recorded or rendered using a small set of cameras placed within a disk contained in the first reference surface with a diameter between 2 and 7 mm diameter and centered at the eye ball sphere center.

Optionally in each of the embodiments of the display device there are more green pencils than red and blue to increase the perceive resolution.

Optionally in each of the embodiments of the display device the color gamut of peripheral pencils is smaller than the color gamut of the remaining pencils.

A method of generation of a light field to illuminate an eye ball sphere is also disclosed that comprises the steps of minimization of a merit function that weight the rays so the larger the distance of said ray to the eye ball sphere center, the larger its weight.

Optionally in each of the embodiments of the method the weighting function being approximately proportional to the value of the visual acuity of a normal human eye located at the position of said eyeball sphere with the center of the pupil of said eye centered at the point of intersection of said ray with the eye ball sphere.

Optionally in each of the embodiments of the method the weighting function being approximately proportional to the average value of the visual acuity of a normal human eye located at the position of said eyeball sphere, said average value computed with the pupil of said eye located according to the statistic of the saccades of a normal human eye.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. The various embodiments and elements can be interchanged or combined in any suitable manner as necessary.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

Although specific embodiments have been described, the preceding description of presently contemplated modes of practicing the invention is not to be taken in a limiting sense, but is made merely for the purpose of describing certain general principles of the invention. Variations are possible from the specific embodiments described. For example, the patents and applications cross-referenced above describe systems and methods that may advantageously be combined with the teachings of the present application. Although specific embodiments have been described, the skilled person will understand how features of different embodiments may be combined.

The full scope of the invention should be determined with reference to the claims, and features of any two or more of the claims may be combined.

The invention claimed is:

1. A display device comprising optics, the display device arranged to generate a light field to illuminate a human eye, having a coordinate system fixed to a user's skull, the light field comprising a plurality of pencils that virtually intersect a first reference surface and a second reference surface, said first reference surface being a plane passing through an eye ball sphere center and perpendicular to a skull frontward direction, and said second reference surface located at a distance from the user's skull and being a portion of a sphere centered at the eye ball sphere center, a center of said second reference surface being defined as an intersection point of a line passing through the eye ball sphere center and pointing in the skull frontward direction, wherein each said pencil is a set of straight lines, segments of said straight lines coincident with light ray trajectories illuminating the eye having an approximately equal luminance and color at any time, wherein each said ray is determined by a point pair formed by virtual points of intersection of the ray with the first and second reference surfaces, and wherein a pencil density is higher at a point pair formed by the eye ball sphere center and a center of the second reference surface than in at least a region away from that point pair, said pencil density at a point pair, a first point of said pair contained in the first reference surface and a second point of said pair contained in the second reference surface, said pencil density defined as a number of pencils that contain rays passing through two small disks centered at said pair and said disks tangent to their respective reference surfaces, divided by a phase space volume defined by the rays intersecting those two disks.

2. The display device of claim 1, wherein a resolution of an image seen by a pinhole camera located at a position of said eye ball sphere center and aimed frontwards is higher than when located in region away from the position of said eye ball sphere center.

3. The display device of claim 1, wherein the small disk contained in the first reference surface has a radius not larger than 3 mm and wherein the small disk contained in the second reference surface subtends an angular radius of not larger than 3 deg from the eye ball sphere center.

4. The display device of claim 1, wherein a number of accommodation pencils intersecting a point in an accommodation volume is at least two, wherein an accommodation pencil has a pencil print covering only partially a disk contained in the first reference surface with a diameter between 2 and 7 mm diameter and centered at the eye ball sphere center, wherein said pencil print is a region of intersection of the pencil with said first reference surface, and wherein every point of said accommodation volume is located in front of the user's skull at a distance from the eye ball sphere center larger than 10 cm, said every point and the center of the second reference surface subtending an angle smaller 30 deg from the eye ball sphere center.

5. The display device of claim 4, wherein a majority of the pencils in the light field are accommodation pencils.

6. The display device of claim 1, wherein the optics comprise at least a lenslet array.

7. The display device of claim 6, wherein at least one lenslet of the lenslet array is multifocal.

8. The display device of claim 6, further comprising a display and an optic, said optic arranged to illuminate the eye producing a virtual image of a surface of a lenslet array aperture surface on the second reference surface, and wherein at least one lenslet is arranged to produce a real image of the display surface through said optic on the first reference surface, a cluster of said lenslet comprising a plurality of opixels.

9. The display device of claim 6, wherein at least one lenslet of said lenslet array is arranged to produce at least one pencil whose pencil print intersects a disk contained in the first reference surface with a diameter between 2 and 7 mm diameter and centered at the eye ball sphere center, and the size of an ipixel of said pencil being smaller than a size of an ipixel of at least another pencil produced by said lenslet whose pencil print does not intersect said disk.

10. The display device of claim 1 further comprising at least two stacked displays, wherein light of a first display passes through a second display before reaching the eye, said second display being a transmissive liquid crystal type.

11. The display device of claim 10, wherein the optics are arranged to produce a real image of a surface of the first display on the first reference surface and to produce a virtual image of a surface of the second display on the second reference surface.

12. The display device of claim 1, the pencils being generated in a time multiplexing scheme such that not all the pencils are lit simultaneously.

13. The display device of claim 1, the light field being computed by a minimization of a merit function that weights the rays according to a distance of a straight line supporting a ray trajectory to the eye ball sphere center, wherein the larger a distance of a prolongation straight line of a trajectory of said ray, the smaller its weight.

14. The display device of claim 1, wherein values of the light field are sampled, recorded, transmitted or stored to be displayed.

15. The display device of claim 1, wherein values of the light field have been recorded or rendered using a small set of cameras placed within a disk contained in the first reference surface with a diameter between 2 and 7 mm diameter and centered at the eye ball sphere center.

* * * * *